(12) United States Patent
Wei et al.

(10) Patent No.: US 12,117,596 B2
(45) Date of Patent: Oct. 15, 2024

(54) IMAGE LENS ASSEMBLY, IMAGING APPARATUS AND ELECTRONIC DEVICE

(71) Applicant: LARGAN PRECISION CO., LTD., Taichung (TW)

(72) Inventors: Chung-Yu Wei, Taichung (TW); Hung-Shuo Chen, Taichung (TW); Kuan-Chun Wang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/487,219

(22) Filed: Oct. 16, 2023

(65) Prior Publication Data

US 2024/0045180 A1 Feb. 8, 2024

Related U.S. Application Data

(62) Division of application No. 17/343,816, filed on Jun. 10, 2021, now Pat. No. 11,828,910.

(30) Foreign Application Priority Data

Sep. 28, 2020 (TW) ................... 109133718

(51) Int. Cl.
*G02B 13/00* (2006.01)
*G02B 9/60* (2006.01)
*G02B 27/00* (2006.01)

(52) U.S. Cl.
CPC .......... *G02B 13/0045* (2013.01); *G02B 9/60* (2013.01); *G02B 27/0025* (2013.01)

(58) Field of Classification Search
CPC .... G02B 9/60; G02B 13/0045; G02B 13/004; G02B 13/18; G02B 27/0012; G02B 27/0025
See application file for complete search history.

(56) References Cited

U.S. PATENT DOCUMENTS

| 8,537,472 | B2 | 9/2013 | Tsai et al. |
| 8,780,458 | B2 | 7/2014 | Sano et al. |
| 8,885,269 | B2 | 11/2014 | Shinohara |
| 8,885,270 | B2 | 11/2014 | Tanaka et al. |

(Continued)

FOREIGN PATENT DOCUMENTS

| CN | 110161659 A | 8/2019 |
| CN | 110764231 A | 2/2020 |

(Continued)

*Primary Examiner* — Jack Dinh
(74) *Attorney, Agent, or Firm* — McClure, Qualey & Rodack, LLP

(57) ABSTRACT

An image lens assembly includes five lens elements, which are, in order from an object side to an image side along an optical path, a first lens element, a second lens element, a third lens element, a fourth lens element and a fifth lens element. The first lens element has positive refractive power. The third lens element has negative refractive power. The fourth lens element with positive refractive power has an object-side surface being convex in a paraxial region thereof and an image-side surface being convex in a paraxial region thereof. The fifth lens element has an object-side surface being convex in a paraxial region thereof and an image-side surface being concave in a paraxial region thereof. The image-side surface of the fifth lens element includes at least one convex critical point in an off-axis region thereof.

15 Claims, 32 Drawing Sheets

(56) References Cited

U.S. PATENT DOCUMENTS

| | | |
|---|---|---|
| 8,917,458 B2 | 12/2014 | Tsai et al. |
| 10,379,322 B2 | 8/2019 | Wu et al. |
| 10,890,738 B2 | 1/2021 | Yeh et al. |
| 10,895,718 B2 | 1/2021 | Lin et al. |
| 2022/0011550 A1 | 1/2022 | Yu |
| 2022/0019058 A1 | 1/2022 | Yu et al. |
| 2022/0026678 A1 | 1/2022 | Bian |

FOREIGN PATENT DOCUMENTS

| | | | |
|---|---|---|---|
| CN | 110955020 | A | 4/2020 |
| CN | 210488110 | U | 5/2020 |
| CN | 111538139 | A | 8/2020 |
| CN | 111624743 | A | 9/2020 |
| CN | 211554450 | U | 9/2020 |
| CN | 111736305 | A | 10/2020 |
| TW | I644140 | B | 12/2018 |
| TW | 202030517 | A | 8/2020 |
| WO | 2011086827 | A1 | 7/2011 |
| WO | 2011118555 | A1 | 9/2011 |
| WO | 2012160831 | A1 | 11/2012 |

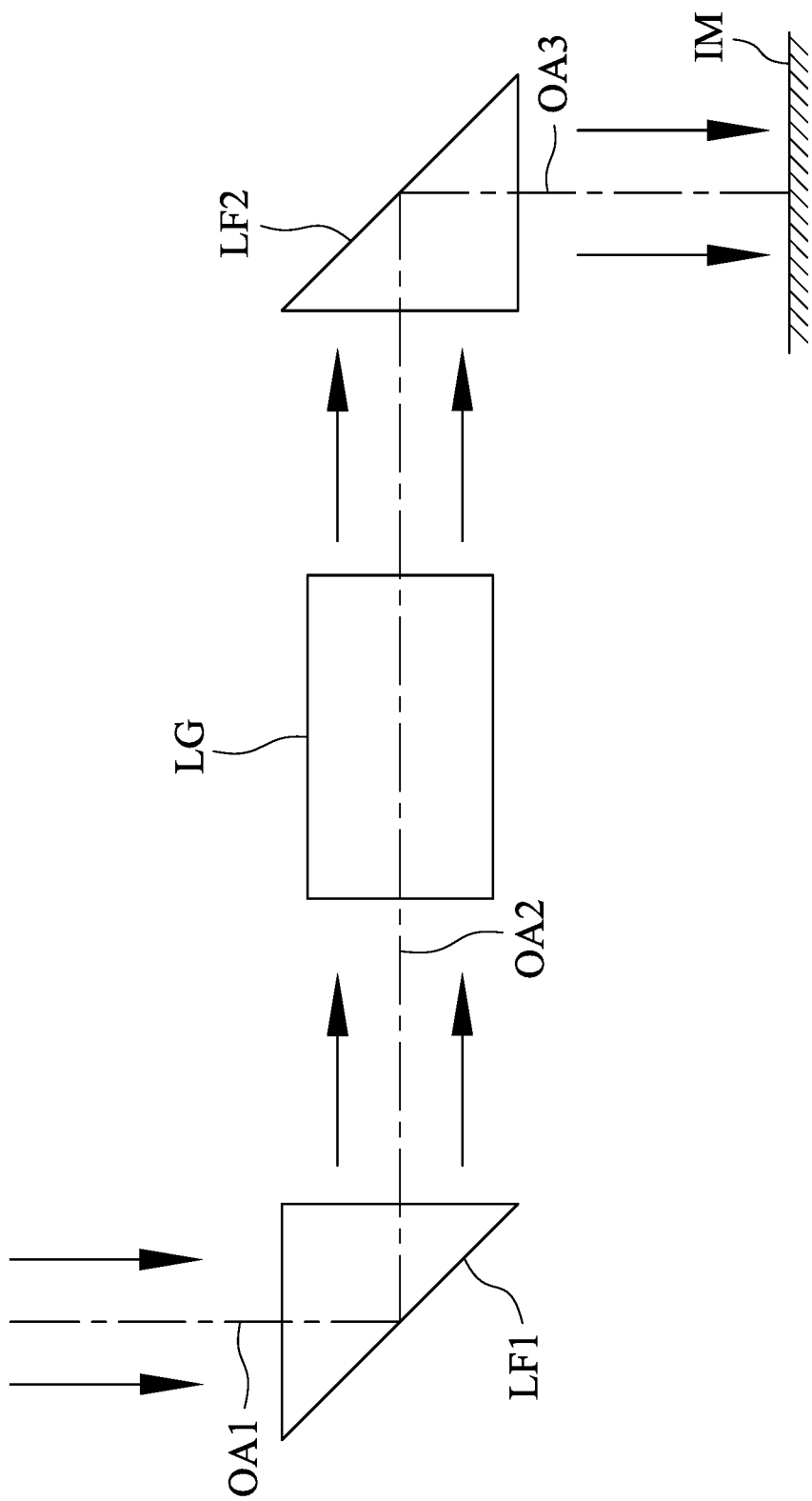

IMAGE LENS ASSEMBLY, IMAGING APPARATUS AND ELECTRONIC DEVICE

RELATED APPLICATIONS

This application is a divisional application of U.S. application Ser. No. 17/343,816, filed Jun. 10, 2021, which claims priority to Taiwan Application Serial Number 109133718, filed Sep. 28, 2020, which are herein incorporated by references.

BACKGROUND

Technical Field

The present disclosure relates to an image lens assembly and an imaging apparatus. More particularly, the present disclosure relates to an image lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an image lens assembly includes five lens elements, the five lens elements are, in order from an object side to an image side along an optical path, a first lens element, a second lens element, a third lens element, a fourth lens element and a fifth lens element. The first lens element has positive refractive power. The third lens element has negative refractive power. The fourth lens element with positive refractive power has an object-side surface being convex in a paraxial region thereof and an image-side surface being convex in a paraxial region thereof. The fifth lens element has an object-side surface being convex in a paraxial region thereof and an image-side surface being concave in a paraxial region thereof. The image-side surface of the fifth lens element includes at least one convex critical point in an off-axis region thereof. When an Abbe number of the second lens element is V2, an Abbe number of the third lens element is V3, a focal length of the image lens assembly is f, a curvature radius of the object-side surface of the fourth lens element is R7, a curvature radius of the image-side surface of the fourth lens element is R8, an axial distance between the first lens element and the second lens element is T12, and an axial distance between the second lens element and the third lens element is T23, the following conditions are satisfied: V2+V3<70; f/R8≤−0.80; 0.20<T12/T23; and 0.95<f/R7.

According to another aspect of the present disclosure, an imaging apparatus includes the image lens assembly of the aforementioned aspect and an image sensor disposed on an image surface of the image lens assembly.

According to another aspect of the present disclosure, an electronic device includes the imaging apparatus of the aforementioned aspect.

According to another aspect of the present disclosure, an image lens assembly includes five lens elements, the five lens elements are, in order from an object side to an image side along an optical path, a first lens element, a second lens element, a third lens element, a fourth lens element and a fifth lens element. The first lens element has positive refractive power. The second lens element has an image-side surface being concave in a paraxial region thereof. The third lens element has negative refractive power. The fourth lens element with positive refractive power has an object-side surface being convex in a paraxial region thereof and an image-side surface being convex in a paraxial region thereof. The fifth lens element has an object-side surface being convex in a paraxial region thereof and an image-side surface being concave in a paraxial region thereof. The image-side surface of the fifth lens element includes at least one convex critical point in an off-axis region thereof. When an Abbe number of the second lens element is V2, an Abbe number of the third lens element is V3, a focal length of the image lens assembly is f, a curvature radius of the object-side surface of the fourth lens element is R7, a curvature radius of the image-side surface of the fourth lens element is R8, an axial distance between the first lens element and the second lens element is T12, and an axial distance between the second lens element and the third lens element is T23, the following conditions are satisfied: V2+V3<70; f/R8≤−0.80; 0.20<T12/T23; and 0.70<f/R7.

According to another aspect of the present disclosure, an image lens assembly including five lens elements, the five lens elements are, in order from an object side to an image side along an optical path, a first lens element, a second lens element, a third lens element, a fourth lens element and a fifth lens element. The first lens element has positive refractive power. The fourth lens element with positive refractive power has an object-side surface being convex in a paraxial region thereof and an image-side surface being convex in a paraxial region thereof. The object-side surface of the fourth lens element includes at least one concave critical point in an off-axis region thereof. The fifth lens element has an object-side surface being convex in a paraxial region thereof and an image-side surface being concave in a paraxial region thereof. The image-side surface of the fifth lens element includes at least one convex critical point in an off-axis region thereof. When an Abbe number of the second lens element is V2, an Abbe number of the third lens element is V3, a focal length of the image lens assembly is f, a focal length of the second lens element is f2, a focal length of the third lens element is f3, a curvature radius of the object-side surface of the fourth lens element is R7, an axial distance between the first lens element and the second lens element is T12, and an axial distance between the second lens element and the third lens element is T23, the following conditions are satisfied: V2+V3<70; 0.30≤T12/T23; 1.05≤f/R7; and |f3/f2|<1.40.

BRIEF DESCRIPTION OF THE DRAWINGS

The present disclosure can be more fully understood by reading the following detailed description of the embodiment, with reference made to the accompanying drawings as follows:

FIG. 28C is a schematic view of an arrangement of two light path folding elements in the image lens assembly of the present disclosure.

DETAILED DESCRIPTION

Figure 1:
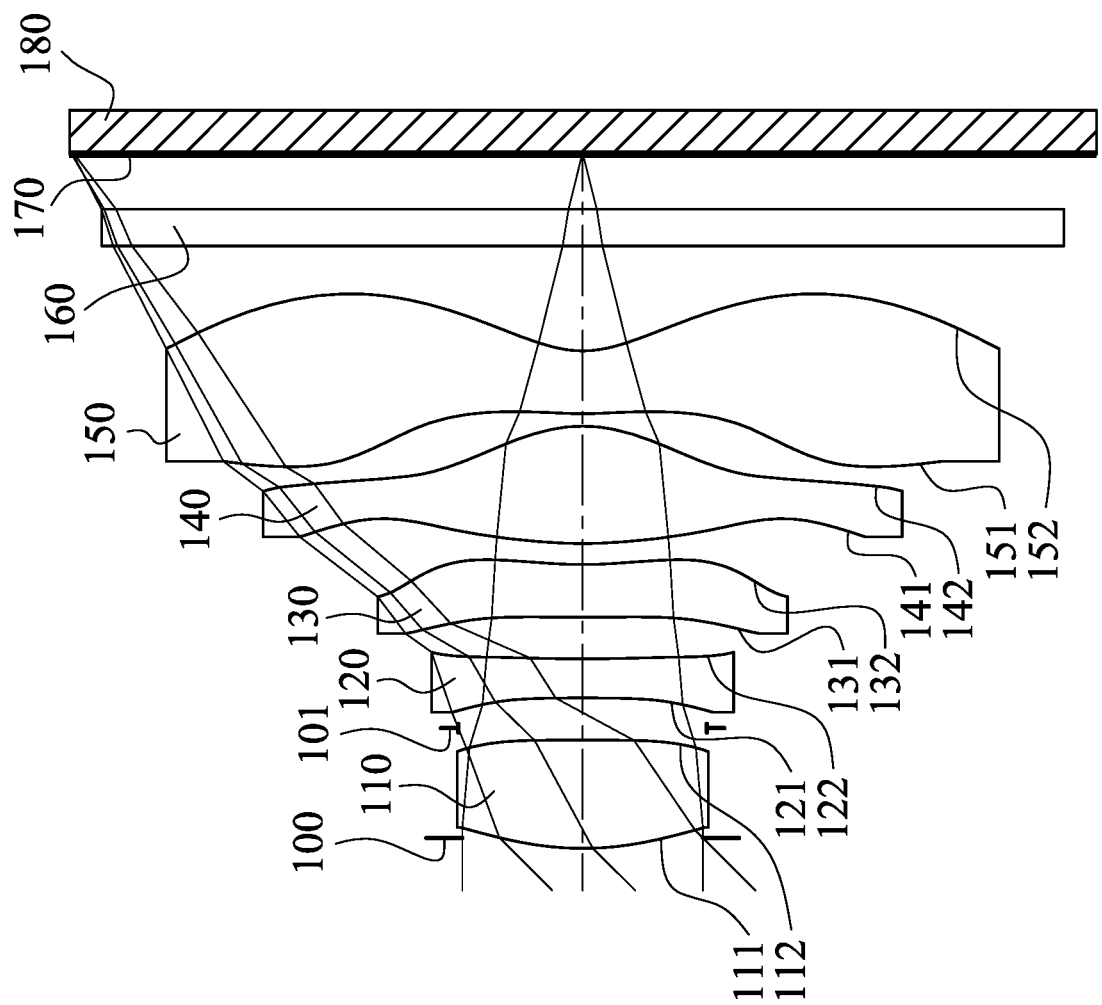
FIG. 1 is a schematic view of an imaging apparatus according to the 1st embodiment of the present disclosure.

An image lens assembly includes five lens elements, which are, in order from an object side to an image side along an optical path, a first lens element, a second lens element, a third lens element, a fourth lens element and a fifth lens element.

The first lens element has positive refractive power, so that it is favorable for achieving the need of compactness by reducing the total track length of the image lens assembly.

The second lens element has an image-side surface being concave in a paraxial region thereof, so that it is favorable for the light with a large incident angle entering the image lens assembly.

The third lens element can have negative refractive power, so that it is favorable for light converging in the peripheral region of the image.

The fourth lens element with positive refractive power has an object-side surface being convex in a paraxial region thereof and an image-side surface being convex in a paraxial region thereof. Therefore, it is favorable for controlling the total track length of the image lens assembly by providing sufficient positive refractive power. Moreover, the object-side surface of the fourth lens element can include at least one concave critical point in an off-axis region thereof, so that it is favorable for correcting aberrations in the peripheral region of the image with a configuration of a wide field of view. Furthermore, when a distance between the at least one concave critical point of the object-side surface of the fourth lens element and an optical axis is Yc41, and a focal length of the image lens assembly is f, the following condition can be satisfied: $0.20 < Yc41/f < 0.80$. Therefore, it is favorable for further correcting aberrations in the off-axis region.

The fifth lens element has an object-side surface being convex in a paraxial region thereof and an image-side surface being concave in a paraxial region thereof. Therefore, it is favorable for reducing the back focal length and correcting aberrations in the peripheral region at the same time. Moreover, the image-side surface of the fifth lens element includes at least one convex critical point in an off-axis region thereof, so that it is favorable for controlling light convergence and aberrations in the off-axis region.

When an Abbe number of the second lens element is V2, and an Abbe number of the third lens element is V3, the following condition is satisfied: V2+V3<70. Therefore, it is favorable for correcting chromatic aberration. Moreover, the following condition can be satisfied: 20<V2+V3<60. Furthermore, the following condition can be satisfied: 20<V2+V3<50.

When an axial distance between the first lens element and the second lens element is T12, and an axial distance between the second lens element and the third lens element is T23, the following condition is satisfied: 0.20<T12/T23. Therefore, the distance between the first lens element and the second lens element can be controlled, so as to provide availability for special mechanisms, such as miniaturized front side lens assembly, and control the total track length of the image lens assembly at the same time. Moreover, the following condition can be satisfied: 0.30≤T12/T23. Further, the following condition can be satisfied: 0.5<T12/T23. Further, the following condition can be satisfied: 0.85<T12/T23. Further, the following condition can be satisfied: 1.0<T12/T23. Furthermore, the following condition can be satisfied: 1.0<T12/T23<3.5.

When the focal length of the image lens assembly is f, and a curvature radius of the object-side surface of the fourth lens element is R7, the following condition is satisfied: 0.70<f/R7. Therefore, sufficient positive refractive power for the image lens assembly is provided by the fourth lens element, so as to reduce the total track length of the image lens assembly. Moreover, the following condition can be satisfied: 0.95<f/R7. Furthermore, the following condition can be satisfied: 1.05≤f/R7.

When the focal length of the image lens assembly is f, and a curvature radius of the image-side surface of the fourth lens element is R8, the following condition is satisfied: f/R8≤−0.80. Therefore, the refractive power of the fourth lens element can be enhanced, so as to improve aberration corrections and provide flexibility for shape configurations of lens surfaces.

When a focal length of the second lens element is f2, and a focal length of the third lens element is f3, the following condition is satisfied: |f3/f2|<1.40. Therefore, it can ensure the third lens element having sufficient refractive power with improved aberration corrections. Moreover, the following condition can be satisfied: |f3/f2|<1.0. Furthermore, the following condition can be satisfied: |f3/f2|<0.80.

When the focal length of the image lens assembly is f, a focal length of the fourth lens element is f4, and a focal length of the fifth lens element is f5, the following condition is satisfied: 3.0<(f/f4)−(f/f5). Therefore, it is favorable for reducing the back focal length and achieving compactness by enhancing the refractive power of the fourth lens element. Moreover, the following condition can be satisfied: 3.50<(f/f4)−(f/f5)<6.0.

When an f-number of the image lens assembly is Fno, the following condition is satisfied: 1.2<Fno<2.6. Therefore, it can ensure a fast lens speed and sufficient amount of incoming light.

When an axial distance between an object-side surface of the first lens element and an image surface is TL, and a maximum image height of the image lens assembly is ImgH, the following condition is satisfied: TL/ImgH<1.40. Therefore, it is favorable for wider applications of the image lens assembly by controlling the total track length and the field of view thereof.

When a maximum field of view of the image lens assembly is FOV, the following condition is satisfied: 88 degrees<FOV<110 degrees. Therefore, it is favorable for balancing the wide field of view and the image quality of the image lens assembly.

When a minimum among Abbe numbers of all lens elements of the image lens assembly is Vmin, the following condition is satisfied: Vmin<20. Therefore, it is favorable for correcting chromatic aberration.

When the axial distance between the first lens element and the second lens element is T12, an axial distance between the third lens element and the fourth lens element is T34, and an axial distance between the fourth lens element and the fifth lens element is T45, the following condition is satisfied: 1.0<T12/T34. Therefore, it can ensure enough space between the first lens element and the second lens element, and provide availability of arranging special mechanism, such as a miniaturized front side lens assembly. Moreover, the following condition can be satisfied: 1.0<T12/T45.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following condition is satisfied: 1.0<CT1/CT2; 1.0<CT1/CT3; 1.0<CT1/CT4; and 1.0<CT1/CT5. Therefore, it can ensure the first lens element having sufficient thickness, and the compactness of the image lens assembly achieved with specialized configurations, such as a miniaturized front side lens assembly, or other limitations.

When the axial distance between the first lens element and the second lens element is T12, and the central thickness of the second lens element is CT2, the following condition is satisfied: 1.0<T12/CT2<3.0. Therefore, it can ensure enough space between the first lens element and the second lens element, and sufficient refractive power at the object side under a specialized configuration, such as a miniaturized front side lens assembly.

When a focal length of the first lens element is f1, and the focal length of the third lens element is f3, the following condition is satisfied: −2.0<f3/f1<0. Therefore, it can ensure the third lens element having sufficient refractive power with improved aberration corrections thereof. Moreover, the following condition can be satisfied: −1.40<f3/f1<−0.3.

When the central thickness of the first lens element is CT1, and a sum of all axial distances between adjacent lens elements of the image lens assembly is ΣAT, the following condition is satisfied: 0.80<CT1/ΣAT. Therefore, it can ensure the first lens element having sufficient thickness, and enough refractive power with specialized configurations, such as a miniaturized front side lens assembly, or other limitations.

When an axial distance between the object-side surface of the first lens element and the image-side surface of the fifth lens element is Td, and an entrance pupil diameter of the image lens assembly is EPD, the following condition is satisfied: 1.50<Td/EPD<2.75. Therefore, it is favorable for utilizing the image lens assembly in wider applications and various devices by achieving the image lens assembly with compactness and a wide field of view.

When an Abbe number of one of all lens elements is Vi, and a refractive index of the lens element is Ni, at least one of the five lens elements satisfies the following condition:

$7.5<Vi/Ni<12.0$, wherein i=1, 2, 3, 4, 5. Therefore, it is favorable for correcting chromatic aberration.

When the maximum image height of the image lens assembly is ImgH, and an axial distance between the image-side surface of the fifth lens element and the image surface is BL, the following condition is satisfied: $2.5<ImgH/BL<5.0$. Therefore, it is favorable for achieving miniaturization of the image lens assembly.

When a maximum distance between an optical effective area of the image-side surface of the fifth lens element and the optical axis is Y52, and the focal length of the image lens assembly is f, the following condition is satisfied: $0.75<Y52/f<1.5$. Therefore, it is favorable for further miniaturize the image lens assembly.

Each of the aforementioned features of the image lens assembly can be utilized in various combinations for achieving the corresponding effects.

According to the image lens assembly of the present disclosure, the lens elements thereof can be made of glass or plastic materials. When the lens elements are made of glass materials, the distribution of the refractive power of the image lens assembly may be more flexible to design. The glass lens element can either be made by grinding or molding. When the lens elements are made of plastic materials, manufacturing costs can be effectively reduced. Furthermore, surfaces of each lens element can be arranged to be spherical or aspheric (ASP), wherein it is easier to fabricate the spherical surface. If the surfaces are arranged to be aspheric, more controllable variables can be obtained for eliminating aberrations thereof, and to further decrease the required amount of lens elements in the image lens assembly. Therefore, the total track length of the image lens assembly can also be reduced. The aspheric surfaces may be formed by plastic injection molding or glass molding.

According to the image lens assembly of the present disclosure, one or more of the lens material may optionally include an additive which provides light absorption or light interference, so as to alter the lens transmittance in a specific range of wavelength for reducing unwanted stray light or color deviation. For example, the additive may optionally filter out light in the wavelength range of 600 nm-800 nm for reducing excessive red light and/or near infra-red light, or may optionally filter out light in the wavelength range of 350 nm-450 nm to reduce excessive blue light and/or near ultra-violet light from interfering the final image. The additive may be homogenously mixed with plastic material to be used in manufacturing a mixed-material lens element by injection molding. Furthermore, the additive may be added in the coating on the lens element surface to achieve the aforementioned effects.

According to the image lens assembly of the present disclosure, when a surface of a lens element is aspheric, it indicates that the surface has an aspheric shape throughout its optically effective area or a portion(s) thereof.

According to the image lens assembly of the present disclosure, when the lens element has a convex surface, it indicates that the surface can be convex in the paraxial region thereof. When the lens element has a concave surface, it indicates that the surface can be concave in the paraxial region thereof. According to the image lens assembly of the present disclosure, the refractive power or the focal length of a lens element being positive or negative may refer to the refractive power or the focal length in a paraxial region of the lens element.

According to the image lens assembly of the present disclosure, a critical point is a non-axial point of the lens element surface where its tangent is perpendicular to the optical axis.

According to the image lens assembly of the present disclosure, the image surface of the image lens assembly, based on the corresponding image sensor, can be planar or curved. In particular, the image surface can be a concave curved surface facing towards the object side. According to the image lens assembly of the present disclosure, at least one image correcting element (such as a field flattener) can be selectively disposed between the lens element closest to the image side of the image lens assembly and the image surface on an imaging optical path so as to correct the image (such as the field curvature). Properties of the image correcting element, such as curvature, thickness, refractive index, position, surface shape (convex/concave, spherical/aspheric, diffractive and Fresnel etc.) can be adjusted according to the requirements of the imaging apparatus. In general, the image correcting element is preferably a thin piano-concave element having a concave surface towards the object side and is disposed close to the image surface.

Figure 28A:
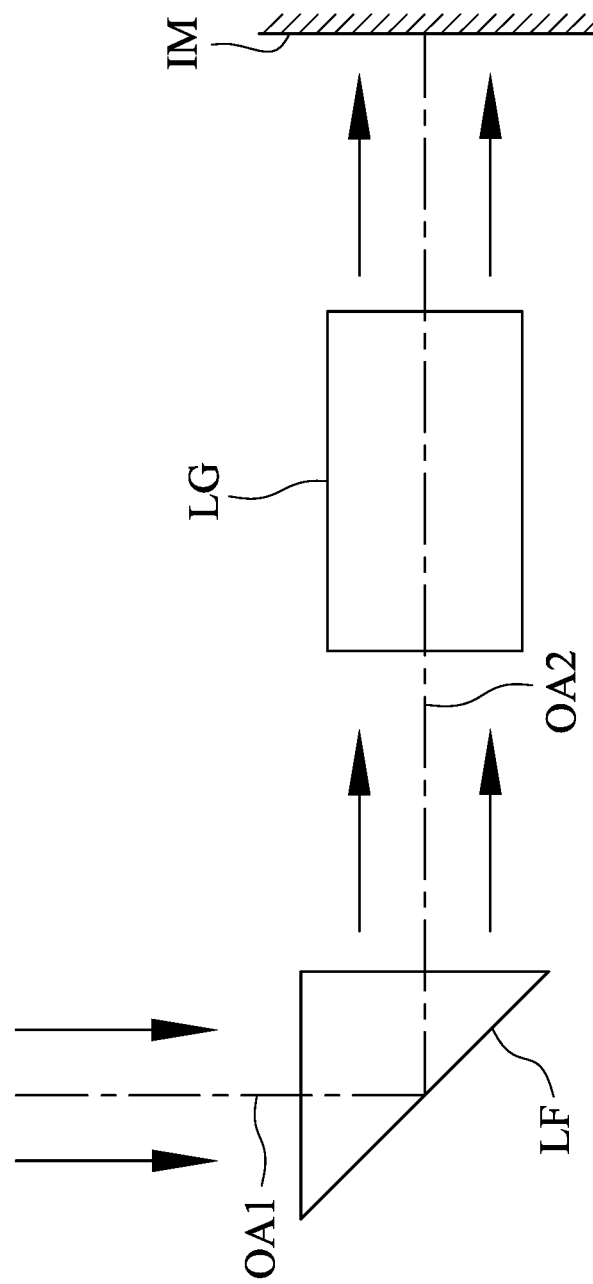
FIG. 28A is a schematic view of an arrangement of a light path folding element in the image lens assembly of the present disclosure.
Figure 28B:
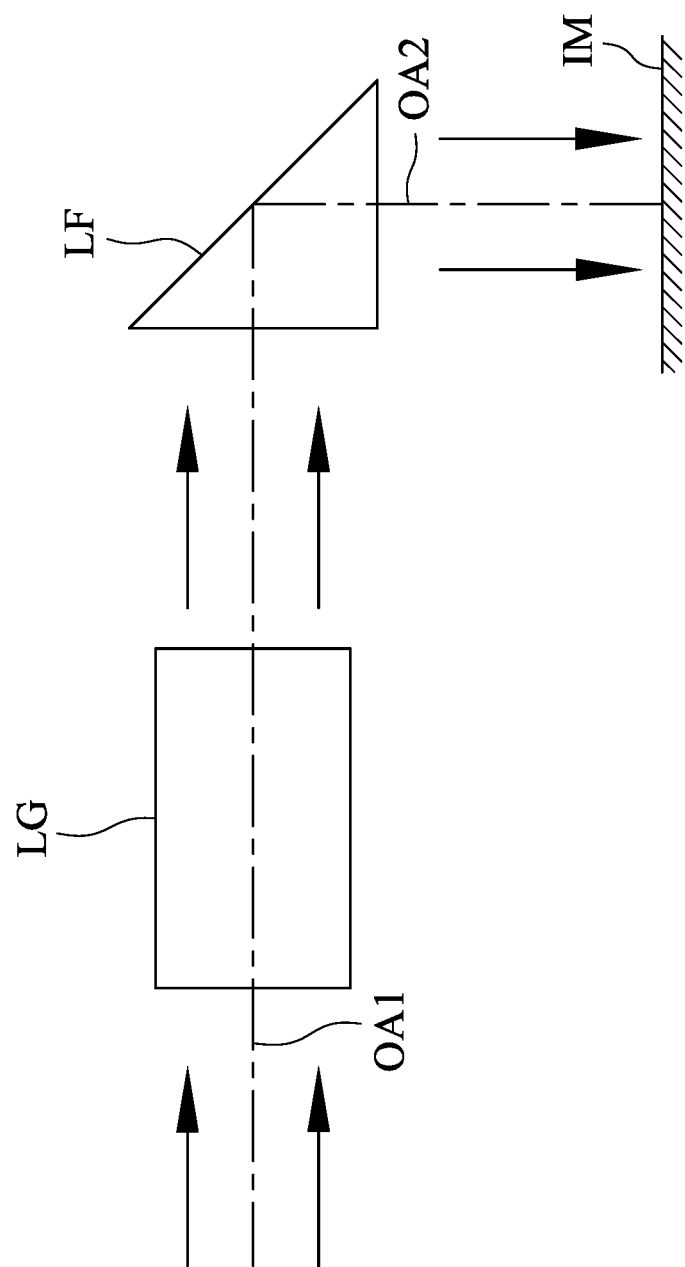
FIG. 28B is a schematic view of another arrangement of the light path folding element in the image lens assembly of the present disclosure.

According to the image lens assembly of the present disclosure, at least one element with light path folding function can be selectively disposed between the imaged object and the image surface, such as a prism or a mirror. Therefore it is favorable for providing high flexible space arrangement of the image lens assembly, so that the compactness of the electronic device would not be restricted by the optical total track length of the image lens assembly. FIG. 28A is a schematic view of an arrangement of a light path folding element LF in the image lens assembly of the present disclosure. FIG. 28B is a schematic view of another arrangement of the light path folding element LF in the image lens assembly of the present disclosure. As shown in FIGS. 28A and 28B, the image lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the image lens assembly as shown in FIG. 28A, or can be disposed between the lens group LG of the image lens assembly and the image surface IM as shown in FIG. 28B. Moreover, FIG. 28C is a schematic view of an arrangement of two light path folding elements LF1, LF2 in the image lens assembly of the present disclosure. As shown in FIG. 28C, the image lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the image lens assembly, and the light path folding element LF2 is disposed between the lens group LG of the image lens assembly and the image surface IM. The image lens assembly can also be selectively disposed with three or more light path folding element, the type, amount and location of the light path folding element will not be limited to the present disclosure.

According to the image lens assembly of the present disclosure, the image lens assembly can include at least one stop, such as an aperture stop, a glare stop or a field stop. Said glare stop or said field stop is for eliminating the stray light and thereby improving the image resolution thereof.

According to the image lens assembly of the present disclosure, an aperture stop can be configured as a front stop or a middle stop. A front stop disposed between the object and the first lens element can provide a longer distance between an exit pupil of the image lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the image lens assembly and thereby provides a wide field of view for the same.

According to the image lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, electrochromic material, a liquid crystal layer or the like. The amount of incoming light or the exposure time of the image can be controlled by the aperture adjusting unit to enhance the image moderation ability. In addition, the aperture adjusting unit can be the aperture stop of the image lens assembly according to the present disclosure, so as to moderate the image properties such as depth of field or the exposure speed by changing f-number.

According to the image lens assembly of the present disclosure, the image lens assembly can be utilized in 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned image lens assembly and an image sensor, wherein the image sensor is disposed on the image surface of the aforementioned image lens assembly. The light with a large incident angle can enter the image lens assembly by arranging the fourth lens element with primary positive refractive power, as well as arranging the refractive power of the first lens element and the second lens element. Also, the correction of chromatic aberration and light convergence in the peripheral region of the image can be achieved with other configurations. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following specific embodiments are provided for further explanation.

1st Embodiment

Figure 2:
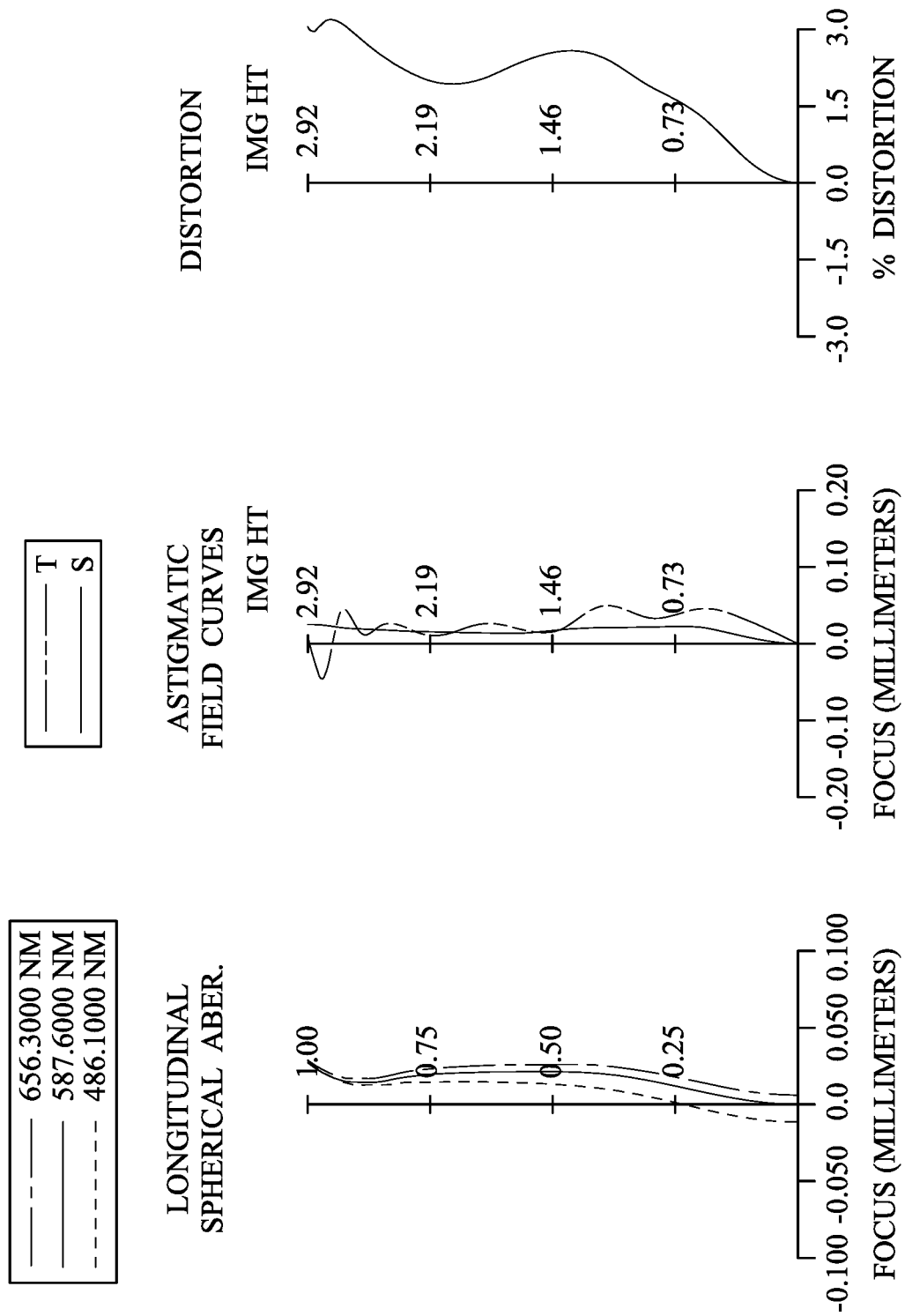
FIG. 2 shows, in order from left to right, spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows, in order from left to right, spherical aberration curves, astigmatic field curves and a distortion curve of the imaging apparatus of the 1st embodiment. In FIG. 1, the imaging apparatus according to the 1st embodiment includes an image lens assembly (its reference number is omitted) and an image sensor 180. The image lens assembly includes, in order from an object side to an image side along an optical path, an aperture stop 100, a first lens element 110, a stop 101, a second lens element 120, a third lens element 130, a fourth lens element 140, a fifth lens element 150, a filter 160 and an image surface 170, wherein the image sensor 180 is disposed on the image surface 170 of the image lens assembly. The image lens assembly includes five lens elements (110, 120, 130, 140, 150) without additional one or more lens elements inserted between the first lens element 110 and the fifth lens element 150.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material, and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material, and has the object-side surface 141 and the image-side surface 142 being both aspheric. Moreover, the object-side surface 141 of the fourth lens element 140 includes at least one concave critical point in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material, and has the object-side surface 151 and the image-side surface 152 being both aspheric. Moreover, the image-side surface 152 of the fifth lens element 150 includes at least one convex critical point in an off-axis region thereof.

The filter 160 is made of glass material and disposed between the fifth lens element 150 and the image surface 170 and will not affect a focal length of the image lens assembly.

The equation of the aspheric surface profiles of the aforementioned lens elements is expressed as follows:

$$X(Y) = (Y^2/R)/(1 + sqrt(1 - (1+k) \times (Y/R)^2)) + \sum_i (Ai) \times (Y^i);$$

wherein,
X is a displacement in parallel with an optical axis from the intersection point of the aspheric surface and the optical axis to a point at a distance Y from the optical axis on the aspheric surface;
Y is the vertical distance from the point on the aspheric surface to the optical axis;
R is the curvature radius;
k is the conic coefficient; and
Ai is the i-th aspheric coefficient.

In the image lens assembly according to the 1st embodiment, when a focal length of the image lens assembly is f, an f-number of the image lens assembly is Fno, and half of a maximum field of view of the image lens assembly is HFOV, these parameters have the following values: f=2.82 mm; Fno=2.05; and HFOV=45.1 degrees.

In the image lens assembly according to the 1st embodiment, when the maximum field of view of the image lens assembly is FOV, the following condition is satisfied: FOV=90.2 degrees.

In the image lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, a minimum among Abbe numbers of all lens elements of the image lens assembly is Vmin, a refractive index of the first lens element 110 is N1, a refractive index of the second lens element 120 is N2, a refractive index of the third lens element 130 is N3, a refractive index of the fourth lens element 140 is N4, and a refractive index of the fifth lens element 150 is N5, the following conditions are satisfied: Vmin=20.4; V2+V3=57.8; V1/N1=36.46; V2/N2=12.29; V3/N3=23.91; V4/N4=36.26; and V5/N5=36.26. In the 1st embodiment, V1=55.9, V2=20.4, V3=37.4, V4=56.0, V5=56.0, and the minimum among Abbe numbers Vmin=V2.

In the image lens assembly according to the 1st embodiment, when the focal length of the image lens assembly is f, a curvature radius of the object-side surface 141 of the fourth lens element 140 is R7, and a curvature radius of the image-side surface 142 of the fourth lens element 140 is R8, the following conditions are satisfied: f/R7=1.13; and f/R8=−3.41.

In the image lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and a sum of all axial distances between adjacent lens elements of the image lens assembly is ΣAT, the following conditions are satisfied: CT1/CT2=2.78; CT1/CT3=2.05; CT1/CT4=0.92; CT1/CT5=1.72; CT1/ΣAT=0.92; T12/CT2=1.08; T12/T23=1.01; T12/T34=2.01; and T12/T45=3.35.

In the image lens assembly according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and the focal length of the image lens assembly is f, the following conditions are satisfied: f3/f1=−1.58; |f3/f2|=0.65; and (f/f4)−(f/f5)=4.26.

In the image lens assembly according to the 1st embodiment, when an axial distance between the object-side surface 111 of the first lens element 110 and the image-side surface 152 of the fifth lens element 150 is Td, and an entrance pupil diameter of the image lens assembly is EPD, the following condition is satisfied: Td/EPD=2.07.

In the image lens assembly according to the 1st embodiment, when an axial distance between the object-side surface 111 of the first lens element 110 and the image surface 170 is TL, a maximum image height of the image lens assembly is ImgH, and an axial distance between the image-side surface 152 of the fifth lens element 150 and the image surface 170 is BL, the following conditions are satisfied: TL/ImgH=1.36; and ImgH/BL=2.60.

In the image lens assembly according to the 1st embodiment, when a distance between the at least one concave critical point of the object-side surface 141 of the fourth lens element 140 and the optical axis is Yc41, and the focal length of the image lens assembly is f, the following conditions are satisfied: Yc41=1.15; and Yc41/f=0.41.

In the image lens assembly according to the 1st embodiment, when a maximum distance between an optical effective area of the image-side surface 152 of the fifth lens element 150 and the optical axis is Y52, and the focal length of the image lens assembly is f, the following conditions are satisfied: Y52=2.38; and Y52/f=0.84.

The detailed optical data of the 1st embodiment are shown in Table 1 and the aspheric surface data are shown in Table 2 below.

TABLE 1

1st Embodiment
f = 2.82 mm, Fno = 2.05, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.059 | | | | |
| 2 | Lens 1 | 1.806 | ASP | 0.619 | Plastic | 1.534 | 55.9 | 3.33 |
| 3 | | −100.000 | ASP | 0.068 | | | | |
| 4 | Stop | Plano | | 0.173 | | | | |
| 5 | Lens 2 | −22.596 | ASP | 0.223 | Plastic | 1.660 | 20.4 | −8.15 |
| 6 | | 7.081 | ASP | 0.238 | | | | |
| 7 | Lens 3 | 11.296 | ASP | 0.302 | Plastic | 1.566 | 37.4 | −5.28 |
| 8 | | 2.340 | ASP | 0.120 | | | | |
| 9 | Lens 4 | 2.500 | ASP | 0.671 | Plastic | 1.544 | 56.0 | 1.23 |
| 10 | | −0.827 | ASP | 0.072 | | | | |
| 11 | Lens 5 | 3.227 | ASP | 0.359 | Plastic | 1.544 | 56.0 | −1.43 |
| 12 | | 0.603 | ASP | 0.600 | | | | |

TABLE 1-continued

1st Embodiment
f = 2.82 mm, Fno = 2.05, HFOV = 45.1 deg.

| Surface # | | Curvature Radius | Thickness | Material | Index | Abbe # | Focal Length |
|---|---|---|---|---|---|---|---|
| 13 | Filter | Plano | 0.210 | Glass | 1.517 | 64.2 | — |
| 14 | | Plano | 0.315 | | | | |
| 15 | Image | Plano | 0.000 | | | | |

Reference wavelength is 587.6 nm (d-line).
Effective radius of Surface 4 (Stop 101) is 0.710 mm.

TABLE 2

Aspheric Coefficients

| | Surface # | | | | |
|---|---|---|---|---|---|
| | 2 | 3 | 5 | 6 | 7 |
| k = | −1.0361E+01 | 0.0000E+00 | 0.0000E+00 | 5.4130E+01 | 0.0000E+00 |
| A4 = | 1.7707E−01 | −2.0012E−01 | −3.4667E−01 | −1.8027E−01 | −2.8097E−01 |
| A6 = | −2.8512E−01 | −6.8079E−02 | 3.8213E−01 | 5.0746E−02 | 5.2526E−01 |
| A8 = | 1.0014E−01 | −4.5967E−02 | −1.3748E+00 | 3.4867E−01 | −1.9881E+00 |
| A10 = | 1.6200E−01 | −2.8868E−01 | 3.2226E+00 | −4.9494E−01 | 5.0831E+00 |
| A12 = | −4.5583E−01 | 9.9832E−01 | −2.7806E+00 | 4.4835E−01 | −7.6895E+00 |
| A14 = | 1.0547E−01 | −6.7336E−01 | 8.8231E−01 | −2.0728E−01 | 6.8599E+00 |
| A16 = | | | | | −3.2964E+00 |
| A18 = | | | | | 6.5174E−01 |

| | Surface # | | | | |
|---|---|---|---|---|---|
| | 8 | 9 | 10 | 11 | 12 |
| k = | −6.4390E+00 | −1.5840E−01 | −1.0000E+00 | −4.1143E−03 | −3.6578E+00 |
| A4 = | −6.0590E−01 | −4.3576E−01 | 5.6569E−01 | −6.2411E−01 | −3.5860E−01 |
| A6 = | 1.6276E+00 | 1.5654E+00 | −1.1077E+00 | 9.1018E−01 | 5.7269E−01 |
| A8 = | −3.9229E+00 | −3.4379E+00 | 2.5493E+00 | −1.0986E+00 | −7.2151E−01 |
| A10 = | 5.0937E+00 | 5.0666E+00 | −3.3380E+00 | 8.3225E−01 | 6.4560E−01 |
| A12 = | −3.2019E+00 | −5.3052E+00 | 2.5763E+00 | −3.4690E−01 | −4.0628E−01 |
| A14 = | −2.1980E−02 | 3.9344E+00 | −1.2446E+00 | 5.9414E−02 | 1.8037E−01 |
| A16 = | 1.4211E+00 | −2.0431E+00 | 3.8303E−01 | 1.1054E−02 | −5.6477E−02 |
| A18 = | −8.2428E−01 | 7.2669E−01 | −7.3157E−02 | −8.3965E−03 | 1.2357E−02 |
| A20 = | 1.5114E−01 | −1.6864E−01 | 7.9162E−03 | 2.0455E−03 | −1.8443E−03 |
| A22 = | | 2.2969E−02 | −3.7108E−04 | −2.6531E−04 | 1.7864E−04 |
| A24 = | | −1.3894E−03 | | 1.8330E−05 | −1.0108E−05 |
| A26 = | | | | −5.3223E−07 | 2.5332E−07 |

Table 1 shows the detailed optical data of FIG. 1 of the 1st embodiment, wherein the curvature radius, thickness and the focal length are shown in millimeters (mm), Surface numbers 0-15 represent the surfaces sequentially arranged from the object side to the image side, and the refractive index is measured in accordance with the reference wavelength. Table 2 shows the aspheric surface data of the 1st embodiment, wherein k represents the conic coefficient of the equation of the aspheric surface profiles, and A4-A26 represent the aspheric coefficients of each surface ranging from the 4th order to the 26th order. The tables presented below for each embodiment correspond to the schematic view and aberration curves of each embodiment, and term definitions of the tables are the same as those in Table 1 and Table 2 of the 1st embodiment. Therefore, an explanation in this regard will not be provided again.

2nd Embodiment

Figure 3:
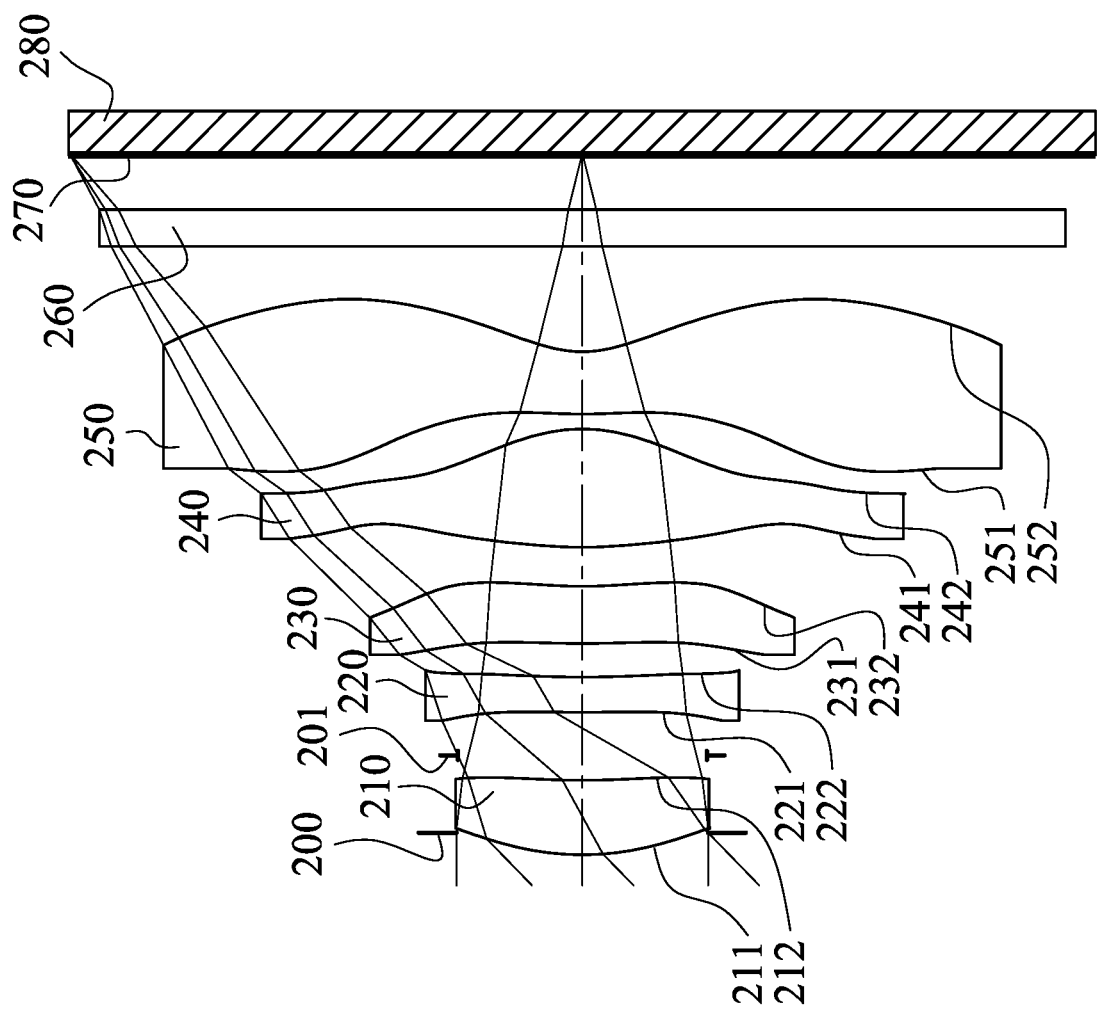
FIG. 3 is a schematic view of an imaging apparatus according to the 2nd embodiment of the present disclosure.
Figure 4:
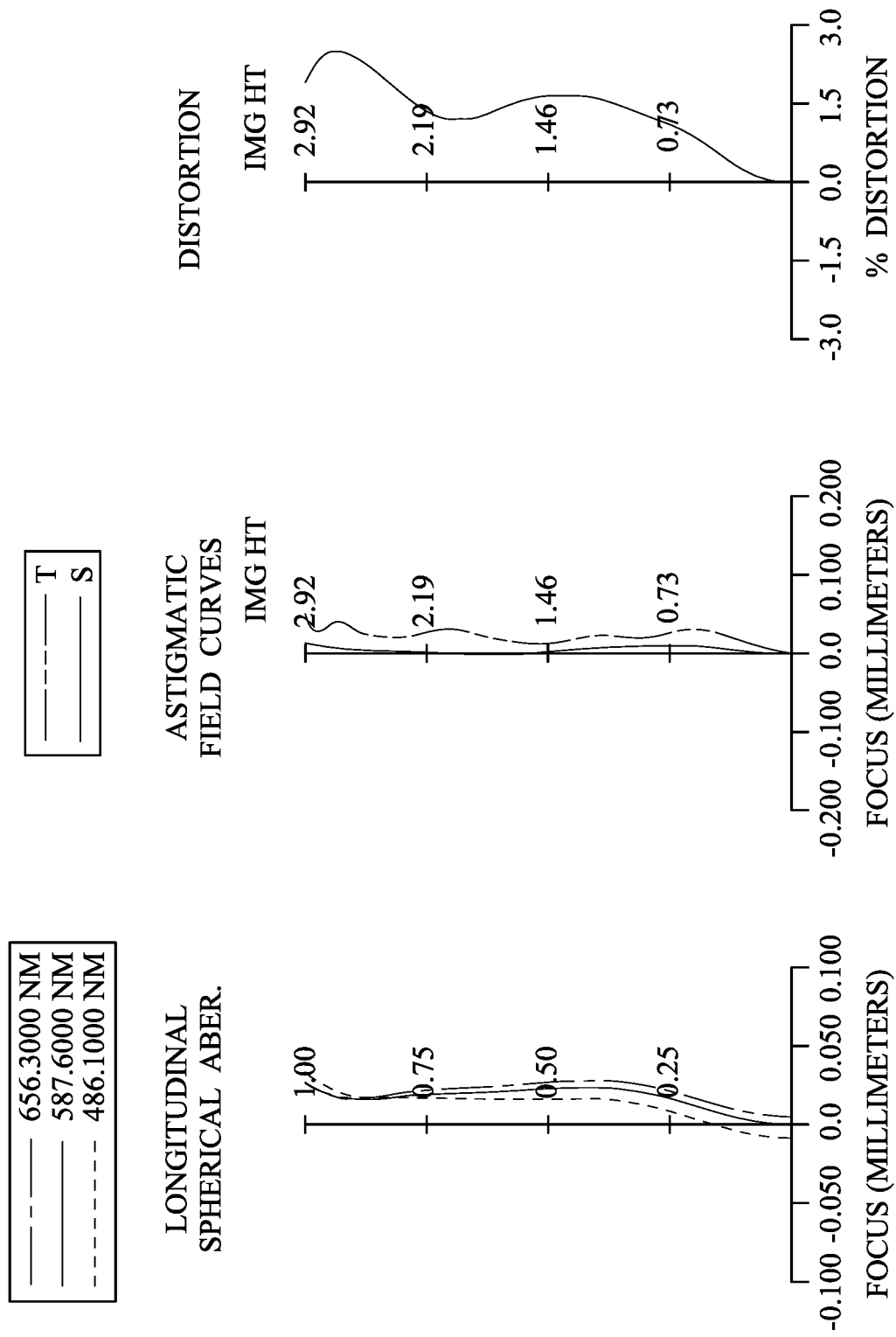
FIG. 4 shows, in order from left to right, spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows, in order from left to right, spherical aberration curves, astigmatic field curves and a distortion curve of the imaging apparatus of the 2nd embodiment. In FIG. 3, the imaging apparatus according to the 2nd embodiment includes an image lens assembly (its reference number is omitted) and an image sensor 280. The image lens assembly includes, in order from an object side to an image side along an optical path, an aperture stop 200, a first lens element 210, a stop 201, a second lens element 220, a third lens element 230, a fourth lens element 240, a fifth lens element 250, a filter 260 and an image surface 270, wherein the image sensor 280 is disposed on the image surface 270 of the image lens assembly. The image lens assembly includes five lens elements (210, 220, 230, 240, 250) without additional one or more lens elements inserted between the first lens element 210 and the fifth lens element 250.

The first lens element 210 with positive refractive power has an object-side surface 211 being convex in a paraxial region thereof and an image-side surface 212 being concave in a paraxial region thereof. The first lens element 210 is made of plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material, and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material, and has the object-side surface 241 and the image-side surface 242 being both aspheric. Moreover, the object-side surface 241 of the fourth lens element 240 includes at least one concave critical point in an off-axis region thereof.

The fifth lens element 250 with negative refractive power has an object-side surface 251 being convex in a paraxial region thereof and an image-side surface 252 being concave in a paraxial region thereof. The fifth lens element 250 is made of plastic material, and has the object-side surface 251 and the image-side surface 252 being both aspheric. Moreover, the image-side surface 252 of the fifth lens element 250 includes at least one convex critical point in an off-axis region thereof.

The filter 260 is made of glass material and disposed between the fifth lens element 250 and the image surface 270 and will not affect a focal length of the image lens assembly.

The detailed optical data of the 2nd embodiment are shown in Table 3 and the aspheric surface data are shown in Table 4 below.

TABLE 3

2nd Embodiment
f = 2.94 mm, Fno = 2.05, HFOV = 44.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.125 | | | | |
| 2 | Lens 1 | 1.613 | ASP | 0.426 | Plastic | 1.545 | 56.1 | 3.91 |
| 3 | | 6.030 | ASP | 0.141 | | | | |
| 4 | Stop | Plano | | 0.246 | | | | |
| 5 | Lens 2 | 18.701 | ASP | 0.200 | Plastic | 1.705 | 14.0 | −12.54 |
| 6 | | 5.977 | ASP | 0.192 | | | | |
| 7 | Lens 3 | 5.237 | ASP | 0.326 | Plastic | 1.584 | 28.2 | −8.47 |
| 8 | | 2.486 | ASP | 0.223 | | | | |
| 9 | Lens 4 | 2.717 | ASP | 0.674 | Plastic | 1.534 | 55.9 | 1.40 |
| 10 | | −0.942 | ASP | 0.086 | | | | |
| 11 | Lens 5 | 3.250 | ASP | 0.355 | Plastic | 1.545 | 56.1 | −1.54 |
| 12 | | 0.641 | ASP | 0.600 | | | | |
| 13 | Filter | Plano | | 0.210 | Glass | 1.517 | 64.2 | — |
| 14 | | Plano | | 0.313 | | | | |
| 15 | Image | Plano | | 0.000 | | | | |

Reference wavelength is 587.6 nm (d-line).
Effective radius of Surface 4 (Stop 201) is 0.710 mm.

TABLE 4

Aspheric Coefficients

| | Surface # | | | | |
|---|---|---|---|---|---|
| | 2 | 3 | 5 | 6 | 7 |
| k = | −7.4957E+00 | 0.0000E+00 | 0.0000E+00 | 3.0952E+01 | −9.8901E−01 |
| A4 = | 1.8040E−01 | −6.1839E−02 | −1.0575E−01 | −8.9962E−02 | −4.5746E−01 |
| A6 = | −1.0445E−01 | −2.6044E−01 | −4.2122E−01 | −2.1885E−01 | 1.3237E+00 |
| A8 = | −5.0485E−01 | 7.7693E−01 | 1.4453E+00 | 7.2363E−01 | −4.2163E+00 |
| A10 = | 1.5263E+00 | −2.1283E+00 | −3.5019E+00 | −1.2869E+00 | 9.0963E+00 |
| A12 = | −2.1350E+00 | 2.5574E+00 | 4.4947E+00 | 1.3041E+00 | −1.2292E+01 |
| A14 = | 1.0192E+00 | −1.1188E+00 | −1.9772E+00 | −4.5531E−01 | 1.0083E+01 |
| A16 = | | | | | −4.5416E+00 |
| A18 = | | | | | 8.5052E−01 |

| | Surface # | | | | |
|---|---|---|---|---|---|
| | 8 | 9 | 10 | 11 | 12 |
| k = | −3.9031E+00 | −4.3765E+00 | −9.2989E−01 | 5.8583E−02 | −3.8803E+00 |
| A4 = | −6.7137E−01 | −2.3525E−01 | 3.9308E−01 | −8.0521E−01 | −3.9905E−01 |
| A6 = | 1.5981E+00 | 4.3653E−01 | −6.6978E−01 | 1.2441E+00 | 6.4482E−01 |
| A8 = | −3.5593E+00 | −1.0601E−01 | 1.5323E+00 | −1.3290E+00 | −7.6235E−01 |
| A10 = | 4.9517E+00 | −8.9392E−01 | −1.8012E+00 | 9.1955E−01 | 6.3372E−01 |
| A12 = | −4.1211E+00 | 1.8320E+00 | 1.1757E+00 | −3.9333E−01 | −3.7258E−01 |
| A14 = | 1.7411E+00 | −1.9288E+00 | −4.6249E−01 | 9.5113E−02 | 1.5557E−01 |
| A16 = | −6.6411E−03 | 1.2431E+00 | 1.1286E−01 | −6.6889E−03 | −4.6057E−02 |

TABLE 4-continued

| Aspheric Coefficients | | | | |
|---|---|---|---|---|
| A18 = | −2.7590E−01 | −5.0134E−01 | −1.6782E−02 | −3.3453E−03 | 9.5702E−03 |
| A20 = | 7.0291E−02 | 1.2316E−01 | 1.3981E−03 | 1.2296E−03 | −1.3621E−03 |
| A22 = | | −1.6854E−02 | −5.0315E−05 | −1.9716E−04 | 1.2631E−04 |
| A24 = | | 9.8546E−04 | | 1.6403E−05 | −6.8695E−06 |
| A26 = | | | | −5.7635E−07 | 1.6611E−07 |

In the 2nd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.94 | CT1/CT5 | 1.20 |
| Fno | 2.05 | CT1/ΣAT | 0.48 |
| HFOV [deg.] | 44.1 | T12/CT2 | 1.94 |
| FOV [deg.] | 88.2 | T12/T23 | 2.02 |
| Vmin | 14.0 | T12/T34 | 1.74 |
| V2 + V3 | 42.2 | T12/T45 | 4.50 |
| V1/N1 | 36.30 | f3/f1 | −2.17 |
| V2/N2 | 8.21 | |f3/f2| | 0.68 |
| V3/N3 | 17.83 | (f/f4)-(f/f5) | 4.01 |
| V4/N4 | 36.46 | Td/EPD | 2.00 |
| V5/N5 | 36.30 | TL/ImgH | 1.37 |
| f/R7 | 1.08 | ImgH/BL | 2.60 |
| f/R8 | −3.12 | Yc41 | 1.14 |
| CT1/CT2 | 2.13 | Yc41/f | 0.39 |
| CT1/CT3 | 1.31 | Y52 | 2.39 |
| CT1/CT4 | 0.63 | Y52/f | 0.81 |

3rd Embodiment

Figure 5:
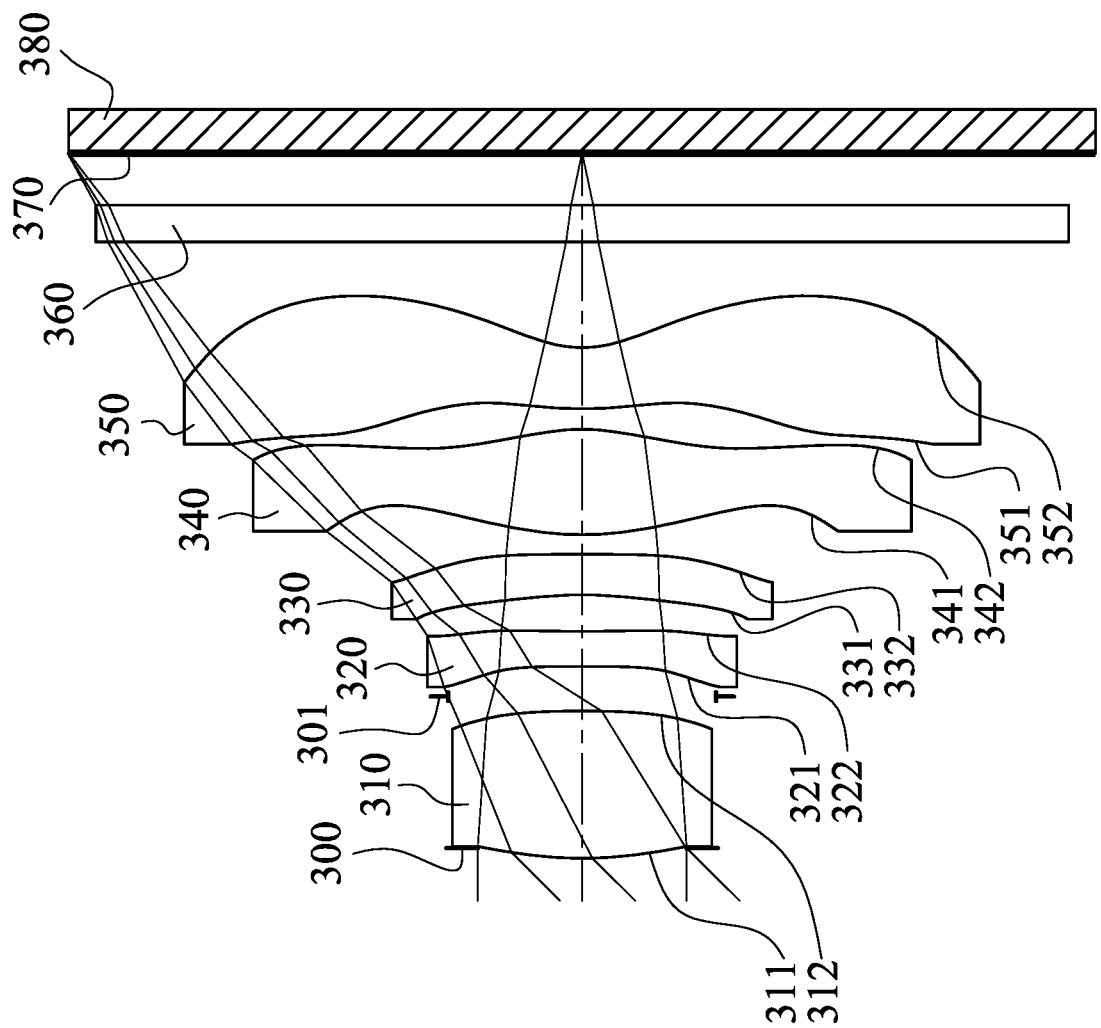
FIG. 5 is a schematic view of an imaging apparatus according to the 3rd embodiment of the present disclosure.
Figure 6:
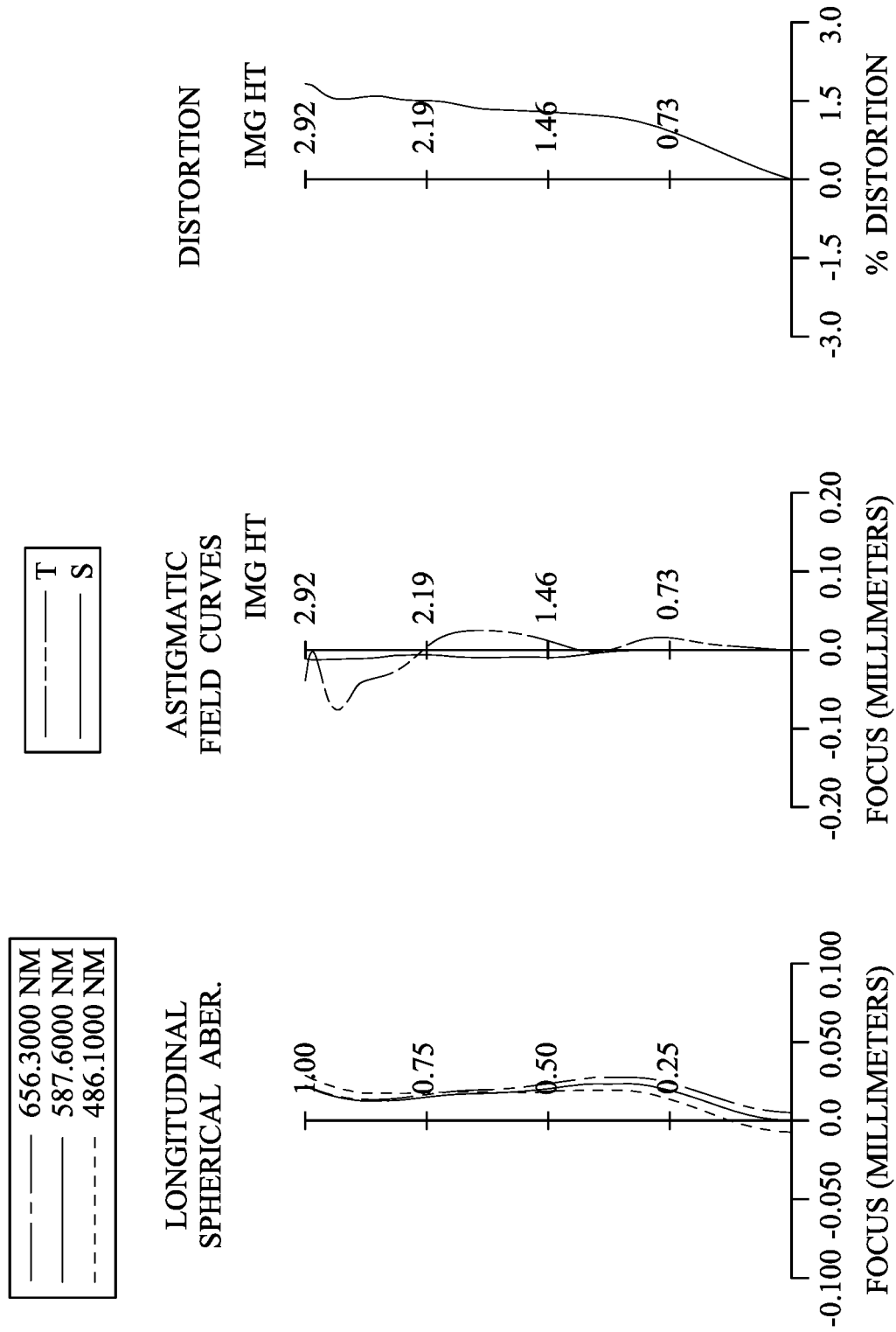
FIG. 6 shows, in order from left to right, spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows, in order from left to right, spherical aberration curves, astigmatic field curves and a distortion curve of the imaging apparatus of the 3rd embodiment. In FIG. 5, the imaging apparatus according to the 3rd embodiment includes an image lens assembly (its reference number is omitted) and an image sensor 380. The image lens assembly includes, in order from an object side to an image side along an optical path, an aperture stop 300, a first lens element 310, a stop 301, a second lens element 320, a third lens element 330, a fourth lens element 340, a fifth lens element 350, a filter 360 and an image surface 370, wherein the image sensor 380 is disposed on the image surface 370 of the image lens assembly. The image lens assembly includes five lens elements (310, 320, 330, 340, 350) without additional one or more lens elements inserted between the first lens element 310 and the fifth lens element 350.

The first lens element 310 with positive refractive power has an object-side surface 311 being convex in a paraxial region thereof and an image-side surface 312 being convex in a paraxial region thereof. The first lens element 310 is made of glass material, and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material, and has the object-side surface 321 and the image-side surface 322 being both aspheric.

The third lens element 330 with negative refractive power has an object-side surface 331 being concave in a paraxial region thereof and an image-side surface 332 being convex in a paraxial region thereof. The third lens element 330 is made of plastic material, and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material, and has the object-side surface 341 and the image-side surface 342 being both aspheric. Moreover, the object-side surface 341 of the fourth lens element 340 includes at least one concave critical point in an off-axis region thereof.

The fifth lens element 350 with negative refractive power has an object-side surface 351 being convex in a paraxial region thereof and an image-side surface 352 being concave in a paraxial region thereof. The fifth lens element 350 is made of plastic material, and has the object-side surface 351 and the image-side surface 352 being both aspheric. Moreover, the image-side surface 352 of the fifth lens element 350 includes at least one convex critical point in an off-axis region thereof.

The filter 360 is made of glass material and disposed between the fifth lens element 350 and the image surface 370 and will not affect a focal length of the image lens assembly.

The detailed optical data of the 3rd embodiment are shown in Table 5 and the aspheric surface data are shown in Table 6 below.

TABLE 5

3rd Embodiment
f = 2.84 mm, Fno = 2.40, HFOV = 45.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.058 | | | | |
| 2 | Lens 1 | 2.336 ASP | 0.836 | Glass | 1.587 | 59.5 | 3.10 |

TABLE 5-continued

3rd Embodiment
f = 2.84 mm, Fno = 2.40, HFOV = 45.1 deg.

| Surface # | | Curvature Radius | Thickness | | Material | Index | Abbe # | Focal Length |
|---|---|---|---|---|---|---|---|---|
| 3 | | −7.144 | ASP | 0.082 | | | | |
| 4 | Stop | Plano | | 0.171 | | | | |
| 5 | Lens 2 | −74.786 | ASP | 0.200 | Plastic | 1.686 | 18.4 | −16.24 |
| 6 | | 13.105 | ASP | 0.207 | | | | |
| 7 | Lens 3 | −2.188 | ASP | 0.230 | Plastic | 1.634 | 23.8 | −3.53 |
| 8 | | −99.289 | ASP | 0.112 | | | | |
| 9 | Lens 4 | 1.956 | ASP | 0.598 | Plastic | 1.548 | 45.9 | 1.40 |
| 10 | | −1.119 | ASP | 0.117 | | | | |
| 11 | Lens 5 | 2.517 | ASP | 0.347 | Plastic | 1.545 | 56.0 | −1.68 |
| 12 | | 0.640 | ASP | 0.600 | | | | |
| 13 | Filter | Plano | | 0.210 | Glass | 1.517 | 64.2 | — |
| 14 | | Plano | | 0.293 | | | | |
| 15 | Image | Plano | | 0.000 | | | | |

Reference wavelength is 587.6 nm (d-line).
Effective radius of Surface 4 (Stop 301) is 0.760 mm.

TABLE 6

Aspheric Coefficients

| | Surface # | | | | |
|---|---|---|---|---|---|
| | 2 | 3 | 5 | 6 | 7 |
| k = | −1.8470E+01 | 0.0000E+00 | 0.0000E+00 | −8.1248E+01 | −2.3656E−01 |
| A4 = | 7.2867E−02 | −2.1731E−01 | −3.8019E−01 | 9.4051E−02 | 4.9636E−01 |
| A6 = | 5.3055E−01 | −3.2656E−01 | −7.8027E−01 | −1.6970E+00 | −1.1161E+00 |
| A8 = | −5.9582E+00 | 1.1926E+00 | 2.2367E−01 | 4.5671E+00 | 1.5667E+00 |
| A10 = | 2.4537E+01 | −2.2452E+00 | 7.2021E+00 | −7.3108E+00 | −9.8106E−01 |
| A12 = | −4.8919E+01 | 3.2662E+00 | −1.1840E+01 | 8.9707E+00 | −7.7269E−01 |
| A14 = | 3.7985E+01 | −2.1040E+00 | 5.6410E+00 | −6.9804E+00 | 1.5889E+00 |
| A16 = | | | | 2.3339E+00 | −7.3639E−01 |

| | Surface # | | | | |
|---|---|---|---|---|---|
| | 8 | 9 | 10 | 11 | 12 |
| k = | 9.9000E+01 | −6.3131E−01 | −1.0430E+00 | −4.5164E−03 | −1.0002E+00 |
| A4 = | −8.9265E−02 | 6.6765E−02 | 1.1835E+00 | 8.1931E−02 | −1.2883E+00 |
| A6 = | −7.2676E−01 | −8.3648E−01 | −3.2787E+00 | −2.7967E+00 | 1.7428E+00 |
| A8 = | 1.9278E+00 | 2.0855E+00 | 7.0433E+00 | 7.6288E+00 | −1.8735E+00 |
| A10 = | −2.2503E+00 | −3.1793E+00 | −9.9792E+00 | −1.1222E+01 | 1.5596E+00 |
| A12 = | 1.3464E+00 | 3.2204E+00 | 9.3880E+00 | 1.0543E+01 | −9.9525E−01 |
| A14 = | −3.8715E−01 | −2.2704E+00 | −6.0310E+00 | −6.7206E+00 | 4.7639E−01 |
| A16 = | 4.6180E−02 | 1.1154E+00 | 2.6905E+00 | 2.9936E+00 | −1.6634E−01 |
| A18 = | | −3.7044E−01 | −8.3422E−01 | −9.4311E−01 | 4.0964E−02 |
| A20 = | | 7.8312E−02 | 1.7649E−01 | 2.0941E−01 | −6.7737E−03 |
| A22 = | | −9.3727E−03 | −2.4310E−02 | −3.2068E−02 | 6.8441E−04 |
| A24 = | | 4.7410E−04 | 1.9650E−03 | 3.2234E−03 | −3.2306E−05 |
| A26 = | | | −7.0713E−05 | −1.9132E−04 | −3.3435E−07 |
| A28 = | | | | 5.0782E−06 | 7.1030E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.84 | CT1/CT5 | 2.41 |
| Fno | 2.40 | CT1/ΣAT | 1.21 |
| HFOV [deg.] | 45.1 | T12/CT2 | 1.27 |
| FOV [deg.] | 90.2 | T12/T23 | 1.22 |
| Vmin | 18.4 | T12/T34 | 2.26 |
| V2 + V3 | 42.2 | T12/T45 | 2.16 |
| V1/N1 | 37.48 | f3/f1 | −1.14 |
| V2/N2 | 10.90 | |f3/f2| | 0.22 |
| V3/N3 | 14.59 | (f/f4)−(f/f5) | 3.72 |
| V4/N4 | 29.65 | Td/EPD | 2.45 |
| V5/N5 | 36.27 | TL/ImgH | 1.37 |
| f/R7 | 1.45 | ImgH/BL | 2.65 |
| f/R8 | −2.54 | Yc41 | 1.07 |
| CT1/CT2 | 4.18 | Yc41/f | 0.37 |

-continued

| 3rd Embodiment | | | |
|---|---|---|---|
| CT1/CT3 | 3.63 | Y52 | 2.26 |
| CT1/CT4 | 1.40 | Y52/f | 0.79 |

4th Embodiment

Figure 7:
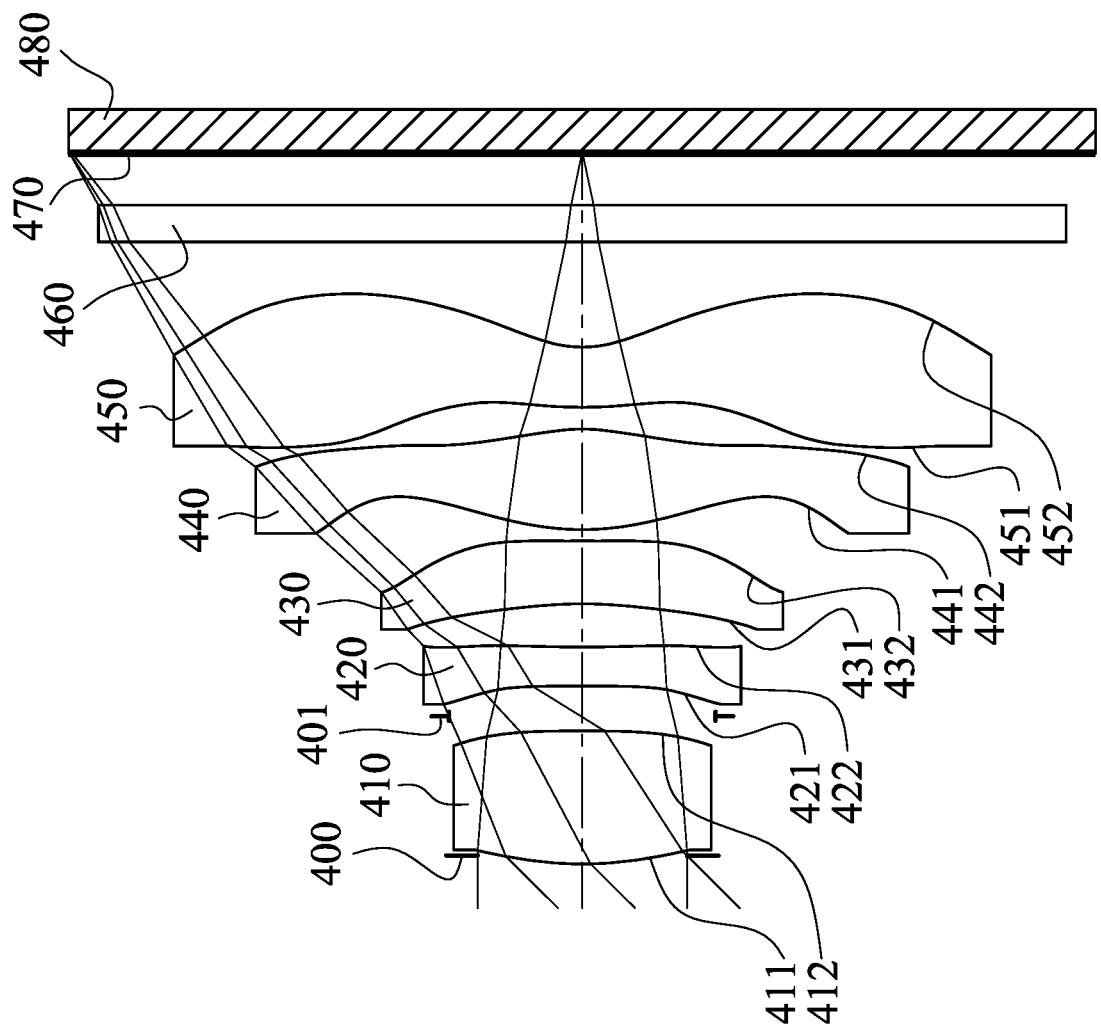
FIG. 7 is a schematic view of an imaging apparatus according to the 4th embodiment of the present disclosure.
Figure 8:
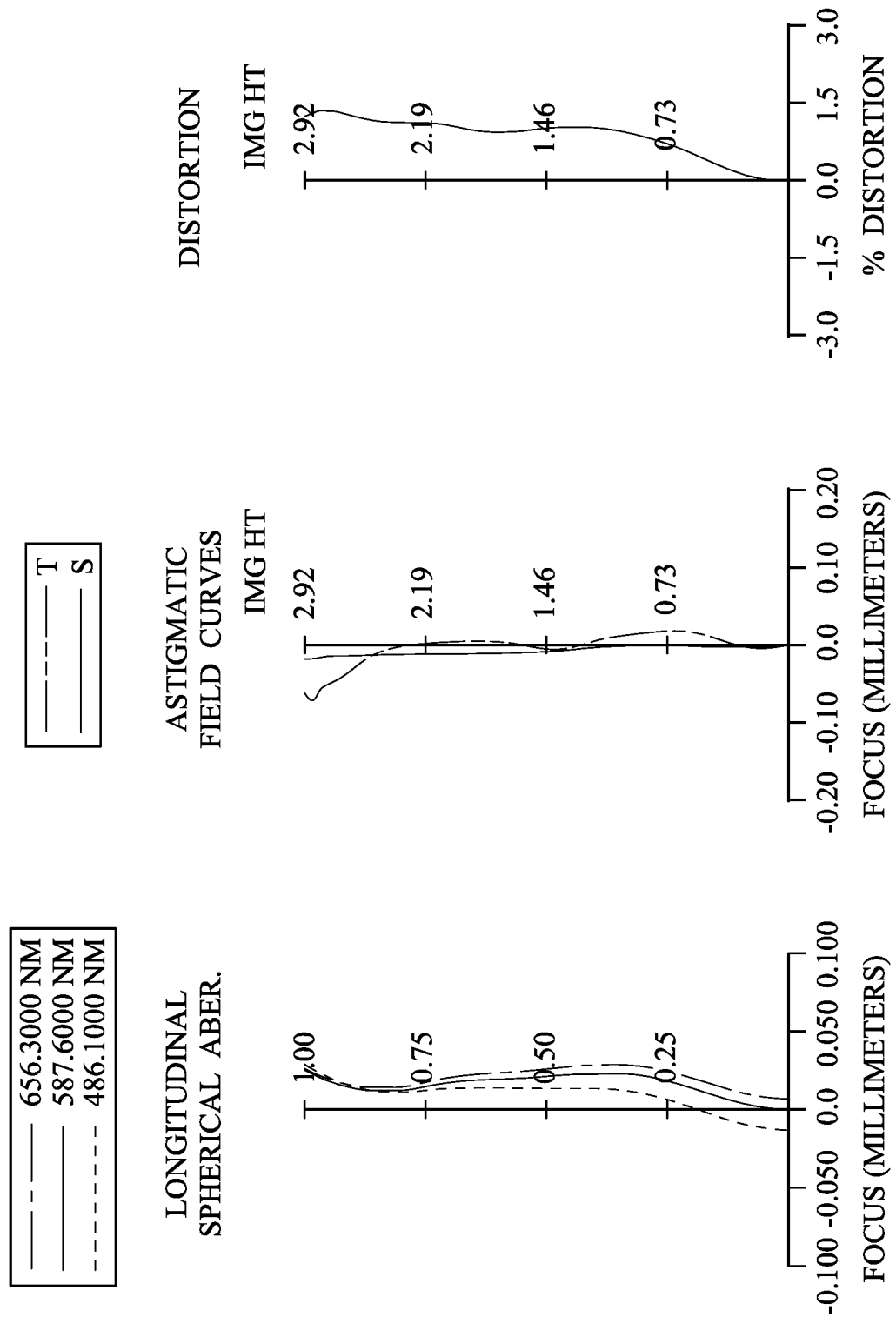
FIG. 8 shows, in order from left to right, spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows, in order from left to right, spherical aberration curves, astigmatic field curves and a distortion curve of the imaging apparatus of the 4th embodiment. In FIG. 7, the imaging apparatus according to the 4th embodiment includes an image lens assembly (its reference number is omitted) and an image sensor 480. The image lens assembly includes, in order from an object side to an image side along an optical path, an aperture stop 400, a first lens element 410, a stop 401, a second lens element 420, a third lens element 430, a fourth lens element 440, a fifth lens element 450, a filter 460 and an image surface 470, wherein the image sensor 480 is disposed on the image surface 470 of the image lens assembly. The image lens assembly includes five lens elements (410, 420, 430, 440, 450) without additional one or more lens elements inserted between the first lens element 410 and the fifth lens element 450.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material, and has the object-side surface 441 and the image-side surface 442 being both aspheric. Moreover, the object-side surface 441 of the fourth lens element 440 includes at least one concave critical point in an off-axis region thereof.

The fifth lens element 450 with negative refractive power has an object-side surface 451 being convex in a paraxial region thereof and an image-side surface 452 being concave in a paraxial region thereof. The fifth lens element 450 is made of plastic material, and has the object-side surface 451 and the image-side surface 452 being both aspheric. Moreover, the image-side surface 452 of the fifth lens element 450 includes at least one convex critical point in an off-axis region thereof.

The filter 460 is made of glass material and disposed between the fifth lens element 450 and the image surface 470 and will not affect a focal length of the image lens assembly.

The detailed optical data of the 4th embodiment are shown in Table 7 and the aspheric surface data are shown in Table 8 below.

TABLE 7

4th Embodiment
f = 2.86 mm, Fno = 2.40, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.048 | | | | |
| 2 | Lens 1 | 2.106 | ASP | 0.760 | Plastic | 1.545 | 56.1 | 3.33 |
| 3 | | −11.344 | ASP | 0.083 | | | | |
| 4 | Stop | Plano | | 0.172 | | | | |
| 5 | Lens 2 | 79.915 | ASP | 0.223 | Plastic | 1.686 | 18.4 | −12.09 |
| 6 | | 7.508 | ASP | 0.247 | | | | |
| 7 | Lens 3 | −2.396 | ASP | 0.359 | Plastic | 1.566 | 37.4 | −3.88 |
| 8 | | 27.386 | ASP | 0.065 | | | | |
| 9 | Lens 4 | 1.645 | ASP | 0.573 | Plastic | 1.544 | 56.0 | 1.34 |
| 10 | | −1.149 | ASP | 0.125 | | | | |
| 11 | Lens 5 | 2.627 | ASP | 0.343 | Plastic | 1.545 | 56.1 | −1.61 |
| 12 | | 0.628 | ASP | 0.600 | | | | |
| 13 | Filter | Plano | | 0.210 | Glass | 1.517 | 64.2 | — |
| 14 | | Plano | | 0.296 | | | | |
| 15 | Image | Plano | | 0.000 | | | | |

Reference wavelength is 587.6 nm (d-line).
Effective radius of Surface 4 (Stop 401) is 0.760 mm.

TABLE 8

Aspheric Coefficients

| Surface # | | | | |
|---|---|---|---|---|
| 2 | 3 | 5 | 6 | 7 |
| k = −1.5212E+01 | 0.0000E+00 | 0.0000E+00 | 1.2871E+01 | 5.9112E−01 |
| A4 = 1.0098E−01 | −2.0446E−01 | −3.8495E−01 | −5.4557E−02 | 3.5273E−01 |
| A6 = 4.8960E−01 | −2.0757E−01 | −3.4129E−02 | −5.9530E−01 | −7.3115E−01 |
| A8 = −5.8824E+00 | 7.1971E−01 | −1.2963E+00 | 1.3483E+00 | 1.0695E+00 |
| A10 = 2.5104E+01 | −1.6664E+00 | 5.8425E+00 | −1.5886E+00 | −9.9378E−01 |
| A12 = −5.1601E+01 | 2.9135E+00 | −6.6527E+00 | 1.8517E+00 | 1.8938E−01 |
| A14 = 4.1012E+01 | −1.9463E+00 | 2.3856E+00 | −1.4762E+00 | 4.4552E−01 |
| A16 = | | | 4.7410E−01 | −2.5364E−01 |

| Surface # | | | | |
|---|---|---|---|---|
| 8 | 9 | 10 | 11 | 12 |
| k = 9.9000E+01 | −1.0000E+00 | −1.0000E+00 | 5.4900E−02 | −1.0000E+00 |
| A4 = −1.7217E−01 | 4.2025E−02 | 1.1791E+00 | 7.1884E−02 | −1.3436E+00 |
| A6 = −7.2425E−01 | −5.3101E−01 | −2.9388E+00 | −3.0697E+00 | 1.8301E+00 |
| A8 = 1.4214E+00 | 6.4749E−01 | 5.9131E+00 | 8.7294E+00 | −1.8831E+00 |
| A10 = −9.0631E−01 | 8.0997E−02 | −8.0977E+00 | −1.3238E+01 | 1.4433E+00 |
| A12 = −1.5587E−01 | −1.2400E+00 | 7.3727E+00 | 1.2693E+01 | −8.4146E−01 |
| A14 = 4.3324E−01 | 1.6770E+00 | −4.5726E+00 | −8.1961E+00 | 3.7732E−01 |
| A16 = −1.3431E−01 | −1.1884E+00 | 1.9748E+00 | 3.6814E+00 | −1.2949E−01 |
| A18 = | 5.0801E−01 | −5.9837E−01 | −1.1666E+00 | 3.3422E−02 |
| A20 = | −1.3170E−01 | 1.2558E−01 | 2.6032E−01 | −6.3192E−03 |
| A22 = | 1.9121E−02 | −1.7478E−02 | −4.0083E−02 | 8.4276E−04 |
| A24 = | −1.1955E−03 | 1.4557E−03 | 4.0578E−03 | −7.4674E−05 |
| A26 = | | −5.4980E−05 | −2.4323E−04 | 3.9302E−06 |
| A28 = | | | 6.5444E−06 | −9.2726E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.86 | CT1/CT5 | 2.22 |
| Fno | 2.40 | CT1/ΣAT | 1.10 |
| HFOV [deg.] | 45.1 | T12/CT2 | 1.14 |
| FOV [deg.] | 90.2 | T12/T23 | 1.03 |
| Vmin | 18.4 | T12/T34 | 3.92 |
| V2 + V3 | 55.8 | T12/T45 | 2.04 |
| V1/N1 | 36.30 | f3/f1 | −1.17 |
| V2/N2 | 10.90 | |f3/f2| | 0.32 |
| V3/N3 | 23.91 | (f/f4)−(f/f5) | 3.91 |
| V4/N4 | 36.26 | Td/EPD | 2.47 |
| V5/N5 | 36.30 | TL/ImgH | 1.39 |
| f/R7 | 1.74 | ImgH/BL | 2.64 |
| f/R8 | −2.49 | Yc41 | 1.04 |
| CT1/CT2 | 3.41 | Yc41/f | 0.36 |
| CT1/CT3 | 2.12 | Y52 | 2.33 |
| CT1/CT4 | 1.33 | Y52/f | 0.81 |

5th Embodiment

Figure 9:
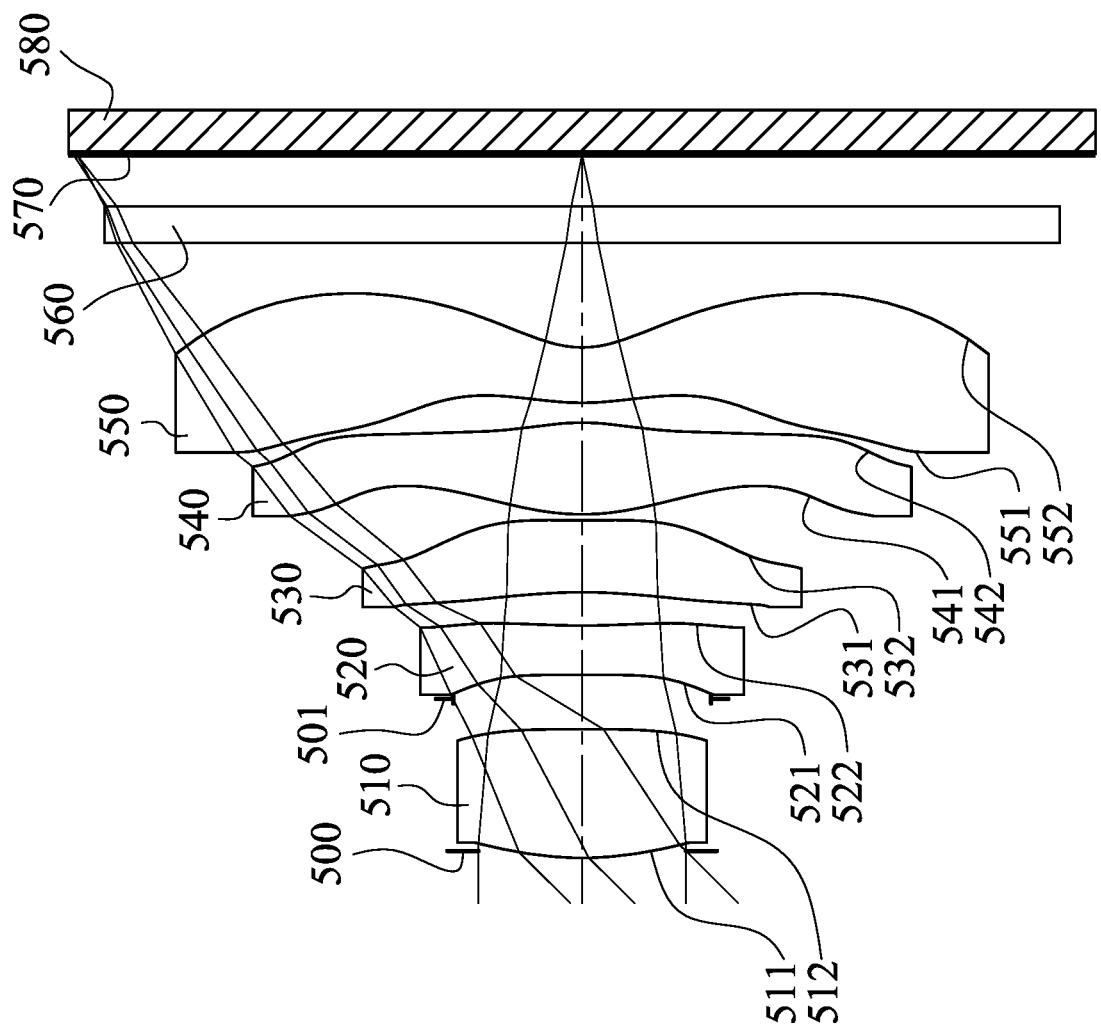
FIG. 9 is a schematic view of an imaging apparatus according to the 5th embodiment of the present disclosure.
Figure 10:
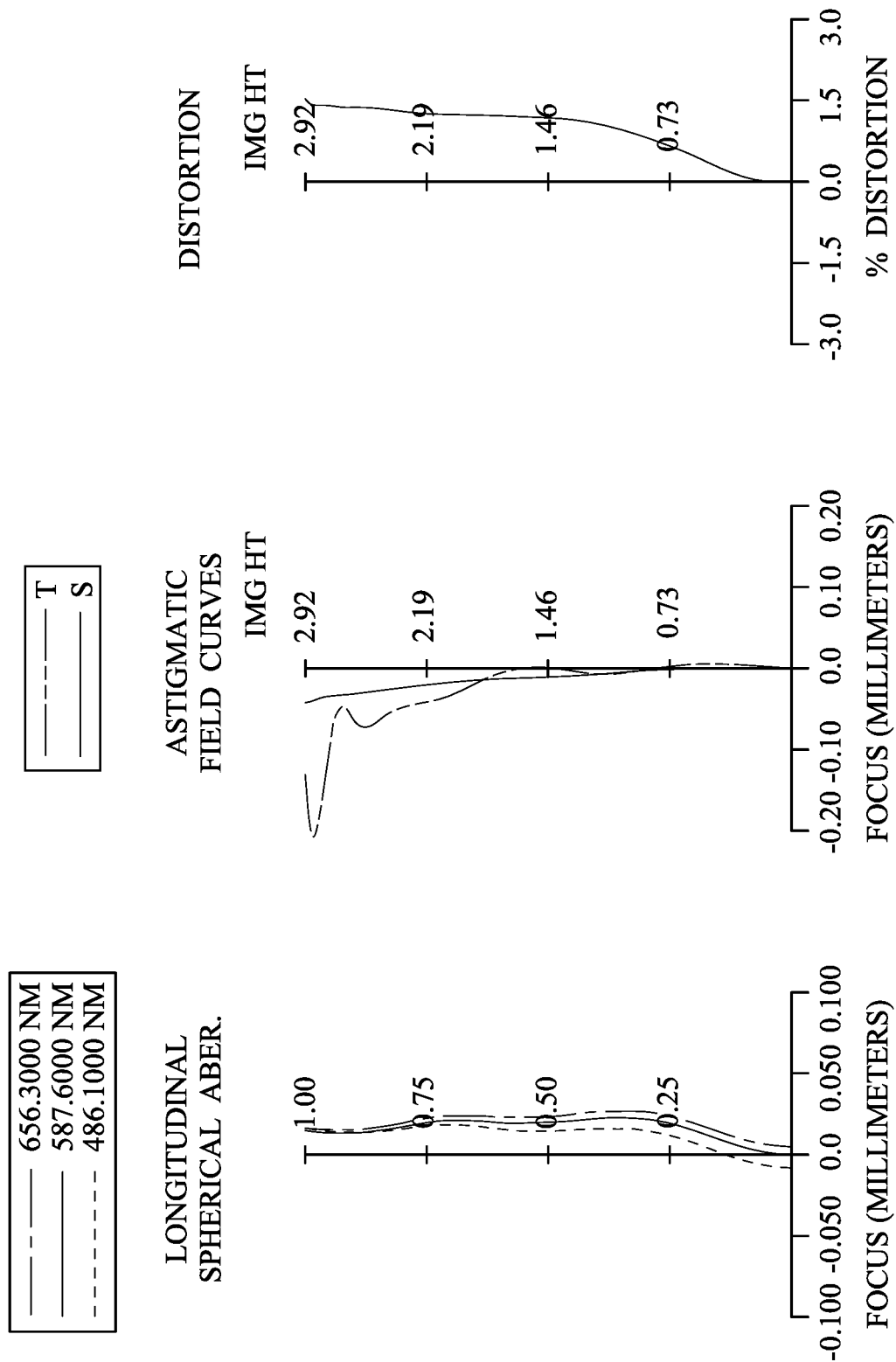
FIG. 10 shows, in order from left to right, spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows, in order from left to right, spherical aberration curves, astigmatic field curves and a distortion curve of the imaging apparatus of the 5th embodiment. In FIG. 9, the imaging apparatus according to the 5th embodiment includes an image lens assembly (its reference number is omitted) and an image sensor 580. The image lens assembly includes, in order from an object side to an image side along an optical path, an aperture stop 500, a first lens element 510, a stop 501, a second lens element 520, a third lens element 530, a fourth lens element 540, a fifth lens element 550, a filter 560 and an image surface 570, wherein the image sensor 580 is disposed on the image surface 570 of the image lens assembly. The image lens assembly includes five lens elements (510, 520, 530, 540, 550) without additional one or more lens elements inserted between the first lens element 510 and the fifth lens element 550.

The first lens element 510 with positive refractive power has an object-side surface 511 being convex in a paraxial region thereof and an image-side surface 512 being convex in a paraxial region thereof. The first lens element 510 is made of plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of plastic material, and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material, and has the object-side surface 541 and the image-side surface 542 being both aspheric. Moreover, the object-side surface 541 of the fourth lens element 540 includes at least one concave critical point in an off-axis region thereof.

The fifth lens element 550 with negative refractive power has an object-side surface 551 being convex in a paraxial region thereof and an image-side surface 552 being concave in a paraxial region thereof. The fifth lens element 550 is made of plastic material, and has the object-side surface 551 and the image-side surface 552 being both aspheric. Moreover, the image-side surface 552 of the fifth lens element 550 includes at least one convex critical point in an off-axis region thereof.

The filter 560 is made of glass material and disposed between the fifth lens element 550 and the image surface 570 and will not affect a focal length of the image lens assembly.

The detailed optical data of the 5th embodiment are shown in Table 9 and the aspheric surface data are shown in Table 10 below.

TABLE 9

5th Embodiment
f = 2.86 mm, Fno = 2.40, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.039 | | | | |
| 2 | Lens 1 | 1.979 | ASP | 0.739 | Plastic | 1.545 | 56.1 | 3.35 |
| 3 | | −20.207 | ASP | 0.173 | | | | |
| 4 | Stop | Plano | | 0.139 | | | | |
| 5 | Lens 2 | 100.000 | ASP | 0.283 | Plastic | 1.686 | 18.4 | −7.07 |
| 6 | | 4.622 | ASP | 0.191 | | | | |
| 7 | Lens 3 | −3.292 | ASP | 0.413 | Plastic | 1.566 | 37.4 | −4.24 |
| 8 | | 9.255 | ASP | 0.035 | | | | |
| 9 | Lens 4 | 1.381 | ASP | 0.526 | Plastic | 1.544 | 56.0 | 1.31 |
| 10 | | −1.281 | ASP | 0.114 | | | | |
| 11 | Lens 5 | 1.718 | ASP | 0.318 | Plastic | 1.545 | 56.1 | −1.69 |
| 12 | | 0.561 | ASP | 0.600 | | | | |
| 13 | Filter | Plano | | 0.210 | Glass | 1.517 | 64.2 | — |
| 14 | | Plano | | 0.301 | | | | |
| 15 | Image | Plano | | 0.000 | | | | |

Reference wavelength is 587.6 nm (d-line).
Effective radius of Surface 4 (Stop 501) is 0.740 mm.

TABLE 10

Aspheric Coefficients

| Surface # | | | | | |
|---|---|---|---|---|---|
| | 2 | 3 | 5 | 6 | 7 |
| k = | −1.2234E+01 | 0.0000E+00 | 0.0000E+00 | 0.0000E+00 | 0.0000E+00 |
| A4 = | 6.8736E−02 | −1.9945E−01 | −4.2457E−01 | −2.3452E−01 | 8.0944E−02 |
| A6 = | 9.5402E−01 | 8.0468E−03 | −2.6578E−01 | −1.4236E−01 | 2.2336E−01 |
| A8 = | −8.7881E+00 | −2.3418E−01 | 1.5170E+00 | 1.2794E+00 | −7.3347E−01 |
| A10 = | 3.4973E+01 | 3.7859E−01 | −4.6419E+00 | −3.6866E+00 | 1.1014E+00 |
| A12 = | −6.8743E+01 | −2.3452E−01 | 8.3729E+00 | 5.8074E+00 | −9.3318E−01 |
| A14 = | 5.3016E+01 | 4.5204E−01 | −5.0420E+00 | −4.5613E+00 | 4.6208E−01 |
| A16 = | | | | 1.4414E+00 | −1.1324E−01 |
| A18 = | | | | | −2.1440E−03 |

| Surface # | | | | | |
|---|---|---|---|---|---|
| | 8 | 9 | 10 | 11 | 12 |
| k = | 0.0000E+00 | −1.0000E+00 | −1.0000E+00 | −1.3849E+00 | −3.4262E+00 |
| A4 = | −6.8986E−01 | −2.2552E−01 | 1.2676E+00 | −4.3382E−01 | −4.0880E−01 |
| A6 = | 2.7941E−01 | 1.6931E−03 | −2.3515E+00 | −5.8857E−01 | 4.6805E−01 |
| A8 = | 1.0198E+00 | −9.4146E−02 | 2.5377E+00 | 2.1133E+00 | −3.6453E−01 |
| A10 = | −2.1299E+00 | 3.9811E−01 | −1.5521E+00 | −3.0263E+00 | 1.9577E−01 |
| A12 = | 1.9756E+00 | −5.0204E−01 | 4.0449E−01 | 2.7528E+00 | −7.2723E−02 |
| A14 = | −7.8067E−01 | 3.0711E−01 | 1.1352E−01 | −1.7016E+00 | 1.8448E−02 |
| A16 = | −3.9685E−02 | −9.9752E−02 | −1.3644E−01 | 7.2401E−01 | −3.1084E−03 |
| A18 = | 1.1660E−01 | 1.6567E−02 | 5.2192E−02 | −2.1146E−01 | 3.3023E−04 |
| A20 = | −2.3580E−02 | −1.1097E−03 | −1.0570E−02 | 4.1600E−02 | −1.9901E−05 |
| A22 = | | | 1.1306E−03 | −5.2657E−03 | 5.1623E−07 |
| A24 = | | | −5.0307E−05 | 3.8721E−04 | |
| A26 = | | | | −1.2568E−05 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.86 | CT1/CT5 | 2.32 |
| Fno | 2.40 | CT1/ΣAT | 1.13 |
| HFOV [deg.] | 45.1 | T12/CT2 | 1.10 |
| FOV [deg.] | 90.2 | T12/T23 | 1.63 |
| Vmin | 18.4 | T12/T34 | 8.91 |
| V2 + V3 | 55.8 | T12/T45 | 2.74 |
| V1/N1 | 36.30 | f3/f1 | −1.27 |
| V2/N2 | 10.90 | |f3/f2| | 0.60 |
| V3/N3 | 23.91 | (f/f4)−(f/f5) | 3.86 |
| V4/N4 | 36.26 | Td/EPD | 2.46 |
| V5/N5 | 36.30 | TL/ImgH | 1.38 |
| f/R7 | 2.07 | ImgH/BL | 2.63 |
| f/R8 | −2.23 | Yc41 | 1.02 |
| CT1/CT2 | 2.61 | Yc41/f | 0.36 |
| CT1/CT3 | 1.79 | Y52 | 2.33 |
| CT1/CT4 | 1.40 | Y52/f | 0.82 |

6th Embodiment

Figure 11:
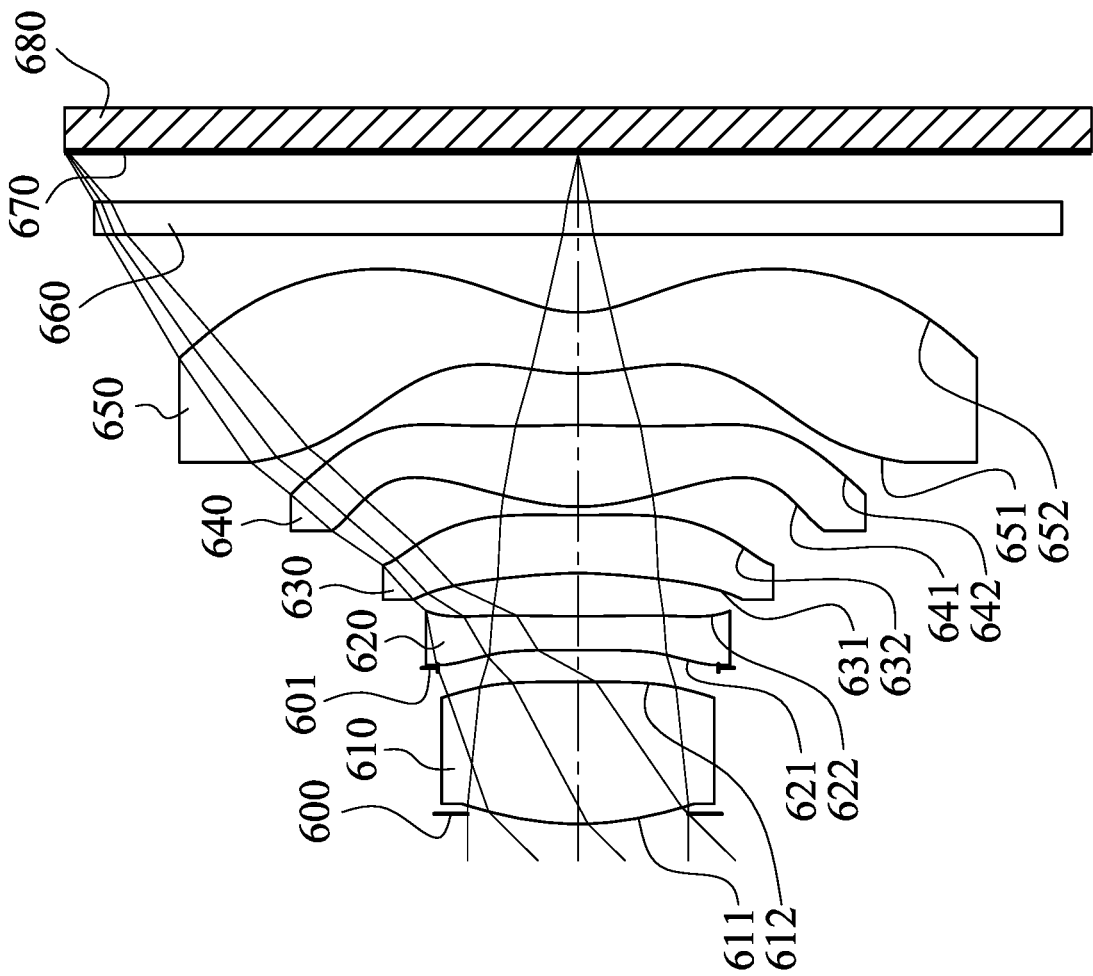
FIG. 11 is a schematic view of an imaging apparatus according to the 6th embodiment of the present disclosure.
Figure 12:
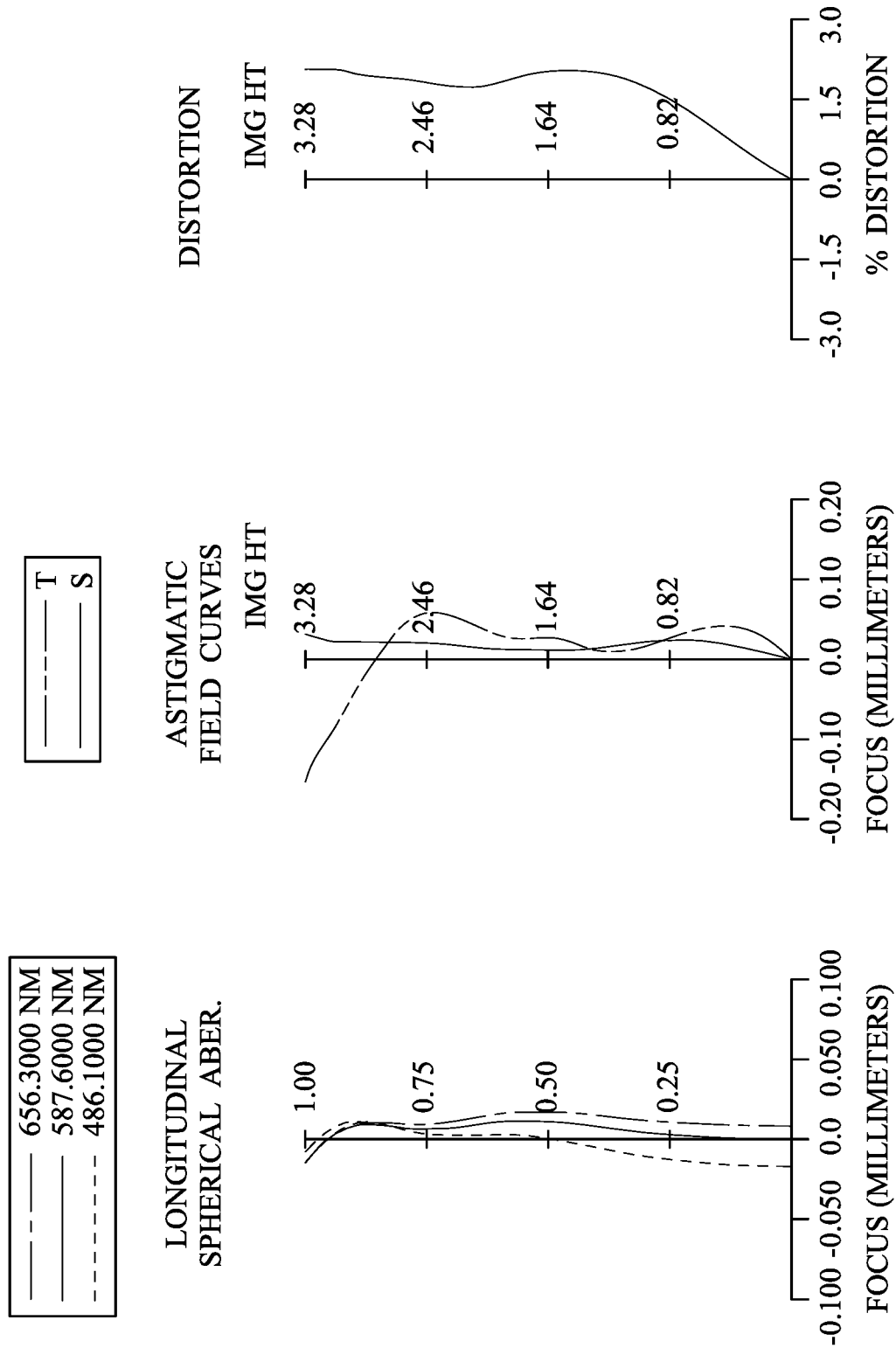
FIG. 12 shows, in order from left to right, spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows, in order from left to right, spherical aberration curves, astigmatic field curves and a distortion curve of the imaging apparatus of the 6th embodiment. In FIG. 11, the imaging apparatus according to the 6th embodiment includes an image lens assembly (its reference number is omitted) and an image sensor 680. The image lens assembly includes, in order from an object side to an image side along an optical path, an aperture stop 600, a first lens element 610, a stop 601, a second lens element 620, a third lens element 630, a fourth lens element 640, a fifth lens element 650, a filter 660 and an image surface 670, wherein the image sensor 680 is disposed on the image surface 670 of the image lens assembly. The image lens assembly includes five lens elements (610, 620, 630, 640, 650) without additional one or more lens elements inserted between the first lens element 610 and the fifth lens element 650.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material, and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material, and has the object-side surface 641 and the image-side surface 642 being both aspheric. Moreover, the object-side surface 641 of the fourth lens element 640 includes at least one concave critical point in an off-axis region thereof.

The fifth lens element 650 with negative refractive power has an object-side surface 651 being convex in a paraxial region thereof and an image-side surface 652 being concave in a paraxial region thereof. The fifth lens element 650 is made of plastic material, and has the object-side surface 651 and the image-side surface 652 being both aspheric. Moreover, the image-side surface 652 of the fifth lens element 650 includes at least one convex critical point in an off-axis region thereof.

The filter 660 is made of glass material and disposed between the fifth lens element 650 and the image surface 670 and will not affect a focal length of the image lens assembly.

The detailed optical data of the 6th embodiment are shown in Table 11 and the aspheric surface data are shown in Table 12 below.

TABLE 11

6th Embodiment
f = 3.20 mm, Fno = 2.26, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.064 | | | | |
| 2 | Lens 1 | 2.033 | ASP | 0.912 | Plastic | 1.545 | 56.1 | 3.66 |
| 3 | | −83.673 | ASP | 0.088 | | | | |
| 4 | Stop | Plano | | 0.115 | | | | |
| 5 | Lens 2 | 80.754 | ASP | 0.217 | Plastic | 1.686 | 18.4 | −20.59 |
| 6 | | 12.010 | ASP | 0.277 | | | | |
| 7 | Lens 3 | −2.820 | ASP | 0.372 | Plastic | 1.566 | 37.4 | −3.58 |
| 8 | | 7.505 | ASP | 0.055 | | | | |
| 9 | Lens 4 | 1.378 | ASP | 0.524 | Plastic | 1.544 | 56.0 | 2.11 |
| 10 | | −5.858 | ASP | 0.330 | | | | |
| 11 | Lens 5 | 1.368 | ASP | 0.392 | Plastic | 1.534 | 55.9 | −3.75 |
| 12 | | 0.731 | ASP | 0.500 | | | | |

TABLE 11-continued

6th Embodiment
f = 3.20 mm, Fno = 2.26, HFOV = 45.1 deg.

| Surface # | | Curvature Radius | Thickness | Material | Index | Abbe # | Focal Length |
|---|---|---|---|---|---|---|---|
| 13 | Filter | Plano | 0.210 | Glass | 1.517 | 64.2 | — |
| 14 | | Plano | 0.321 | | | | |
| 15 | Image | Plano | 0.000 | | | | |

Reference wavelength is 587.6 nm (d-line).
Effective radius of Surface 4 (Stop 601) is 0.900 mm.

TABLE 12

Aspheric Coefficients

| | Surface # | | | | |
|---|---|---|---|---|---|
| | 2 | 3 | 5 | 6 | 7 |
| k= | 1.6790E+00 | 9.9000E+01 | −9.9000E+01 | −9.7703E+01 | −5.4085E+01 |
| A4= | −3.3433E−02 | −1.8827E−01 | −2.7486E−01 | −1.6729E−02 | −1.5715E−01 |
| A6= | −1.2632E−01 | −8.2803E−02 | −6.0989E−02 | −2.9899E−01 | 1.3236E+00 |
| A8= | −1.5813E−01 | −5.4989E−01 | −2.3274E+00 | −3.8667E−01 | −5.3926E+00 |
| A10= | 2.9822E+00 | 3.3946E+00 | 1.0917E+01 | 3.1372E+00 | 1.2575E+01 |
| A12= | −1.0962E+01 | −6.7665E+00 | −1.7685E+01 | −4.6943E+00 | −1.8773E+01 |
| A14= | 1.6815E+01 | 6.4129E+00 | 1.3154E+01 | 2.9685E+00 | 1.7901E+01 |
| A16= | −9.5093E+00 | −2.3797E+00 | −3.8162E+00 | −6.9781E−01 | −1.0401E+01 |
| A18= | | | | | 3.3152E+00 |
| A20= | | | | | −4.4051E−01 |

| | Surface # | | | | |
|---|---|---|---|---|---|
| | 8 | 9 | 10 | 11 | 12 |
| k= | 1.6087E+01 | −7.7131E+00 | −5.9583E−01 | −1.0334E+01 | −3.1348E+00 |
| A4= | −4.9523E−01 | 2.6089E−02 | 2.6238E−01 | −3.0925E−01 | −3.5191E−01 |
| A6= | 6.7953E−01 | −1.4534E−01 | −2.4016E−01 | −1.2416E−01 | 3.5726E−01 |
| A8= | −9.4548E−01 | 2.5659E−01 | 2.4095E−02 | 5.1935E−01 | −2.8133E−01 |
| A10= | 8.1793E−01 | −5.2544E−01 | 8.6566E−02 | −6.1920E−01 | 1.6964E−01 |
| A12= | −1.5445E−02 | 6.9923E−01 | −4.8457E−02 | 4.4658E−01 | −7.6851E−02 |
| A14= | −4.3653E−01 | −5.5961E−01 | −8.4801E−03 | −2.1421E−01 | 2.5497E−02 |
| A16= | 4.2423E−01 | 2.6385E−01 | 1.6838E−02 | 7.0807E−02 | −6.0480E−03 |
| A18= | −1.4752E−01 | −7.1185E−02 | −6.4334E−03 | −1.6311E−02 | 1.0016E−03 |
| A20= | 1.7095E−02 | 1.0134E−02 | 1.0665E−03 | 2.5861E−03 | −1.1217E−04 |
| A22= | | −5.8943E−04 | −6.7180E−05 | −2.6994E−04 | 8.0483E−06 |
| A24= | | | | 1.6721E−05 | −3.3221E−07 |
| A26= | | | | −4.6575E−07 | 5.9670E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.20 | CT1/CT5 | 2.33 |
| Fno | 2.26 | CT1/ΣAT | 1.05 |
| HFOV [deg.] | 45.1 | T12/CT2 | 0.94 |
| FOV [deg.] | 90.2 | T12/T23 | 0.73 |
| Vmin | 18.4 | T12/T34 | 3.69 |
| V2 + V3 | 55.8 | T12/T45 | 0.62 |
| V1/N1 | 36.30 | f3/f1 | −0.98 |
| V2/N2 | 10.90 | |f3/f2| | 0.17 |
| V3/N3 | 23.91 | (f/f4)−(f/f5) | 2.37 |
| V4/N4 | 36.26 | Td/EPD | 2.32 |

-continued

| 6th Embodiment | | | |
|---|---|---|---|
| V5/N5 | 36.46 | TL/ImgH | 1.31 |
| f/R7 | 2.32 | ImgH/BL | 3.18 |
| f/R8 | −0.55 | Yc41 | 1.04 |
| CT1/CT2 | 4.20 | Yc41/f | 0.33 |
| CT1/CT3 | 2.45 | Y52 | 2.56 |
| CT1/CT4 | 1.74 | Y52/f | 0.80 |

7th Embodiment

Figure 13:
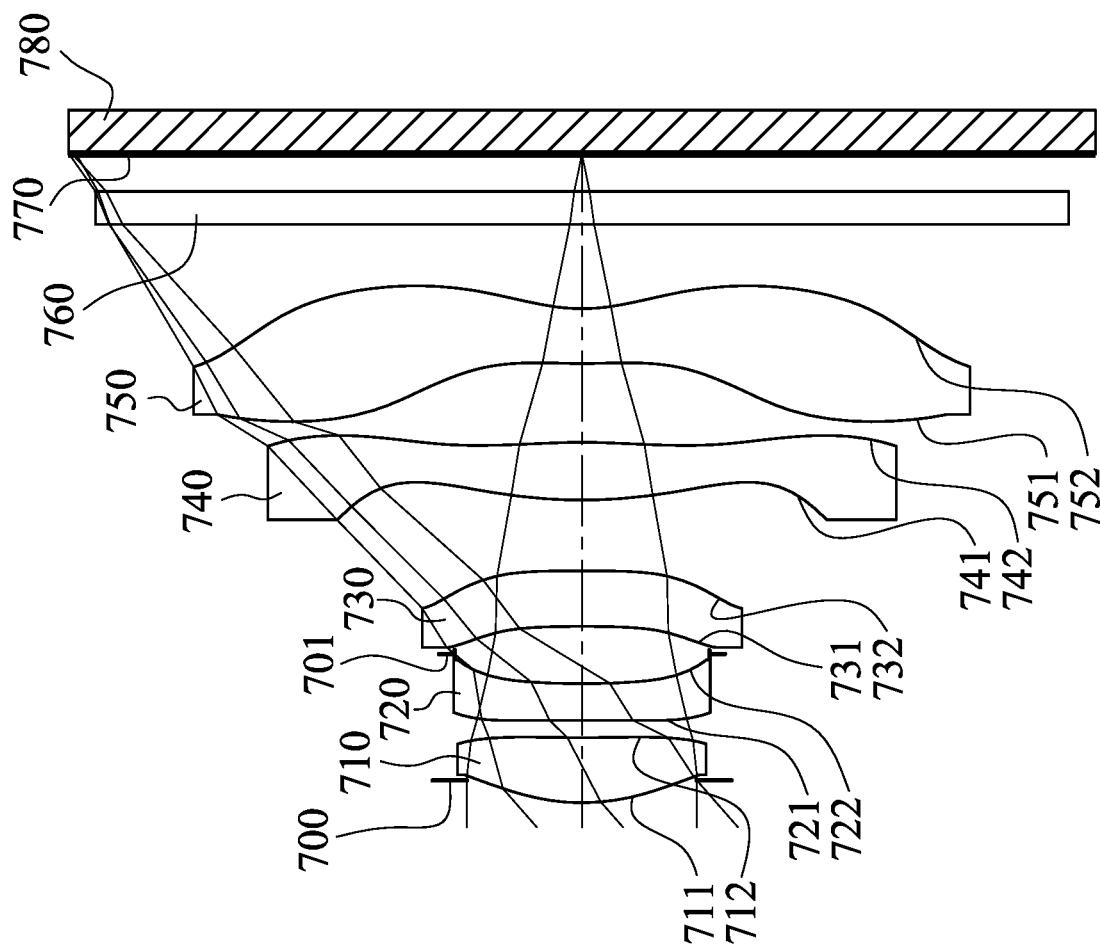
FIG. 13 is a schematic view of an imaging apparatus according to the 7th embodiment of the present disclosure.
Figure 14:
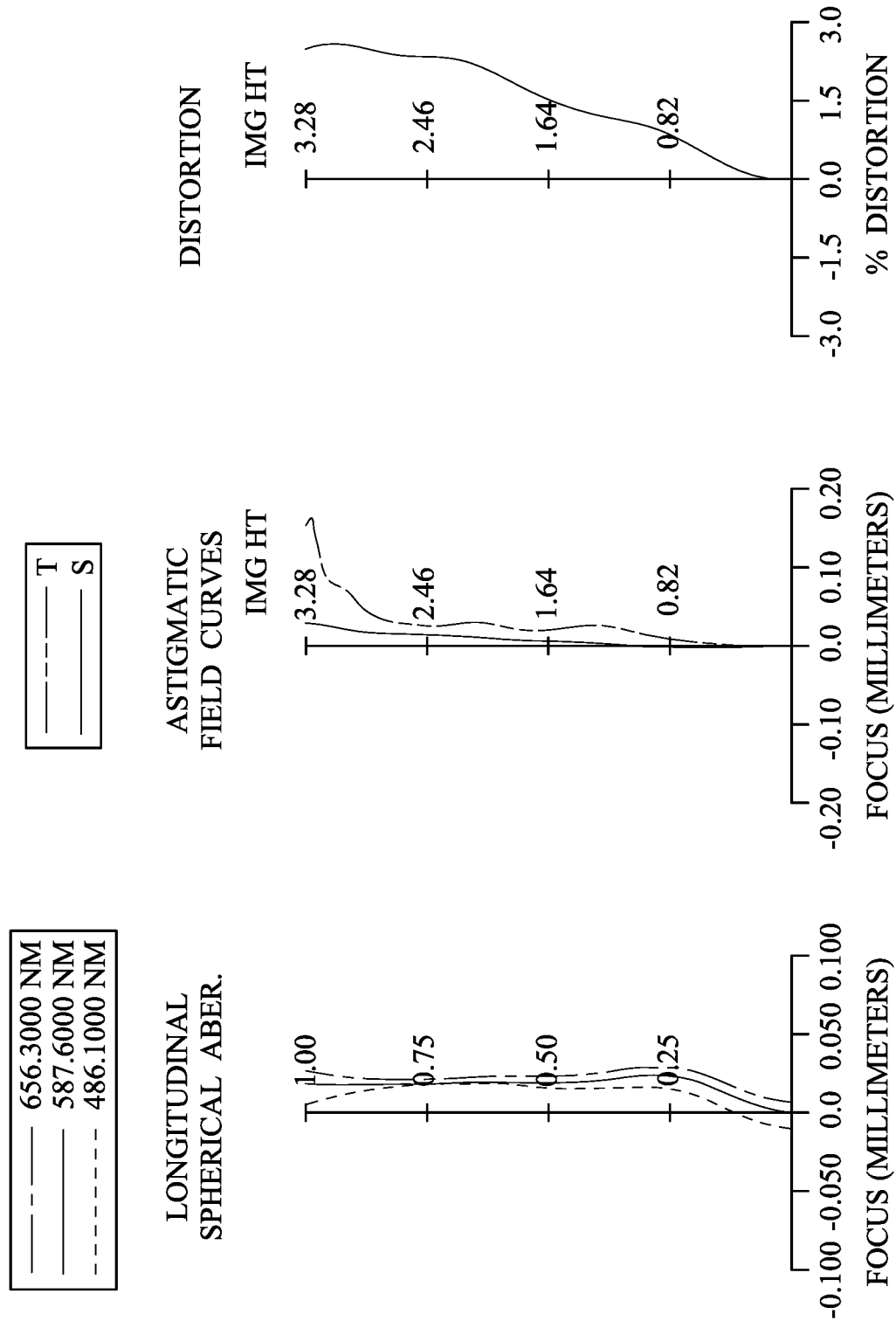
FIG. 14 shows, in order from left to right, spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows, in order from left to right, spherical aberration curves, astigmatic field curves and a distortion curve of the imaging apparatus of the 7th embodiment. In FIG. 13, the imaging apparatus according to the 7th embodiment includes an image lens assembly (its reference number is omitted) and an image sensor 780. The image lens assembly includes, in order from an object side to an image side along an optical path, an aperture stop 700, a first lens element 710, a second lens element 720, a stop 701, a third lens element 730, a fourth lens element 740, a fifth lens element 750, a filter 760 and an image surface 770, wherein the image sensor 780 is disposed on the image surface 770 of the image lens assembly. The image lens assembly includes five lens elements (710, 720, 730, 740, 750) without additional one or more lens elements inserted between the first lens element 710 and the fifth lens element 750.

The first lens element 710 with positive refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material, and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material, and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material, and has the object-side surface 741 and the image-side surface 742 being both aspheric. Moreover, the object-side surface 741 of the fourth lens element 740 includes at least one concave critical point in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material, and has the object-side surface 751 and the image-side surface 752 being both aspheric. Moreover, the image-side surface 752 of the fifth lens element 750 includes at least one convex critical point in an off-axis region thereof.

The filter 760 is made of glass material and disposed between the fifth lens element 750 and the image surface 770 and will not affect a focal length of the image lens assembly.

The detailed optical data of the 7th embodiment are shown in Table 13 and the aspheric surface data are shown in Table 14 below.

TABLE 13

7th Embodiment
f = 3.64 mm, Fno = 2.47, HFOV = 41.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.141 | | | | |
| 2 | Lens 1 | 1.420 ASP | 0.416 | Plastic | 1.545 | 56.1 | 3.00 |
| 3 | | 9.610 ASP | 0.111 | | | | |
| 4 | Lens 2 | 99.010 ASP | 0.234 | Plastic | 1.669 | 19.5 | −7.44 |
| 5 | | 4.734 ASP | 0.190 | | | | |
| 6 | Stop | Plano | 0.177 | | | | |
| 7 | Lens 3 | −17.018 ASP | 0.356 | Plastic | 1.566 | 37.4 | −41.90 |
| 8 | | −60.706 ASP | 0.454 | | | | |
| 9 | Lens 4 | 3.477 ASP | 0.369 | Plastic | 1.544 | 56.0 | 3.67 |
| 10 | | −4.521 ASP | 0.505 | | | | |
| 11 | Lens 5 | 5.805 ASP | 0.351 | Plastic | 1.534 | 55.9 | −2.70 |
| 12 | | 1.130 ASP | 0.541 | | | | |
| 13 | Filter | Plano | 0.210 | Glass | 1.517 | 64.2 | — |
| 14 | | Plano | 0.240 | | | | |
| 15 | Image | Plano | 0.000 | | | | |

Reference wavelength is 587.6 nm (d-line).
Effective radius of Surface 6 (Stop 701) is 0.815 mm.

TABLE 14

Aspheric Coefficients

| Surface # | | | | |
|---|---|---|---|---|
| 2 | 3 | 4 | 5 | 7 |
| k= −1.7888E+01 | 0.0000E+00 | 0.0000E+00 | 0.0000E+00 | 0.0000E+00 |
| A4= 6.9451E−01 | −2.2308E−01 | −1.9110E−01 | −5.9421E−02 | −4.1072E−01 |
| A6= −2.1969E+00 | 1.6051E−01 | 7.2446E−01 | 4.5248E−01 | 2.1702E−01 |
| A8= 5.5431E+00 | −2.8791E−01 | −6.9733E−01 | 1.0675E+00 | 1.2148E−01 |
| A10= −9.9613E+00 | 1.0032E+00 | 1.1698E+00 | −5.9106E+00 | −1.1260E+00 |
| A12= 9.8979E+00 | −2.2246E+00 | −1.8137E+00 | 1.3824E+01 | 2.4408E+00 |

TABLE 14-continued

| Aspheric Coefficients | | | | |
|---|---|---|---|---|
| A14= | −4.2800E+00 | 1.8442E+00 | 9.9249E−01 | −1.5725E+01 | −1.3402E+00 |
| A16= | | −5.2699E−01 | | 6.7721E+00 | |

| | Surface # | | | | |
|---|---|---|---|---|---|
| | 8 | 9 | 10 | 11 | 12 |
| k= | 0.0000E+00 | 0.0000E+00 | −9.9000E+01 | 0.0000E+00 | −6.0655E+00 |
| A4= | −4.1751E−01 | 5.2045E−02 | 8.2099E−02 | −4.9841E−01 | −2.4432E−01 |
| A6= | 3.4367E−01 | −1.7935E−01 | 5.3603E−03 | 3.2912E−01 | 1.8204E−01 |
| A8= | −9.9788E−01 | 2.0740E−01 | −4.2759E−02 | −7.7961E−02 | −9.0030E−02 |
| A10= | 2.7336E+00 | −2.1250E−01 | 2.3877E−02 | −7.0696E−03 | 3.0401E−02 |
| A12= | −4.5956E+00 | 1.4592E−01 | −6.2962E−03 | 8.8895E−03 | −6.9349E−03 |
| A14= | 4.5426E+00 | −6.1042E−02 | 8.4105E−04 | −2.3669E−03 | 9.9239E−04 |
| A16= | −2.2692E+00 | 1.3822E−02 | −4.5939E−05 | 3.2071E−04 | −7.8437E−05 |
| A18= | 4.3416E−01 | −1.2718E−03 | | −2.2795E−05 | 2.5801E−06 |
| A20= | | | | 6.7639E−07 | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.64 | CT1/CT5 | 1.19 |
| Fno | 2.47 | CT1/ΣAT | 0.29 |
| HFOV [deg.] | 41.3 | T12/CT2 | 0.47 |
| FOV [deg.] | 82.6 | T12/T23 | 0.30 |
| Vmin | 19.5 | T12/T34 | 0.24 |
| V2 + V3 | 56.9 | T12/T45 | 0.22 |
| V1/N1 | 36.30 | f3/f1 | −13.95 |
| V2/N2 | 11.65 | |f3/f2| | 5.63 |
| V3/N3 | 23.91 | (f/f4)−(f/f5) | 2.34 |
| V4/N4 | 36.26 | Td/EPD | 2.15 |
| V5/N5 | 36.46 | TL/ImgH | 1.27 |
| f/R7 | 1.05 | ImgH/BL | 3.31 |
| f/R8 | −0.80 | Yc41 | 1.06 |
| CT1/CT2 | 1.78 | Yc41/f | 0.29 |
| CT1/CT3 | 1.17 | Y52 | 2.48 |
| CT1/CT4 | 1.13 | Y52/f | 0.68 |

8th Embodiment

Figure 15:
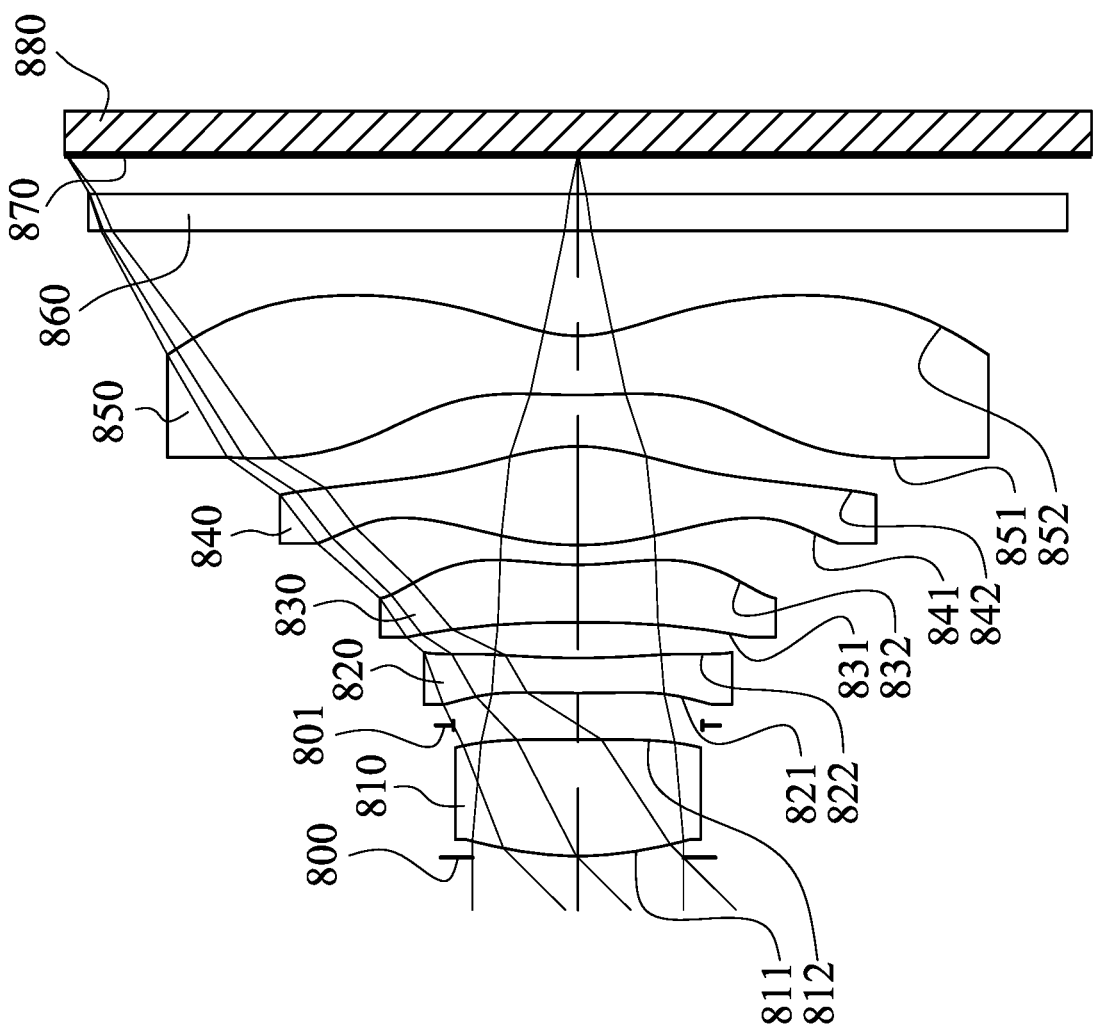
FIG. 15 is a schematic view of an imaging apparatus according to the 8th embodiment of the present disclosure.
Figure 16:
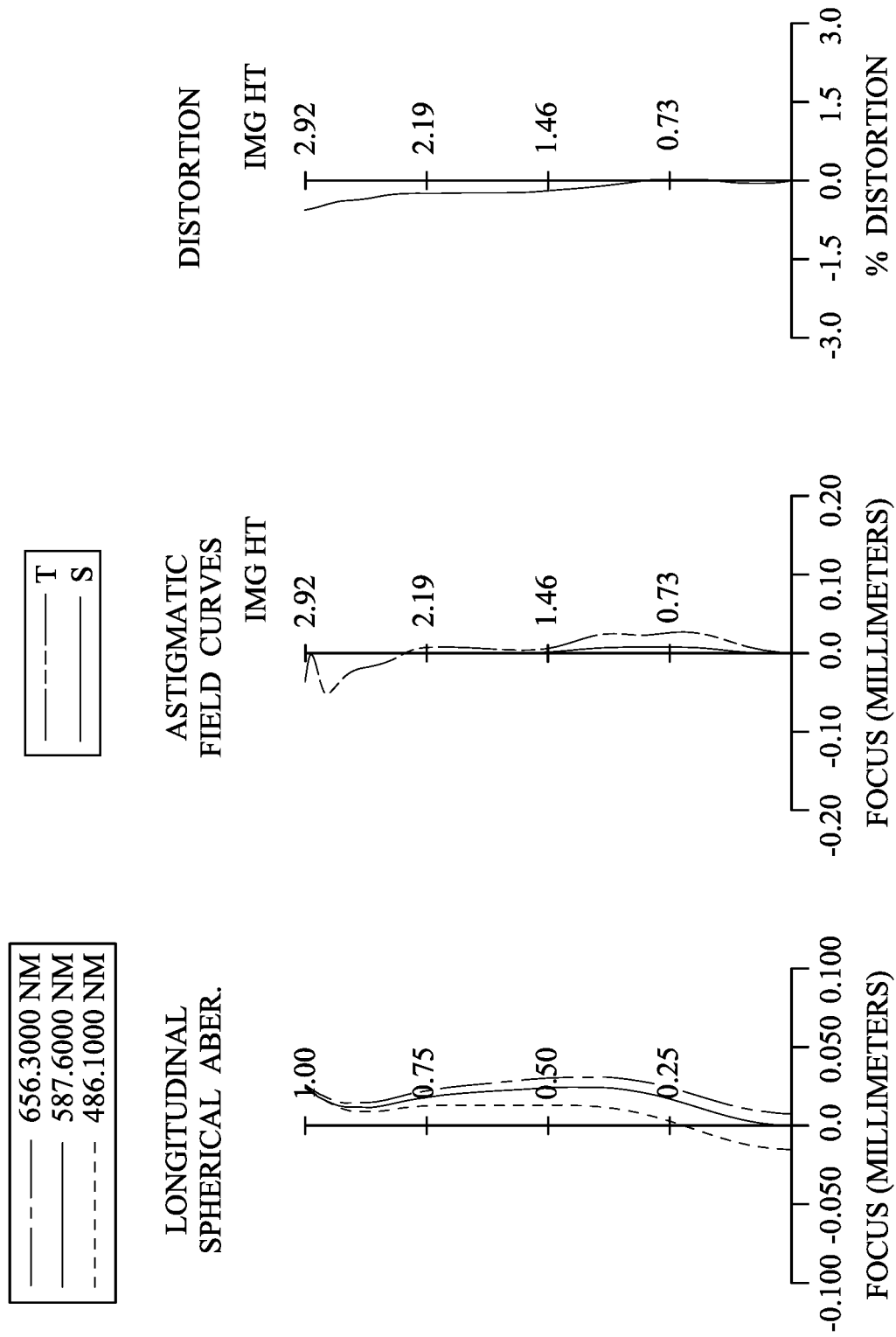
FIG. 16 shows, in order from left to right, spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows, in order from left to right, spherical aberration curves, astigmatic field curves and a distortion curve of the imaging apparatus of the 8th embodiment. In FIG. 15, the imaging apparatus according to the 8th embodiment includes an image lens assembly (its reference number is omitted) and an image sensor 880. The image lens assembly includes, in order from an object side to an image side along an optical path, an aperture stop 800, a first lens element 810, a stop 801, a second lens element 820, a third lens element 830, a fourth lens element 840, a fifth lens element 850, a filter 860 and an image surface 870, wherein the image sensor 880 is disposed on the image surface 870 of the image lens assembly. The image lens assembly includes five lens elements (810, 820, 830, 840, 850) without additional one or more lens elements inserted between the first lens element 810 and the fifth lens element 850.

The first lens element 810 with positive refractive power has an object-side surface 811 being convex in a paraxial region thereof and an image-side surface 812 being concave in a paraxial region thereof. The first lens element 810 is made of plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material, and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material, and has the object-side surface 841 and the image-side surface 842 being both aspheric. Moreover, the object-side surface 841 of the fourth lens element 840 includes at least one concave critical point in an off-axis region thereof.

The fifth lens element 850 with negative refractive power has an object-side surface 851 being convex in a paraxial region thereof and an image-side surface 852 being concave in a paraxial region thereof. The fifth lens element 850 is made of plastic material, and has the object-side surface 851 and the image-side surface 852 being both aspheric. Moreover, the image-side surface 852 of the fifth lens element 850 includes at least one convex critical point in an off-axis region thereof.

The filter 860 is made of glass material and disposed between the fifth lens element 850 and the image surface 870 and will not affect a focal length of the image lens assembly.

The detailed optical data of the 8th embodiment are shown in Table 15 and the aspheric surface data are shown in Table 16 below.

TABLE 15

8th Embodiment
f = 2.92 mm, Fno = 2.42, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.009 | | | | |
| 2 | Lens 1 | 1.987 | ASP | 0.665 | Plastic | 1.545 | 56.1 | 3.71 |
| 3 | | 103.236 | ASP | 0.080 | | | | |
| 4 | Stop | Plano | | 0.185 | | | | |
| 5 | Lens 2 | 8.922 | ASP | 0.200 | Plastic | 1.686 | 18.4 | −15.34 |
| 6 | | 4.785 | ASP | 0.203 | | | | |
| 7 | Lens 3 | −40.233 | ASP | 0.329 | Plastic | 1.566 | 37.4 | −3.11 |
| 8 | | 1.848 | ASP | 0.113 | | | | |
| 9 | Lens 4 | 1.730 | ASP | 0.563 | Plastic | 1.544 | 56.0 | 1.31 |
| 10 | | −1.077 | ASP | 0.293 | | | | |
| 11 | Lens 5 | 4.285 | ASP | 0.338 | Plastic | 1.545 | 56.1 | −1.72 |
| 12 | | 0.747 | ASP | 0.600 | | | | |
| 13 | Filter | Plano | | 0.210 | Glass | 1.517 | 64.2 | — |
| 14 | | Plano | | 0.222 | | | | |
| 15 | Image | Plano | | 0.000 | | | | |

Reference wavelength is 587.6 nm (d-line).
Effective radius of Surface 4 (Stop 801) is 0.710 mm.

TABLE 16

Aspheric Coefficients

| | Surface # | | | | |
|---|---|---|---|---|---|
| | 2 | 3 | 5 | 6 | 7 |
| k= | −1.2458E+01 | 0.0000E+00 | 0.0000E+00 | 1.4063E+01 | 0.0000E+00 |
| A4= | 1.2354E−01 | −1.6593E−01 | −2.2230E−01 | −1.1529E−02 | −3.7376E−01 |
| A6= | 1.5094E−01 | −3.0381E−01 | −5.0370E−01 | −6.7189E−01 | 9.3812E−01 |
| A8= | −2.7383E+00 | 1.0891E+00 | 2.3256E−01 | 1.2813E+00 | −1.1749E+00 |
| A10= | 1.0529E+01 | −3.1300E+00 | 3.4138E−01 | −1.4466E+00 | 2.3908E−01 |
| A12= | −1.8915E+01 | 5.4809E+00 | 2.1254E+00 | 1.3973E+00 | 1.3551E+00 |
| A14= | 1.2950E+01 | −3.5793E+00 | −2.4102E+00 | −6.1376E−01 | −2.1557E+00 |
| A16= | | | | | 1.5587E+00 |
| A18= | | | | | −4.6266E−01 |

| | Surface # | | | | |
|---|---|---|---|---|---|
| | 8 | 9 | 10 | 11 | 12 |
| k= | −1.2885E+01 | −1.2787E+00 | −1.0000E+00 | 3.5039E−01 | −4.3978E+00 |
| A4= | −4.6230E−01 | 8.3945E−02 | 6.1823E−01 | −4.8727E−01 | −3.5776E−01 |
| A6= | −5.0189E−01 | −1.1212E+00 | −8.2248E−01 | 4.6632E−03 | 3.8211E−01 |
| A8= | 3.5230E+00 | 3.1104E+00 | 1.0972E+00 | 7.6920E−01 | −2.6007E−01 |
| A10= | −9.5414E+00 | −5.4948E+00 | −1.1378E+00 | −1.1410E+00 | 1.1010E−01 |
| A12= | 1.5664E+01 | 6.4910E+00 | 8.0423E−01 | 9.4478E−01 | −2.3390E−02 |
| A14= | −1.5967E+01 | −5.2229E+00 | −3.7674E−01 | −5.1294E−01 | −2.1399E−03 |
| A16= | 9.7980E+00 | 2.8539E+00 | 1.1514E−01 | 1.9004E−01 | 3.1888E−03 |
| A18= | −3.2804E+00 | −1.0362E+00 | −2.2064E−02 | −4.8337E−02 | −1.0671E−03 |
| A20= | 4.5603E−01 | 2.3848E−01 | 2.4037E−03 | 8.3033E−03 | 1.9760E−04 |
| A22= | | −3.1434E−02 | −1.1340E−04 | −9.2027E−04 | −2.1779E−05 |
| A24= | | 1.8060E−03 | | 5.9389E−05 | 1.3392E−06 |
| A26= | | | | −1.6946E−06 | −3.5449E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.92 | CT1/CT5 | 1.97 |
| Fno | 2.42 | CT1/ΣAT | 0.76 |
| HFOV [deg.] | 45.1 | T12/CT2 | 1.33 |
| FOV [deg.] | 90.2 | T12/T23 | 1.31 |
| Vmin | 18.4 | T12/T34 | 2.35 |
| V2 + V3 | 55.8 | T12/T45 | 0.90 |
| V1/N1 | 36.30 | f3/f1 | −0.84 |
| V2/N2 | 10.90 | |f3/f2| | 0.20 |

-continued

| 8th Embodiment | | | |
|---|---|---|---|
| V3/N3 | 23.91 | (f/f4)-(f/f5) | 3.92 |
| V4/N4 | 36.26 | Td/EPD | 2.47 |
| V5/N5 | 36.30 | TL/ImgH | 1.37 |
| f/R7 | 1.69 | ImgH/BL | 2.83 |
| f/R8 | −2.71 | Yc41 | 1.00 |
| CT1/CT2 | 3.33 | Yc41/f | 0.34 |
| CT1/CT3 | 2.02 | Y52 | 2.34 |
| CT1/CT4 | 1.18 | Y52/f | 0.80 |

9th Embodiment

Figure 17:
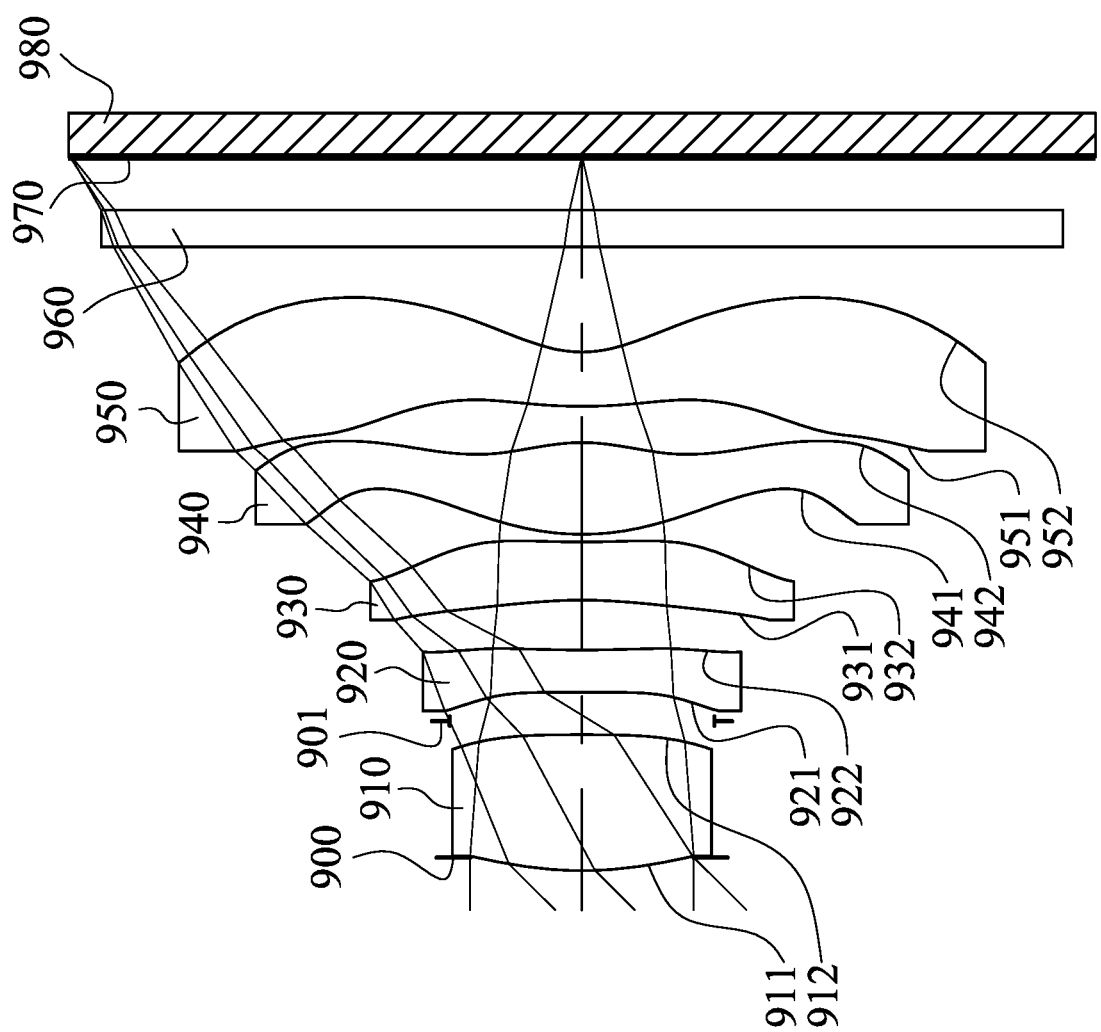
FIG. 17 is a schematic view of an imaging apparatus according to the 9th embodiment of the present disclosure.
Figure 18:
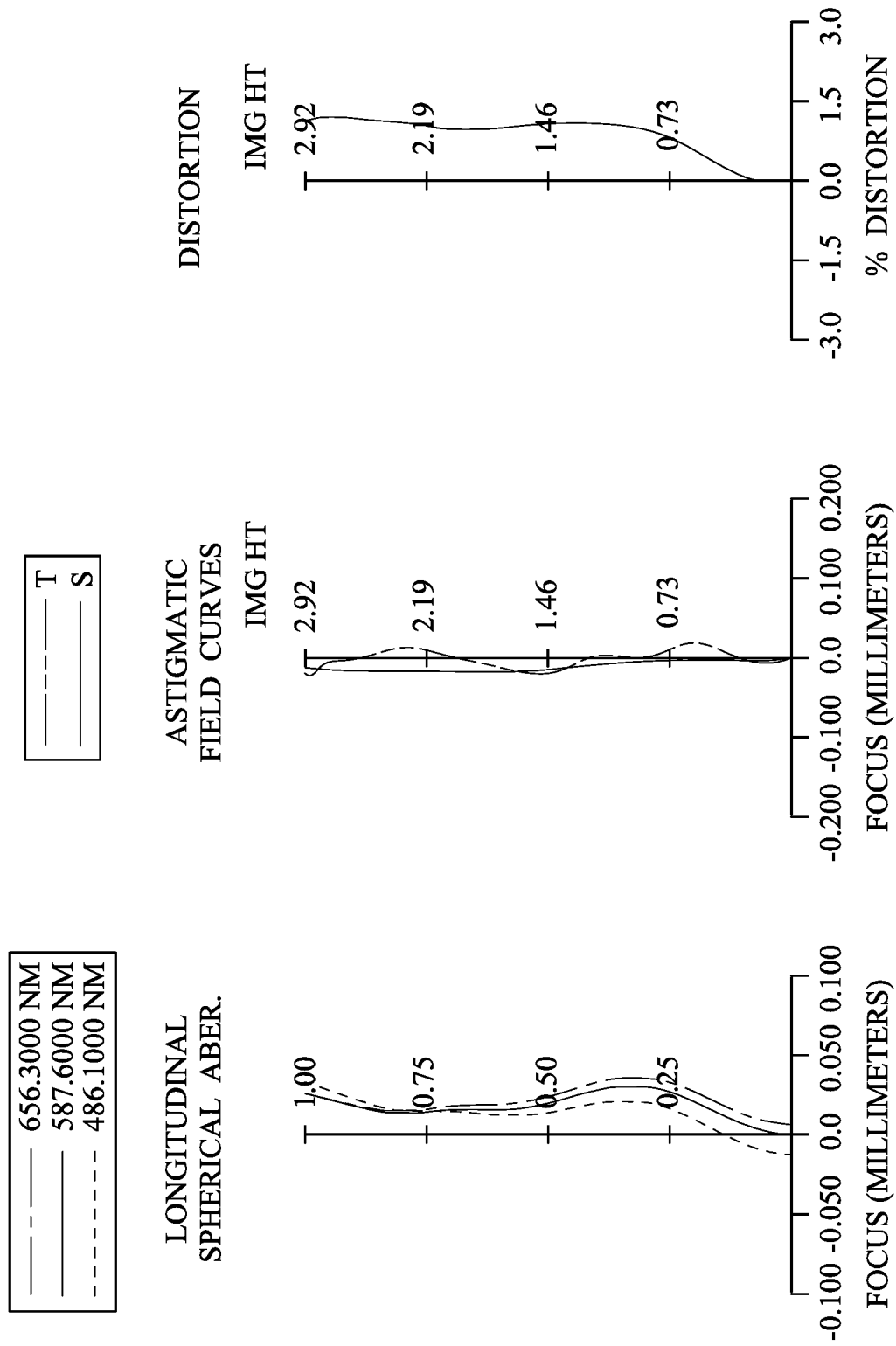
FIG. 18 shows, in order from left to right, spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows, in order from left to right, spherical aberration curves, astigmatic field curves and a distortion curve of the imaging apparatus of the 9th embodiment. In FIG. 17, the imaging apparatus according to the 9th embodiment includes an image lens assembly (its reference number is omitted) and an image sensor 980. The image lens assembly includes, in order from an object side to an image side along an optical path, an aperture stop 900, a first lens element 910, a stop 901, a second lens element 920, a third lens element 930, a fourth lens element 940, a fifth lens element 950, a filter 960 and an image surface 970, wherein the image sensor 980 is disposed on the image surface 970 of the image lens assembly. The image lens assembly includes five lens elements (910, 920, 930, 940, 950) without additional one or more lens elements inserted between the first lens element 910 and the fifth lens element 950.

The first lens element 910 with positive refractive power has an object-side surface 911 being convex in a paraxial region thereof and an image-side surface 912 being convex in a paraxial region thereof. The first lens element 910 is made of plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material, and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material, and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material, and has the object-side surface 941 and the image-side surface 942 being both aspheric. Moreover, the object-side surface 941 of the fourth lens element 940 includes at least one concave critical point in an off-axis region thereof.

The fifth lens element 950 with negative refractive power has an object-side surface 951 being convex in a paraxial region thereof and an image-side surface 952 being concave in a paraxial region thereof. The fifth lens element 950 is made of plastic material, and has the object-side surface 951 and the image-side surface 952 being both aspheric. Moreover, the image-side surface 952 of the fifth lens element 950 includes at least one convex critical point in an off-axis region thereof.

The filter 960 is made of glass material and disposed between the fifth lens element 950 and the image surface 970 and will not affect a focal length of the image lens assembly.

The detailed optical data of the 9th embodiment are shown in Table 17 and the aspheric surface data are shown in Table 18 below.

TABLE 17

9th Embodiment
f = 2.87 mm, Fno = 2.25, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.075 | | | | |
| 2 | Lens 1 | 2.183 | ASP | 0.776 | Plastic | 1.545 | 56.1 | 3.52 |
| 3 | | −13.660 | ASP | 0.077 | | | | |
| 4 | Stop | Plano | | 0.165 | | | | |
| 5 | Lens 2 | 39.090 | ASP | 0.241 | Plastic | 1.686 | 18.4 | −12.02 |
| 6 | | 6.792 | ASP | 0.285 | | | | |
| 7 | Lens 3 | −2.746 | ASP | 0.332 | Plastic | 1.566 | 37.4 | −3.25 |
| 8 | | 5.805 | ASP | 0.044 | | | | |
| 9 | Lens 4 | 1.543 | ASP | 0.523 | Plastic | 1.544 | 56.0 | 1.26 |
| 10 | | −1.092 | ASP | 0.207 | | | | |
| 11 | Lens 5 | 3.079 | ASP | 0.310 | Plastic | 1.545 | 56.1 | −1.67 |
| 12 | | 0.679 | ASP | 0.600 | | | | |
| 13 | Filter | Plano | | 0.210 | Glass | 1.517 | 64.2 | — |
| 14 | | Plano | | 0.303 | | | | |
| 15 | Image | Plano | | 0.000 | | | | |

Reference wavelength is 587.6 nm (d-line).
Effective radius of Surface 4 (Stop 901) is 0.755 mm.

TABLE 18

Aspheric Coefficients

| Surface # | | | | | |
|---|---|---|---|---|---|
| | 2 | 3 | 5 | 6 | 7 |
| k= | −1.6496E+01 | 0.0000E+00 | 0.0000E+00 | 0.0000E+00 | −5.4359E+00 |
| A4= | 6.8066E−02 | −2.2514E−01 | −4.2835E−01 | −1.0885E−01 | 2.6813E−01 |
| A6= | 8.3174E−01 | −1.4825E−01 | 2.0599E−01 | −3.8164E−01 | −7.4576E−01 |
| A8= | −7.3234E+00 | 5.2625E−01 | −2.7639E+00 | 5.4938E−01 | 1.9990E+00 |
| A10= | 2.6538E+01 | −1.0961E+00 | 1.0435E+01 | 1.8809E−01 | −4.0676E+00 |
| A12= | −4.6881E+01 | 1.9316E+00 | −1.4553E+01 | −5.2828E−01 | 5.3962E+00 |
| A14= | 3.2327E+01 | −1.2284E+00 | 9.5007E+00 | 2.3908E−01 | −4.4083E+00 |
| A16= | | | −2.5636E+00 | −2.2878E−02 | 2.0232E+00 |
| A18= | | | | | −4.0134E−01 |

| Surface # | | | | | |
|---|---|---|---|---|---|
| | 8 | 9 | 10 | 11 | 12 |
| k= | 0.0000E+00 | −6.2082E−01 | −9.7571E−01 | 0.0000E+00 | −9.8214E−01 |
| A4= | −1.5992E−01 | 5.8266E−02 | 1.0229E+00 | 1.3910E−01 | −1.0012E+00 |
| A6= | −1.2386E+00 | −4.3239E−01 | −7.6698E−01 | −1.7124E+00 | 1.0571E+00 |
| A8= | 3.0962E+00 | 6.3225E−01 | −1.5151E−01 | 3.4955E+00 | −8.9118E−01 |
| A10= | −3.6375E+00 | −7.0695E−01 | 7.7744E−01 | −3.9483E+00 | 5.8474E−01 |
| A12= | 2.5944E+00 | 5.9011E−01 | −6.7753E−01 | 2.8199E+00 | −2.9833E−01 |
| A14= | −1.1937E+00 | −3.3644E−01 | 2.7864E−01 | −1.3226E+00 | 1.1638E−01 |
| A16= | 3.4392E−01 | 1.1737E−01 | −3.8298E−02 | 4.1173E−01 | −3.3813E−02 |
| A18= | −4.7897E−02 | −2.2043E−02 | −1.3557E−02 | −8.4183E−02 | 7.0950E−03 |
| A20= | | 1.6928E−03 | 6.8985E−03 | 1.0861E−02 | −1.0343E−03 |
| A22= | | | −1.1709E−03 | −8.0170E−04 | 9.8712E−05 |
| A24= | | | 7.3236E−05 | 2.5803E−05 | −5.5205E−06 |
| A26= | | | | | 1.3666E−07 |

In the t embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.87 | CT1/CT5 | 2.50 |
| Fno | 2.25 | CT1/ΣAT | 1.00 |
| HFOV [deg.] | 45.1 | T12/CT2 | 1.00 |
| FOV [deg.] | 90.2 | T12/T23 | 0.85 |
| Vmin | 18.4 | T12/T34 | 5.50 |
| V2 + V3 | 55.8 | T12/T45 | 1.17 |
| V1/N1 | 36.30 | f3/f1 | −0.92 |
| V2/N2 | 10.90 | |f3/f2| | 0.27 |
| V3/N3 | 23.91 | (f/f4)−(f/f5) | 3.98 |
| V4/N4 | 36.26 | Td/EPD | 2.32 |
| V5/N5 | 36.30 | TL/ImgH | 1.39 |
| f/R7 | 1.86 | ImgH/BL | 2.62 |
| f/R8 | −2.63 | Yc41 | 1.16 |
| CT1/CT2 | 3.22 | Yc41/f | 0.40 |
| CT1/CT3 | 2.34 | Y52 | 2.30 |
| CT1/CT4 | 1.48 | Y52/f | 0.80 |

10th Embodiment

Figure 19:
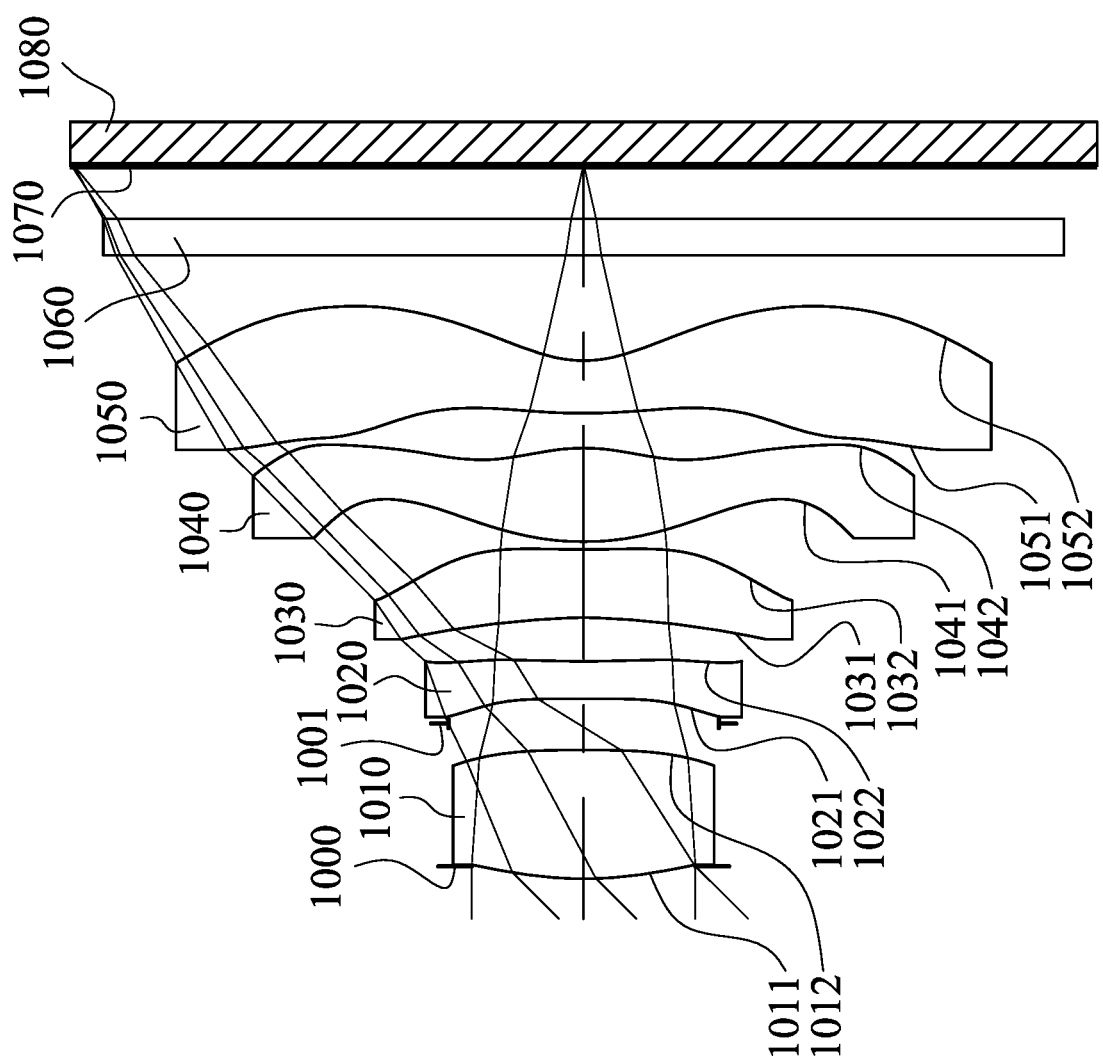
FIG. 19 is a schematic view of an imaging apparatus according to the 10th embodiment of the present disclosure.
Figure 20:
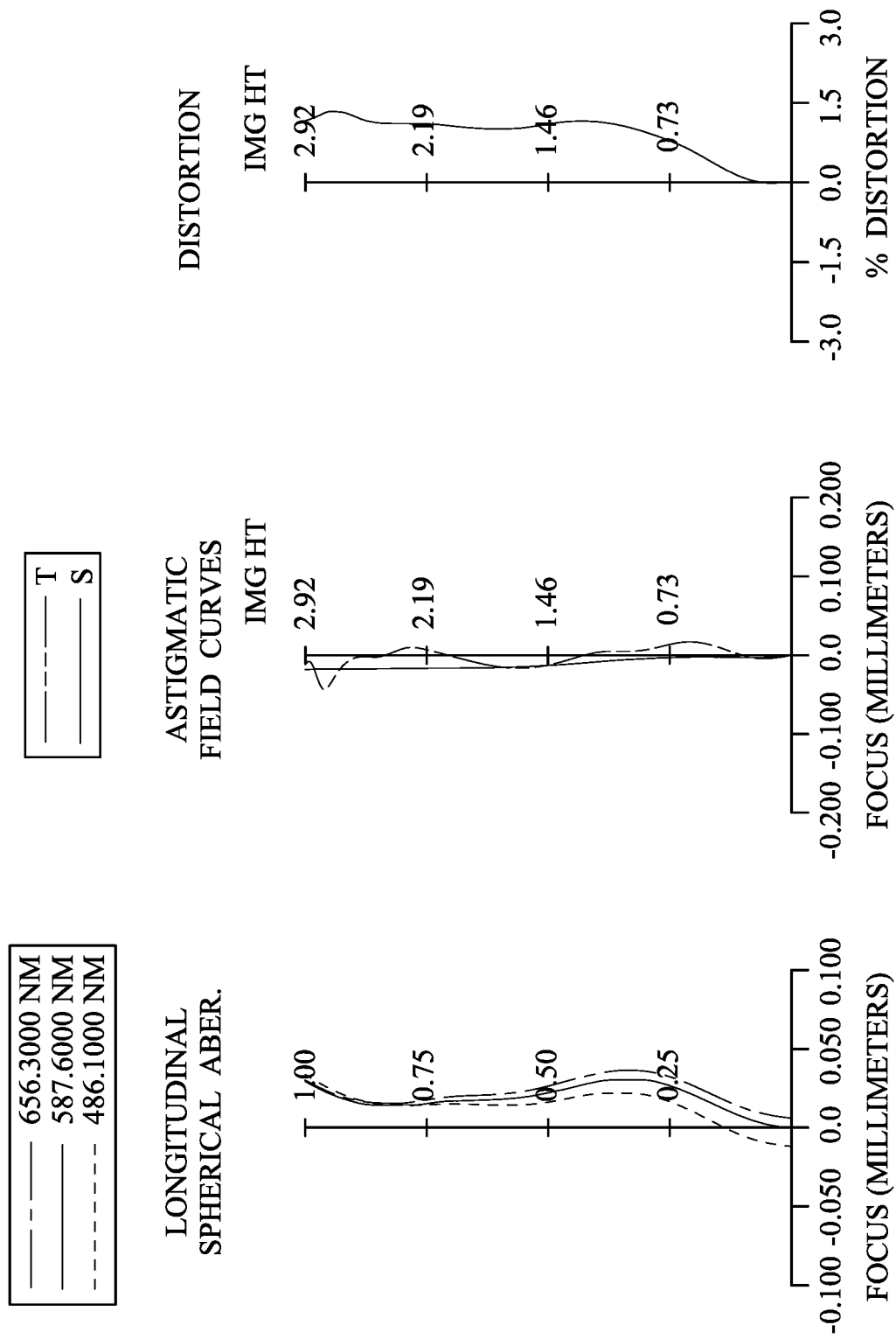
FIG. 20 shows, in order from left to right, spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows, in order from left to right, spherical aberration curves, astigmatic field curves and a distortion curve of the imaging apparatus of the 10th embodiment. In FIG. 19, the imaging apparatus according to the 10th embodiment includes an image lens assembly (its reference number is omitted) and an image sensor 1080. The image lens assembly includes, in order from an object side to an image side along an optical path, an aperture stop 1000, a first lens element 1010, a stop 1001, a second lens element 1020, a third lens element 1030, a fourth lens element 1040, a fifth lens element 1050, a filter 1060 and an image surface 1070, wherein the image sensor 1080 is disposed on the image surface 1070 of the image lens assembly. The image lens assembly includes five lens elements (1010, 1020, 1030, 1040, 1050) without additional one or more lens elements inserted between the first lens element 1010 and the fifth lens element 1050.

The first lens element 1010 with positive refractive power has an object-side surface 1011 being convex in a paraxial region thereof and an image-side surface 1012 being convex in a paraxial region thereof. The first lens element 1010 is made of plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material, and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of plastic material, and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material, and has the object-side surface 1041 and the image-side surface 1042 being both aspheric. Moreover, the object-side surface 1041 of the fourth lens element 1040 includes at least one concave critical point in an off-axis region thereof.

The fifth lens element 1050 with negative refractive power has an object-side surface 1051 being convex in a paraxial region thereof and an image-side surface 1052 being concave in a paraxial region thereof. The fifth lens element 1050 is made of plastic material, and has the object-side surface 1051 and the image-side surface 1052 being both aspheric. Moreover, the image-side surface 1052 of the fifth lens element 1050 includes at least one convex critical point in an off-axis region thereof.

The filter 1060 is made of glass material and disposed between the fifth lens element 1050 and the image surface 1070 and will not affect a focal length of the image lens assembly.

The detailed optical data of the 10th embodiment are shown in Table 19 and the aspheric surface data are shown in Table 20 below.

TABLE 19

10th Embodiment
f = 2.87 mm, Fno = 2.25, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.071 | | | | |
| 2 | Lens 1 | 2.224 | ASP | 0.735 | Plastic | 1.545 | 56.1 | 3.37 |
| 3 | | −9.266 | ASP | 0.150 | | | | |
| 4 | Stop | Plano | | 0.142 | | | | |
| 5 | Lens 2 | 100.000 | ASP | 0.214 | Plastic | 1.686 | 18.4 | −9.80 |
| 6 | | 6.294 | ASP | 0.249 | | | | |
| 7 | Lens 3 | −2.784 | ASP | 0.390 | Plastic | 1.566 | 37.4 | −4.07 |
| 8 | | 14.077 | ASP | 0.044 | | | | |
| 9 | Lens 4 | 1.728 | ASP | 0.534 | Plastic | 1.544 | 56.0 | 1.30 |
| 10 | | −1.069 | ASP | 0.199 | | | | |
| 11 | Lens 5 | 4.084 | ASP | 0.300 | Plastic | 1.545 | 56.1 | −1.58 |
| 12 | | 0.694 | ASP | 0.600 | | | | |
| 13 | Filter | Plano | | 0.210 | Glass | 1.517 | 64.2 | — |
| 14 | | Plano | | 0.302 | | | | |
| 15 | Image | Plano | | 0.000 | | | | |

Reference wavelength is 587.6 nm (d-line).
Effective radius of Surface 4 (Stop 1001) is 0.770 mm.

TABLE 20

Aspheric Coefficients

| | Surface # | | | | |
|---|---|---|---|---|---|
| | 2 | 3 | 5 | 6 | 7 |
| k= | −2.2667E+01 | 0.0000E+00 | 0.0000E+00 | 0.0000E+00 | −3.0656E+00 |
| A4= | 1.2539E−01 | −2.0595E−01 | −4.9238E−01 | −2.0216E−01 | 2.9377E−01 |
| A6= | 4.8732E−01 | −8.2287E−02 | 6.2324E−01 | 7.2788E−03 | −1.1159E+00 |
| A8= | −5.7420E+00 | 2.6324E−01 | −3.7455E+00 | −3.9732E−01 | 3.6494E+00 |
| A10= | 2.1414E+01 | −6.1822E−01 | 1.1461E+01 | 1.5973E+00 | −8.0946E+00 |
| A12= | −3.7843E+01 | 1.4555E+00 | −1.3576E+01 | −1.5042E+00 | 1.0968E+01 |
| A14= | 2.5869E+01 | −1.1095E+00 | 6.1343E+00 | 4.3203E−01 | −8.7916E+00 |
| A16= | | | −4.0858E−01 | 1.9162E−02 | 3.8698E+00 |
| A18= | | | | | −7.2530E−01 |

| | Surface # | | | | |
|---|---|---|---|---|---|
| | 8 | 9 | 10 | 11 | 12 |
| k= | 0.0000E+00 | −3.5825E−01 | −9.9511E−01 | 0.0000E+00 | −9.6713E−01 |
| A4= | 9.2394E−02 | 2.4262E−01 | 1.0306E+00 | 1.9256E−01 | −1.0003E+00 |
| A6= | −2.4133E+00 | −1.1816E+00 | −7.1961E−01 | −1.7323E+00 | 1.1445E+00 |
| A8= | 6.1838E+00 | 2.5110E+00 | 4.7592E−02 | 3.8810E+00 | −1.0658E+00 |
| A10= | −8.5536E+00 | −3.5782E+00 | 6.0567E−01 | −5.0785E+00 | 7.4111E−01 |
| A12= | 7.3299E+00 | 3.2928E+00 | 3.2286E−01 | 4.2731E+00 | −3.8054E−01 |
| A14= | −3.9142E+00 | −1.9436E+00 | −4.0780E−01 | −2.3890E+00 | 1.4439E−01 |
| A16= | 1.2075E+00 | 7.2583E−01 | 2.4152E−01 | 9.0430E−01 | −4.0289E−02 |
| A18= | −1.6465E−01 | −1.6513E−01 | −8.3087E−02 | −2.3293E−01 | 8.1249E−03 |
| A20= | | 2.0863E−02 | 1.7080E−02 | 4.0264E−02 | −1.1453E−03 |
| A22= | | −1.1230E−03 | −1.9530E−03 | −4.4748E−03 | 1.0638E−04 |
| A24= | | | 9.5743E−05 | 2.8918E−04 | −5.8197E−06 |
| A26= | | | | −8.2654E−06 | 1.4136E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

11th Embodiment

| 10th Embodiment | | | |
|---|---|---|---|
| f [mm] | 2.87 | CT1/CT5 | 2.45 |
| Fno | 2.25 | CT1/ΣAT | 0.94 |
| HFOV [deg.] | 45.0 | T12/CT2 | 1.36 |
| FOV [deg.] | 90.0 | T12/T23 | 1.17 |
| Vmin | 18.4 | T12/T34 | 6.64 |
| V2 + V3 | 55.8 | T12/T45 | 1.47 |
| V1/N1 | 36.30 | f3/f1 | −1.21 |
| V2/N2 | 10.90 | \|f3/f2\| | 0.42 |
| V3/N3 | 23.91 | (f/f4)-(f/f5) | 4.02 |
| V4/N4 | 36.26 | Td/EPD | 2.32 |
| V5/N5 | 36.30 | TL/ImgH | 1.39 |
| f/R7 | 1.66 | ImgH/BL | 2.63 |
| f/R8 | −2.68 | Yc41 | 1.13 |
| CT1/CT2 | 3.43 | Yc41/f | 0.39 |
| CT1/CT3 | 1.88 | Y52 | 2.32 |
| CT1/CT4 | 1.38 | Y52/f | 0.81 |

Figure 21:
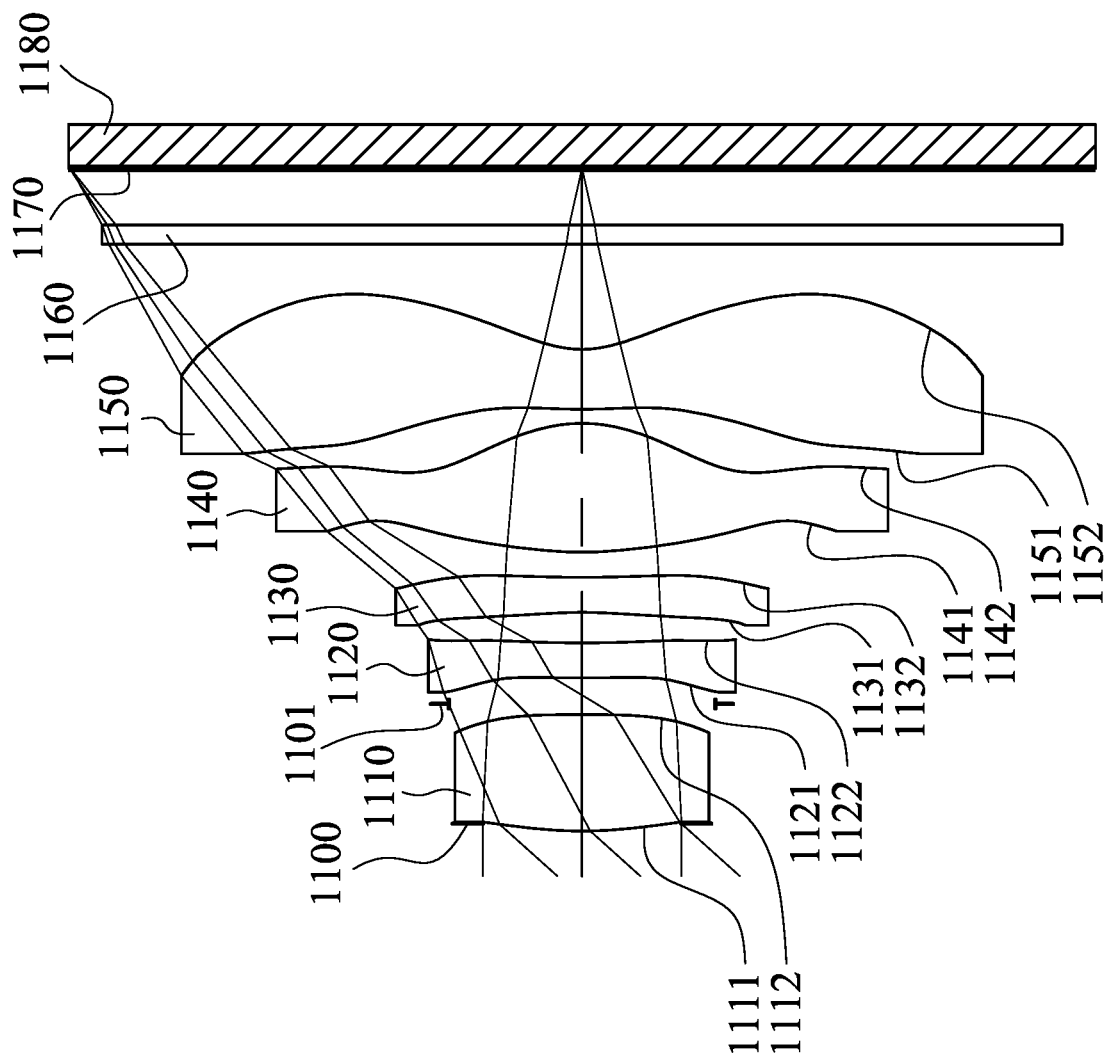
FIG. 21 is a schematic view of an imaging apparatus according to the 11th embodiment of the present disclosure.
Figure 22:
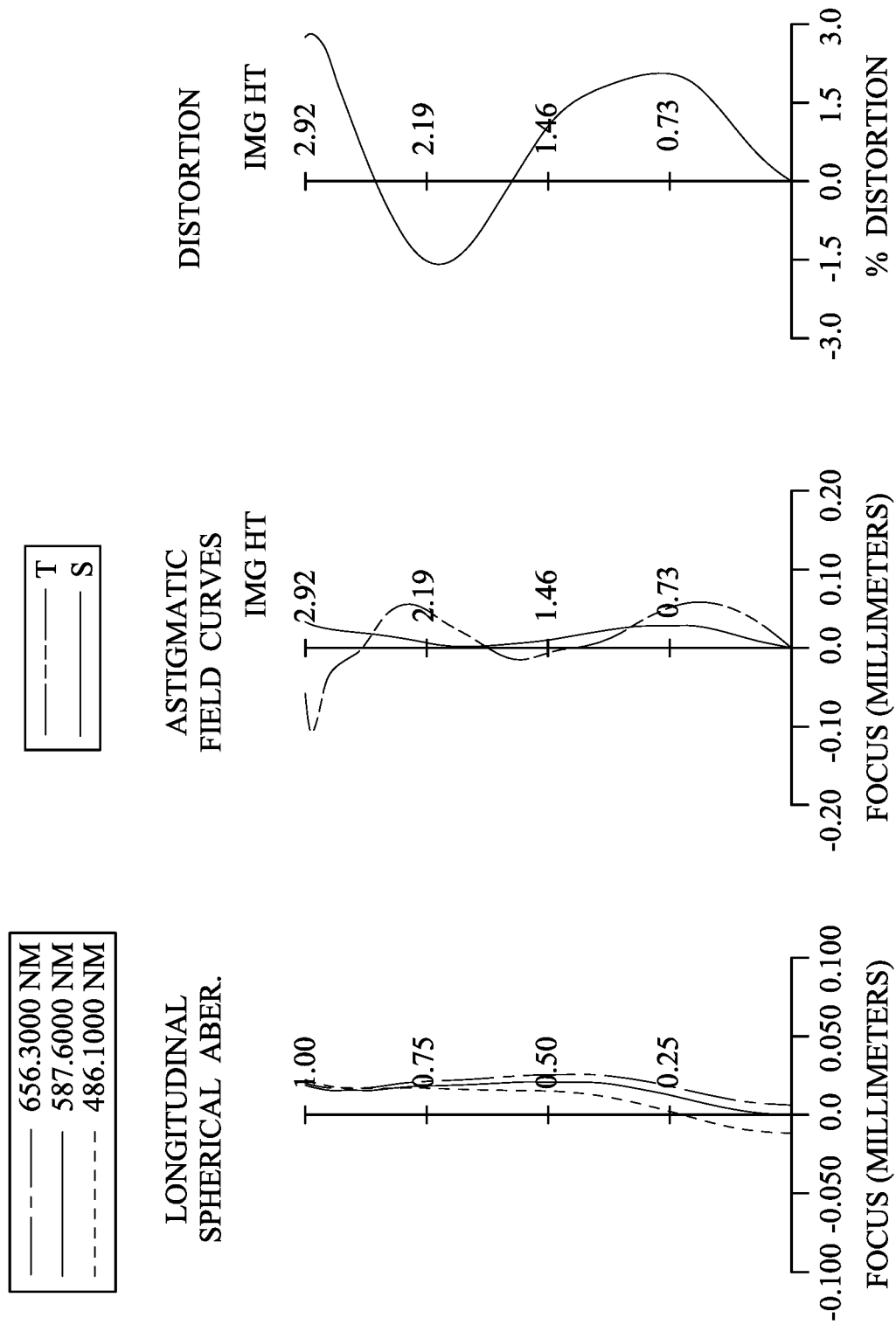
FIG. 22 shows, in order from left to right, spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows, in order from left to right, spherical aberration curves, astigmatic field curves and a distortion curve of the imaging apparatus of the 11th embodiment. In FIG. 21, the imaging apparatus according to the 11th embodiment includes an image lens assembly (its reference number is omitted) and an image sensor 1180. The image lens assembly includes, in order from an object side to an image side along an optical path, an aperture stop 1100, a first lens element 1110, a stop 1101, a second lens element 1120, a third lens element 1130, a fourth lens element 1140, a fifth lens element 1150, a filter 1160 and an image surface 1170, wherein the image sensor 1180 is disposed on the image surface 1170 of the image lens assembly. The image lens assembly includes five lens elements (1110, 1120, 1130, 1140, 1150) without additional one or more lens elements inserted between the first lens element 1110 and the fifth lens element 1150.

The first lens element 1110 with positive refractive power has an object-side surface 1111 being convex in a paraxial region thereof and an image-side surface 1112 being convex in a paraxial region thereof. The first lens element 1110 is made of glass material, and has the object-side surface 1111 and the image-side surface 1112 being both aspheric.

The second lens element 1120 with positive refractive power has an object-side surface 1121 being convex in a paraxial region thereof and an image-side surface 1122 being concave in a paraxial region thereof. The second lens element 1120 is made of plastic material, and has the object-side surface 1121 and the image-side surface 1122 being both aspheric.

The third lens element 1130 with negative refractive power has an object-side surface 1131 being concave in a paraxial region thereof and an image-side surface 1132 being concave in a paraxial region thereof. The third lens element 1130 is made of plastic material, and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material, and has the object-side surface 1141 and the image-side surface 1142 being both aspheric. Moreover, the object-side surface 1141 of the fourth lens element 1140 includes at least one concave critical point in an off-axis region thereof.

The fifth lens element 1150 with negative refractive power has an object-side surface 1151 being convex in a paraxial region thereof and an image-side surface 1152 being concave in a paraxial region thereof. The fifth lens element 1150 is made of plastic material, and has the object-side surface 1151 and the image-side surface 1152 being both aspheric. Moreover, the image-side surface 1152 of the fifth lens element 1150 includes at least one convex critical point in an off-axis region thereof.

The filter 1160 is made of glass material and disposed between the fifth lens element 1150 and the image surface 1170 and will not affect a focal length of the image lens assembly.

The detailed optical data of the 11th embodiment are shown in Table 21 and the aspheric surface data are shown in Table 22 below.

TABLE 21

11th Embodiment
f = 2.55 mm, Fno = 2.25, HFOV = 48.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.042 | | | | |
| 2 | Lens 1 | 2.572 | ASP | 0.664 | Glass | 1.613 | 59.0 | 3.59 |
| 3 | | −13.704 | ASP | 0.060 | | | | |
| 4 | Stop | Plano | | 0.149 | | | | |
| 5 | Lens 2 | 7.199 | ASP | 0.200 | Plastic | 1.669 | 19.5 | 22.09 |
| 6 | | 13.878 | ASP | 0.174 | | | | |
| 7 | Lens 3 | −2.377 | ASP | 0.200 | Plastic | 1.634 | 23.8 | −2.97 |
| 8 | | 9.278 | ASP | 0.143 | | | | |
| 9 | Lens 4 | 2.035 | ASP | 0.735 | Plastic | 1.546 | 51.5 | 1.24 |
| 10 | | −0.887 | ASP | 0.080 | | | | |
| 11 | Lens 5 | 2.886 | ASP | 0.342 | Plastic | 1.545 | 56.0 | −1.52 |
| 12 | | 0.615 | ASP | 0.600 | | | | |

TABLE 21-continued

11th Embodiment
f = 2.55 mm, Fno = 2.25, HFOV = 48.0 deg.

| Surface # | | Curvature Radius | Thickness | Material | Index | Abbe # | Focal Length |
|---|---|---|---|---|---|---|---|
| 13 | Filter | Plano | 0.110 | Glass | 1.517 | 64.2 | — |
| 14 | | Plano | 0.322 | | | | |
| 15 | Image | Plano | 0.000 | | | | |

Reference wavelength is 587.6 nm (d-line).
Effective radius of Surface 4 (Stop 1101) is 0.760 mm.

TABLE 22

Aspheric Coefficients

| | Surface # | | | | |
|---|---|---|---|---|---|
| | 2 | 3 | 5 | 6 | 7 |
| k= | −2.6800E+01 | 0.0000E+00 | 0.0000E+00 | 3.5596E+01 | −2.0801E+00 |
| A4= | 1.2264E−01 | −3.3233E−01 | −3.0956E−01 | 5.0429E−01 | 1.0271E+00 |
| A6= | −4.5081 E−01 | −6.8305E−02 | −7.6903E−01 | −3.2680E+00 | −4.0045E+00 |
| A8= | 7.6557E−01 | 4.1345E−02 | −1.7512E+00 | 8.6870E+00 | 9.6451E+00 |
| A10= | −2.2365E+00 | 2.6614E−01 | 1.2715E+01 | −1.4092E+01 | −1.3845E+01 |
| A12= | 5.5759E+00 | 6.3271E−01 | −1.7860E+01 | 1.5506E+01 | 1.1059E+01 |
| A14= | −6.7802E+00 | −9.8635E−01 | 8.1060E+00 | −1.0456E+01 | −4.2285E+00 |
| A16= | | | | 3.1588E+00 | 4.1240E−01 |

| | Surface # | | | | |
|---|---|---|---|---|---|
| | 8 | 9 | 10 | 11 | 12 |
| k= | −1.0000E+00 | −3.2460E−01 | −1.0795E+00 | 0.0000E+00 | −9.7743E−01 |
| A4= | 7.8518E−02 | −5.2559E−01 | 1.4166E−01 | −9.8548E−01 | −1.5694E+00 |
| A6= | −7.4554E−01 | 1.7177E+00 | 2.5427E−01 | 1.7536E+00 | 2.7764E+00 |
| A8= | 9.2016E−01 | −4.1206E+00 | −6.4586E−01 | −2.3450E+00 | −3.9849E+00 |
| A10= | 2.6566E−02 | 7.3493E+00 | 2.1643E+00 | 2.7431E+00 | 4.2872E+00 |
| A12= | −9.5717E−01 | −9.5947E+00 | −3.8392E+00 | −2.8009E+00 | −3.3830E+00 |
| A14= | 7.3834E−01 | 8.9964E+00 | 3.8118E+00 | 2.2499E+00 | 1.9420E+00 |
| A16= | −1.6677E−01 | −5.9452E+00 | −2.3529E+00 | −1.3134E+00 | −8.0853E−01 |
| A18= | | 2.6687E+00 | 9.4697E−01 | 5.3928E−01 | 2.4282E−01 |
| A20= | | −7.6459E−01 | −2.4997E−01 | −1.5322E−01 | −5.1912E−02 |
| A22= | | 1.2490E−01 | 4.1862E−02 | 2.9446E−02 | 7.6886E−03 |
| A24= | | −8.7937E−03 | −4.0432E−03 | −3.6513E−03 | −7.4859E−04 |
| A26= | | | 1.7181E−04 | 2.6366E−04 | 4.3044E−05 |
| A28= | | | | −8.4224E−06 | −1.1064E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 2.55 | CT1/CT5 | 1.94 |
| Fno | 2.25 | CT1/ΣAT | 1.10 |
| HFOV [deg.] | 48.0 | T12/CT2 | 1.05 |
| FOV [deg.] | 96.0 | T12/T23 | 1.20 |
| Vmin | 19.5 | T12/T34 | 1.46 |
| V2 + V3 | 43.3 | T12/T45 | 2.61 |
| V1/N1 | 36.57 | f3/f1 | −0.83 |
| V2/N2 | 11.65 | |f3/f2| | 0.13 |
| V3/N3 | 14.59 | (f/f4)−(f/f5) | 3.73 |
| V4/N4 | 33.34 | Td/EPD | 2.43 |
| V5/N5 | 36.27 | TL/ImgH | 1.29 |

-continued

| 11th Embodiment | | | |
|---|---|---|---|
| f/R7 | 1.25 | ImgH/BL | 2.83 |
| f/R8 | −2.87 | Yc41 | 1.17 |
| CT1/CT2 | 3.32 | Yc41/f | 0.46 |
| CT1/CT3 | 3.32 | Y52 | 2.28 |
| CT1/CT4 | 0.90 | Y52/f | 0.90 |

12th Embodiment

Figure 23:
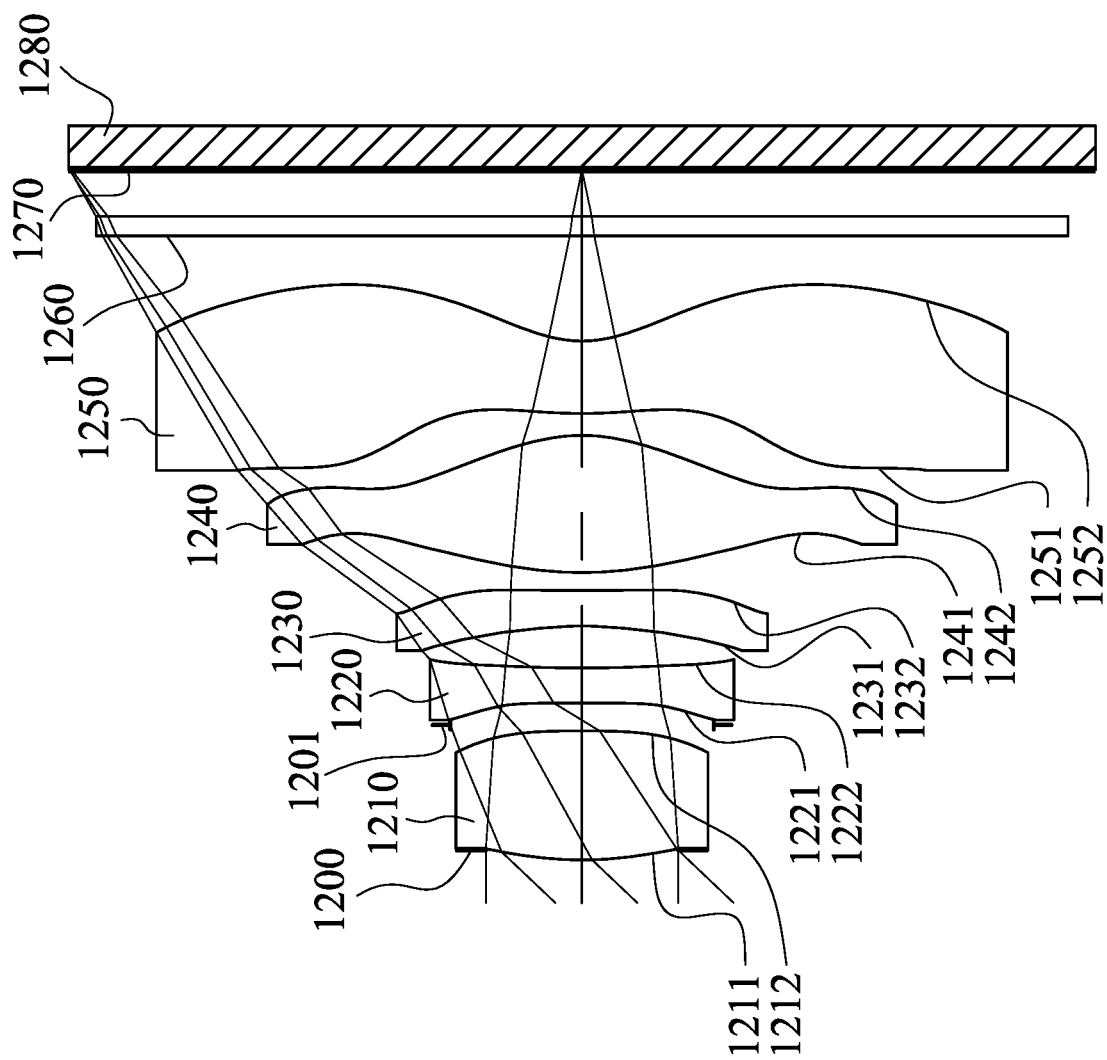
FIG. 23 is a schematic view of an imaging apparatus according to the 12th embodiment of the present disclosure.
Figure 24:
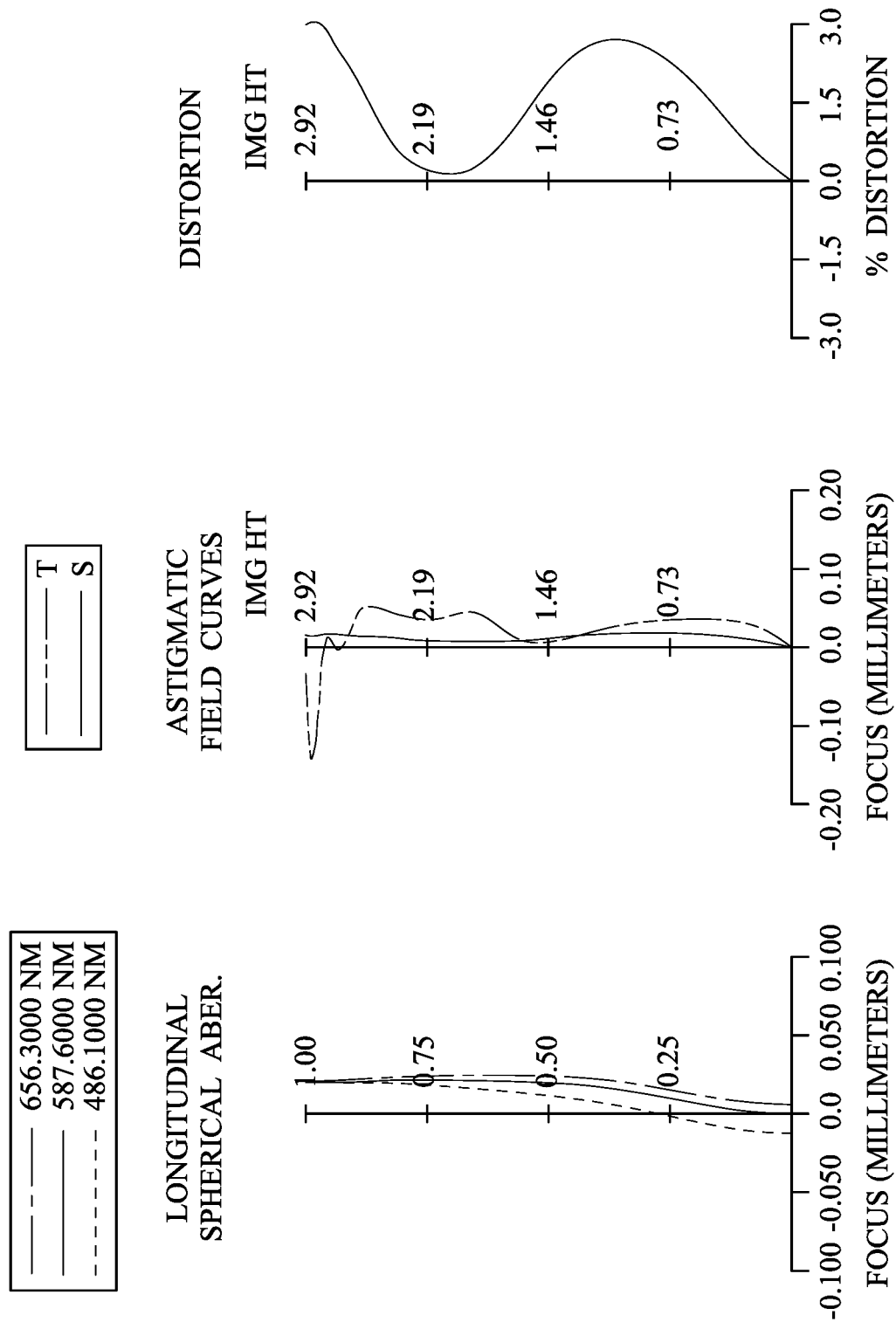
FIG. 24 shows, in order from left to right, spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows, in order from left to right, spherical aberration curves, astigmatic field curves and a distortion curve of the imaging apparatus of the 12th embodiment. In FIG. 23, the imaging apparatus according to the 12th embodiment includes an image lens assembly (its reference number is omitted) and an image sensor 1280. The image lens assembly includes, in order from an object side to an image side along an optical path, an aperture stop 1200, a first lens element 1210, a stop 1201, a second lens element 1220, a third lens element 1230, a fourth lens element 1240, a fifth lens element 1250, a filter 1260 and an image surface 1270, wherein the image sensor 1280 is disposed on the image surface 1270 of the image lens assembly. The image lens assembly includes five lens elements (1210, 1220, 1230, 1240, 1250) without additional one or more lens elements inserted between the first lens element 1210 and the fifth lens element 1250.

The first lens element 1210 with positive refractive power has an object-side surface 1211 being convex in a paraxial region thereof and an image-side surface 1212 being convex in a paraxial region thereof. The first lens element 1210 is made of plastic material, and has the object-side surface 1211 and the image-side surface 1212 being both aspheric.

The second lens element 1220 with negative refractive power has an object-side surface 1221 being convex in a paraxial region thereof and an image-side surface 1222 being concave in a paraxial region thereof. The second lens element 1220 is made of plastic material, and has the object-side surface 1221 and the image-side surface 1222 being both aspheric.

The third lens element 1230 with negative refractive power has an object-side surface 1231 being concave in a paraxial region thereof and an image-side surface 1232 being concave in a paraxial region thereof. The third lens element 1230 is made of plastic material, and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of plastic material, and has the object-side surface 1241 and the image-side surface 1242 being both aspheric. Moreover, the object-side surface 1241 of the fourth lens element 1240 includes at least one concave critical point in an off-axis region thereof.

The fifth lens element 1250 with negative refractive power has an object-side surface 1251 being convex in a paraxial region thereof and an image-side surface 1252 being concave in a paraxial region thereof. The fifth lens element 1250 is made of plastic material, and has the object-side surface 1251 and the image-side surface 1252 being both aspheric. Moreover, the image-side surface 1252 of the fifth lens element 1250 includes at least one convex critical point in an off-axis region thereof.

The filter 1260 is made of glass material and disposed between the fifth lens element 1250 and the image surface 1270 and will not affect a focal length of the image lens assembly.

The detailed optical data of the 12th embodiment are shown in Table 23 and the aspheric surface data are shown in Table 24 below.

TABLE 23

12th Embodiment
f = 2.68 mm, Fno = 2.45, HFOV = 46.4 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.055 |  |  |  |  |
| 2 | Lens 1 | 2.123 | ASP | 0.736 | Plastic | 1.544 | 56.0 | 3.14 |
| 3 |  | −7.662 | ASP | 0.034 |  |  |  |  |
| 4 | Stop | Plano |  | 0.124 |  |  |  |  |
| 5 | Lens 2 | 30.357 | ASP | 0.200 | Plastic | 1.634 | 23.8 | −22.88 |
| 6 |  | 9.792 | ASP | 0.240 |  |  |  |  |
| 7 | Lens 3 | −1.989 | ASP | 0.202 | Plastic | 1.583 | 30.2 | −3.34 |
| 8 |  | 94.611 | ASP | 0.103 |  |  |  |  |
| 9 | Lens 4 | 2.348 | ASP | 0.781 | Plastic | 1.544 | 56.0 | 1.43 |
| 10 |  | −1.024 | ASP | 0.125 |  |  |  |  |
| 11 | Lens 5 | 2.703 | ASP | 0.413 | Plastic | 1.544 | 56.0 | −1.80 |
| 12 |  | 0.680 | ASP | 0.600 |  |  |  |  |
| 13 | Filter | Plano |  | 0.110 | Glass | 1.517 | 64.2 | — |
| 14 |  | Plano |  | 0.267 |  |  |  |  |
| 15 | Image | Plano |  | 0.000 |  |  |  |  |

Reference wavelength is 587.6 nm (d-line).
Effective radius of Surface 4 (Stop 1201) is 0.750 mm.

TABLE 24

Aspheric Coefficients

| Surface # | | | | | |
|---|---|---|---|---|---|
|  | 2 | 3 | 5 | 6 | 7 |
| k= | −2.7864E+01 | 0.0000E+00 | 0.0000E+00 | 9.2339E+01 | 8.6826E−01 |
| A4= | 2.9633E−01 | −3.4453E−01 | −3.0046E−01 | 2.7189E−01 | 7.7868E−01 |
| A6= | −9.5178E−01 | −4.4424E−01 | −1.1571E+00 | −2.1535E+00 | −3.4541 E+00 |
| A8= | 2.0993E+00 | 1.3364E+00 | 1.4320E+00 | 6.6007E+00 | 9.6145E+00 |
| A10= | −4.4885E+00 | −7.3370E−01 | 5.4209E+00 | −1.1373E+01 | −1.5770E+01 |
| A12= | 7.4431E+00 | −1.0436E+00 | −1.1641E+01 | 1.2304E+01 | 1.4798E+01 |
| A14= | −7.0682E+00 | 1.3759E+00 | 6.6358E+00 | −7.8976E+00 | −7.2813E+00 |
| A16= |  |  |  | 2.2901E+00 | 1.4176E+00 |

TABLE 24-continued

| Aspheric Coefficients | | | | |
|---|---|---|---|---|
| Surface # | | | | |
| 8 | 9 | 10 | 11 | 12 |
| k= −1.0000E+00 | −4.7491E−01 | −9.9536E−01 | 0.0000E+00 | −9.8166E−01 |
| A4= 3.6162E−01 | −1.2724E−02 | 4.2934E−01 | −3.5980E−01 | −9.7757E−01 |
| A6= −2.2824E+00 | 2.4750E−01 | −9.8864E−01 | −2.4857E−01 | 1.0981E+00 |
| A8= 4.4862E+00 | −1.8007E+00 | 3.2146E+00 | 7.4897E−01 | −1.0690E+00 |
| A10= −4.5584E+00 | 4.5977E+00 | −7.2730E+00 | −1.0020E+00 | 8.2831E−01 |
| A12= 2.2145E+00 | −6.6380E+00 | 1.0389E+01 | 1.0195E+00 | −4.8846E−01 |
| A14= −2.7363E−01 | 6.1441E+00 | −9.5229E+00 | −7.3591E−01 | 2.1288E−01 |
| A16= −7.1699E−02 | −3.7825E+00 | 5.7597E+00 | 3.6054E−01 | −6.7099E−02 |
| A18= | 1.5371E+00 | −2.3301E+00 | −1.1883E−01 | 1.4966E−02 |
| A20= | −3.9469E−01 | 6.2505E−01 | 2.5972E−02 | −2.2902E−03 |
| A22= | 5.7851E−02 | −1.0680E−01 | −3.6104E−03 | 2.2786E−04 |
| A24= | −3.6808E−03 | 1.0527E−02 | 2.8881E−04 | −1.3244E−05 |
| A26= | | −4.5561E−04 | −1.0112E−05 | 3.4068E−07 |

In the 12th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 2.68 | CT1/CT5 | 1.78 |
| Fno | 2.45 | CT1/ΣAT | 1.18 |
| HFOV [deg.] | 46.4 | T12/CT2 | 0.79 |
| FOV [deg.] | 92.8 | T12/T23 | 0.66 |
| Vmin | 23.8 | T12/T34 | 1.53 |
| V2 + V3 | 54.1 | T12/T45 | 1.26 |
| V1/N1 | 36.26 | f3/f1 | −1.06 |
| V2/N2 | 14.59 | |f3/f2| | 0.15 |
| V3/N3 | 19.11 | (f/f4)-(f/f5) | 3.37 |
| V4/N4 | 36.26 | Td/EPD | 2.70 |
| V5/N5 | 36.26 | TL/ImgH | 1.35 |
| f/R7 | 1.14 | ImgH/BL | 2.99 |
| f/R8 | −2.62 | Yc41 | 1.30 |
| CT1/CT2 | 3.68 | Yc41/f | 0.48 |
| CT1/CT3 | 3.64 | Y52 | 2.42 |
| CT1/CT4 | 0.94 | Y52/f | 0.90 |

13th Embodiment

Figure 25:
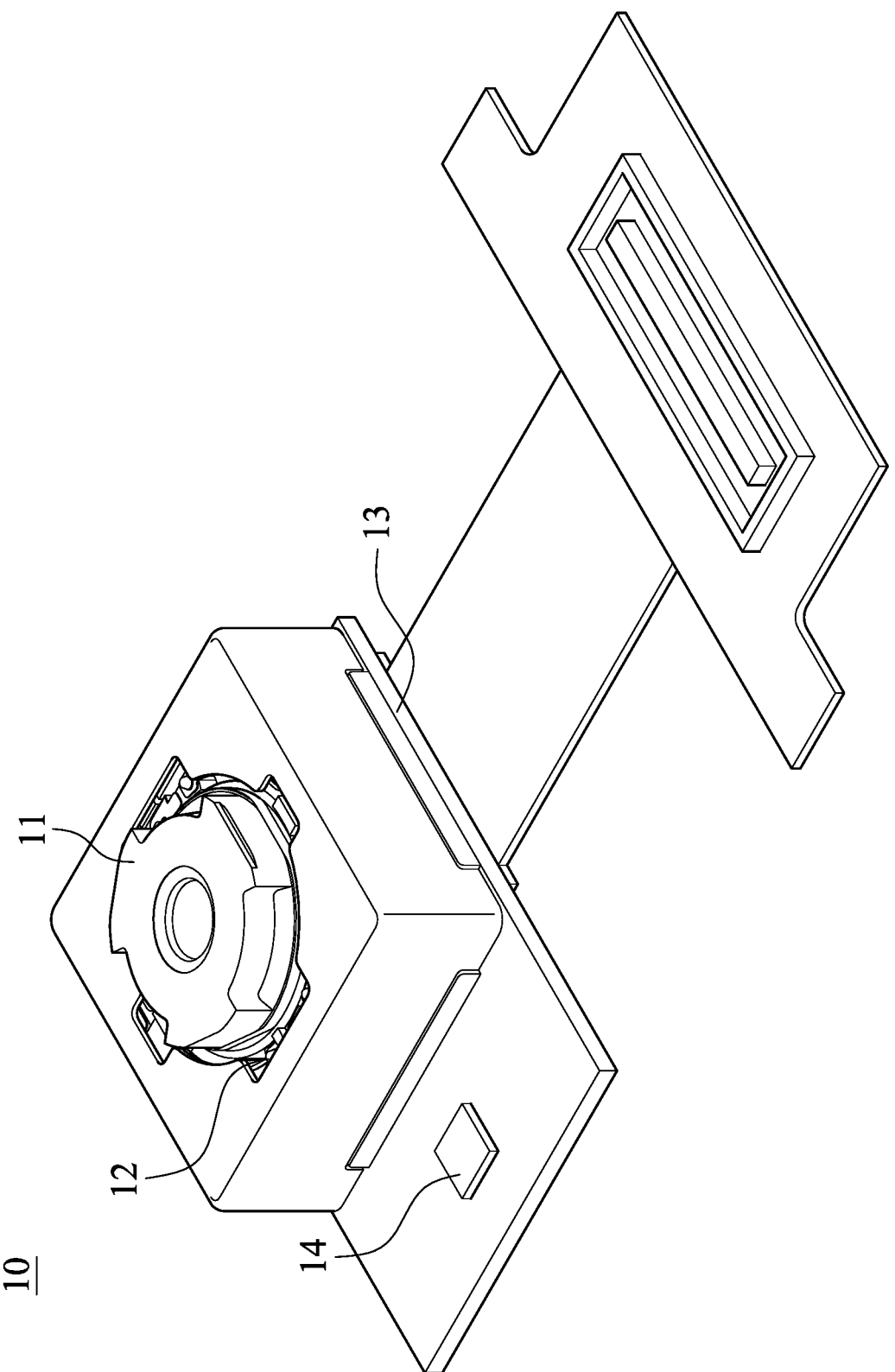
FIG. 25 is a three-dimensional schematic view of an imaging apparatus according to the 13th embodiment of the present disclosure.

FIG. 25 is a three-dimensional schematic view of an imaging apparatus 10 according to the 13th embodiment of the present disclosure. In FIG. 25, the imaging apparatus 10 of the 13th embodiment is a camera module, the imaging apparatus 10 includes an imaging lens assembly 11, a driving apparatus 12 and an image sensor 13, wherein the imaging lens assembly 11 includes the image lens assembly of the present disclosure and a lens barrel (its reference number is omitted) for carrying the image lens assembly. The imaging apparatus 10 can enable light converging from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys. The image lens assembly can obtain a favorable imaging position by the driving apparatus 12 so as to capture clear images when the imaged object is disposed at different object distances.

The imaging apparatus 10 can include the image sensor 13 located on the image surface of the image lens assembly, such as CMOS and CCD, with superior photosensitivity and low noise. Thus, it is favorable for providing realistic images with high definition image quality thereof.

Furthermore, the imaging apparatus 10 can further include an image stabilization module 14, which can be a kinetic energy sensor, such as an accelerometer, a gyro sensor, and a Hall Effect sensor. In the 13th embodiment, the image stabilization module 14 is a gyro sensor, but is not limited thereto. Therefore, the variation of different axial directions of the image lens assembly can be adjusted so as to correct the image blur generated by motion at the moment of exposure, and it is further favorable for enhancing the image quality while photographing in motion and low light situation.

Furthermore, advanced image correcting functions, such as optical image stabilizations (OIS) and electronic image stabilizations (EIS), can be provided.

14th Embodiment

Figure 26A:
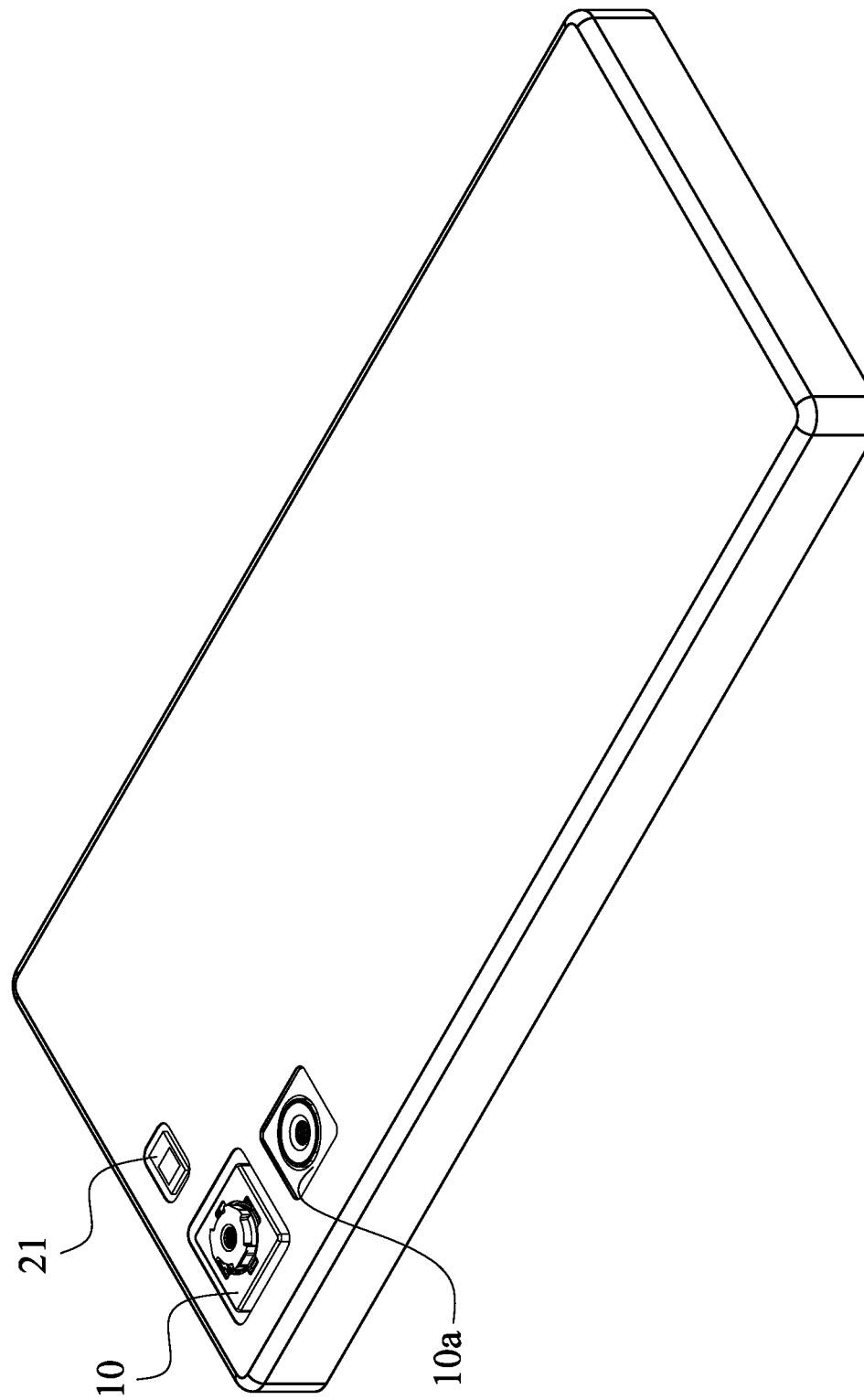
FIG. 26A is a schematic view of one side of an electronic device according to the 14th embodiment of the present disclosure.
Figure 26B:
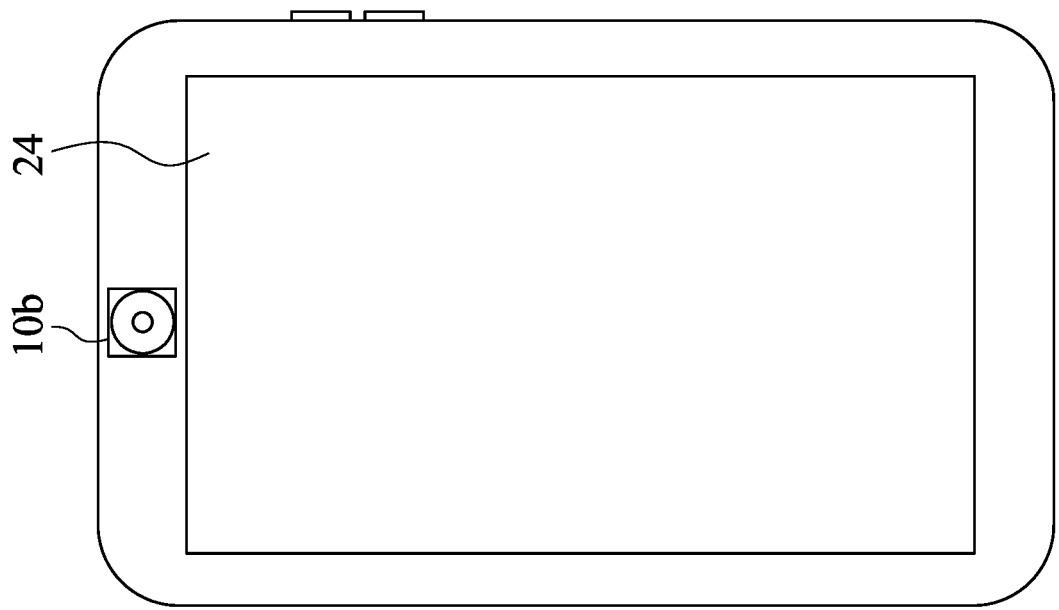
FIG. 26B is a schematic view of another side of the electronic device of FIG. 26A.
Figure 26C:
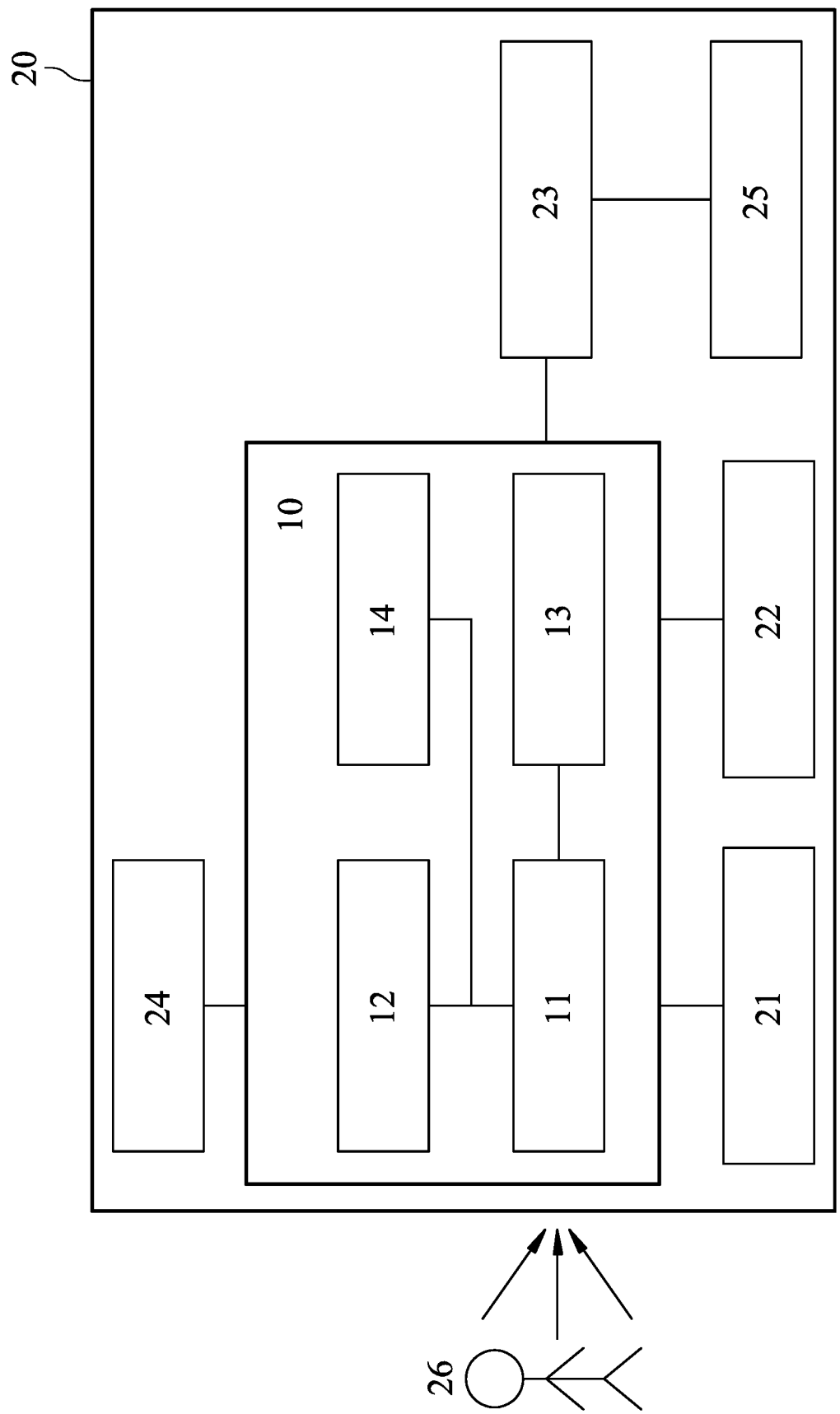
FIG. 26C is a system schematic view of the electronic device of FIG. 26A.

FIG. 26A is a schematic view of one side of an electronic device 20 according to the 14th embodiment of the present disclosure. FIG. 26B is a schematic view of another side of the electronic device 20 of FIG. 26A. FIG. 26C is a system schematic view of the electronic device 20 of FIG. 26A. In FIG. 26A, FIG. 26B and FIG. 26C, the electronic device 20 according to the 14th embodiment is a smartphone, wherein the electronic device 20 includes imaging apparatuses 10, 10a, a flash module 21, a focusing assisting module 22, an image signal processor (ISP) 23, a user interface 24 and an image software processor 25. The imaging apparatus 10b is a front camera. When a user captures images of the imaged object 26 through the user interface 24, the light rays converge in the imaging apparatus 10 to generate an image(s), and the flash module 21 is activated for light supplement. The focusing assisting module 22 detects the object distance of the imaged object 26 to achieve fast auto focusing. The image signal processor 23 and the image software processor 25 are configured to optimize the captured image to improve image quality. The light beam emitted from the focusing assisting module 22 can be either conventional infrared or laser. The user interface 24 can be a touch screen or a physical button. The user is able to interact with the user interface 24 and image processing software having multiple functions to capture images and complete image processing.

At least one of the imaging apparatuses 10, 10a, 10b of the 14th embodiment can include the image lens assembly of the present disclosure, and can be the same as or similar to the imaging apparatus 10 of the 13th embodiment and will not be described again herein. In detail, the imaging apparatuses 10, 10a of the 14th embodiment can be a wide-angle imaging apparatus and a super wide-angle imaging apparatus, respectively, or can be a wide-angle imaging apparatus and a telephoto imaging apparatus, respectively. However, the present disclosure is not limited thereto. Especially, in the 14th embodiment, at least one of the imaging apparatuses 10, 10b can be the imaging apparatus of the 7th embodiment. Moreover, the connection between the imaging apparatus 10 and other elements can be the same as the imaging apparatus 10 in FIG. 26C, or can be modified according to the type of the imaging apparatus, which will not be described again herein.

15th Embodiment

Figure 27:
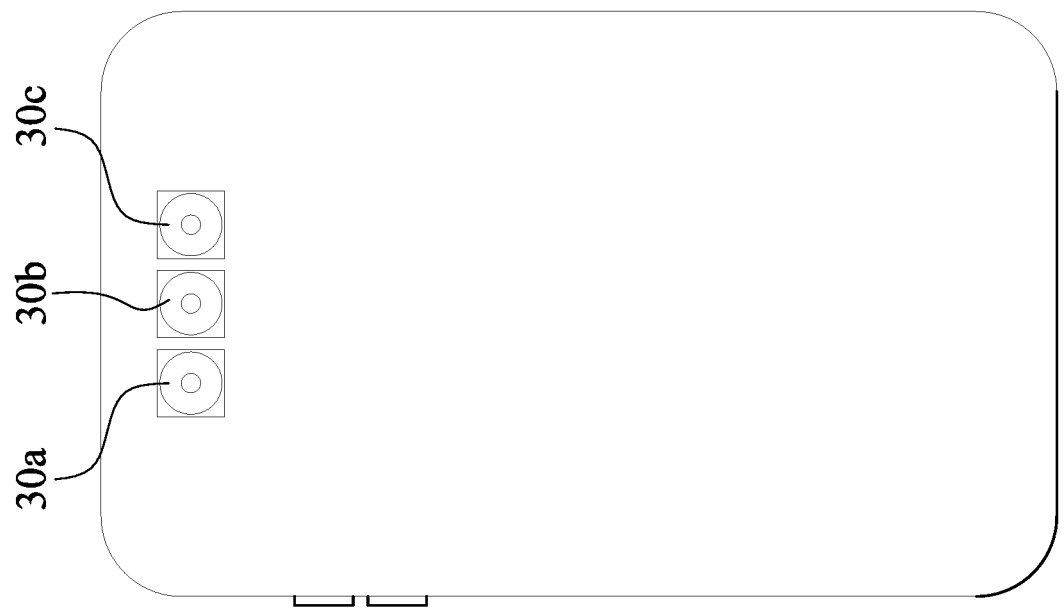
FIG. 27 is a schematic view of one side of an electronic device according to the 15th embodiment of the present disclosure.

FIG. 27 is a schematic view of one side of an electronic device 30 according to the 15th embodiment of the present disclosure. The electronic device 30 according to the 15th embodiment is a smartphone, wherein the electronic device 30 includes three imaging apparatuses 30a, 30b, 30c.

The electronic device 30 of the 15th embodiment can include elements which is the same as or similar to the elements of the aforementioned 13th embodiment. The connection among the imaging apparatuses 30a, 30b, 30c and other elements can be the same as or similar to the 14th embodiment and will not be described again herein. All of the imaging apparatuses 30a, 30b, 30c of the 15th embodiment can include the image lens assembly of the present disclosure, and can be the same as or similar to the imaging apparatus 10 of the 13th embodiment and will not be described again herein. In detail, the imaging apparatus 30a can be a super wide-angle imaging apparatus, the imaging apparatus 30b can be a wide-angle imaging apparatus and is the imaging apparatus of the aforementioned 7th embodiment, the imaging apparatus 30c can be a telephoto imaging apparatus, or other kinds of imaging apparatus, and the present disclosure is not limited thereto.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising five lens elements, the five lens elements being, in order from an object side to an image side along an optical path:

a first lens element, a second lens element, a third lens element, a fourth lens element and a fifth lens element;

wherein the first lens element has positive refractive power;

the third lens element has negative refractive power;

the fourth lens element with positive refractive power has an object-side surface being convex in a paraxial region thereof and an image-side surface being convex in a paraxial region thereof; and the fifth lens element has an object-side surface being convex in a paraxial region thereof and an image-side surface being concave in a paraxial region thereof, and the image-side surface of the fifth lens element comprises at least one convex critical point in an off-axis region thereof;

wherein an Abbe number of the second lens element is V2, an Abbe number of the third lens element is V3, a focal length of the image lens assembly is f, a curvature radius of the object-side surface of the fourth lens element is R7, a curvature radius of the image-side surface of the fourth lens element is R8, an axial distance between the first lens element and the second lens element is T12, an axial distance between the second lens element and the third lens element is T23, and the following conditions are satisfied:

$V2+V3<70;$ $f/R8\leq-0.80;$ $0.66\leq T12/T23;$ and $0.95<f/R7.$

2. The image lens assembly of claim 1, wherein a focal length of the second lens element is f2, a focal length of the third lens element is f3, and the following condition is satisfied:

$|f3/f2|<1.40.$

3. The image lens assembly of claim 1, wherein the Abbe number of the second lens element is V2, the Abbe number of the third lens element is V3, and the following condition is satisfied:

$20<V2+V3<60.$

4. The image lens assembly of claim 1, wherein the object-side surface of the fourth lens element comprises at least one concave critical point in an off-axis region thereof.

5. The image lens assembly of claim 1, wherein the axial distance between the first lens element and the second lens element is T12, the axial distance between the second lens element and the third lens element is T23, and the following condition is satisfied:

$0.5<T12/T23.$

6. The image lens assembly of claim 1, wherein the focal length of the image lens assembly is f, a focal length of the fourth lens element is f4, a focal length of the fifth lens element is f5, and the following condition is satisfied:

$3.0<(f/f4)-(f/f5).$

7. The image lens assembly of claim 1, wherein an f-number of the image lens assembly is Fno, an axial distance between an object-side surface of the first lens element and an image surface is TL, a maximum image height of the image lens assembly is ImgH, a maximum field of view of the image lens assembly is FOV, and the following conditions are satisfied:

$1.2 < Fno < 2.6$;

$TL/ImgH < 1.40$; and 88 degrees $< FOV < 110$ degrees.

8. The image lens assembly of claim 1, wherein a minimum among Abbe numbers of all lens elements of the image lens assembly is Vmin, and the following condition is satisfied:

$Vmin < 20$.

9. The image lens assembly of claim 1, wherein the axial distance between the first lens element and the second lens element is T12, an axial distance between the third lens element and the fourth lens element is T34, an axial distance between the fourth lens element and the fifth lens element is T45, and the following conditions are satisfied:

$1.0 < T12/T34$; and $1.0 < T12/T45$.

10. The image lens assembly of claim 1, wherein a central thickness of the first lens element is CT1, a central thickness of the second lens element is CT2, a central thickness of the third lens element is CT3, a central thickness of the fourth lens element is CT4, a central thickness of the fifth lens element is CT5, and the following conditions are satisfied:

$1.0 < CT1/CT2$;

$1.0 < CT1/CT3$;

$1.0 < CT1/CT4$; and $1.0 < CT1/CT5$.

11. The image lens assembly of claim 1, wherein the axial distance between the first lens element and the second lens element is T12, a central thickness of the second lens element is CT2, and the following condition is satisfied:

$1.0 < T12/CT2 < 3.0$.

12. The image lens assembly of claim 1, wherein a focal length of the first lens element is f1, a focal length of the third lens element is f3, and the following condition is satisfied:

$-2.0 < f3/f1 < 0$.

13. The image lens assembly of claim 1, wherein a central thickness of the first lens element is CT1, a sum of all axial distances between adjacent lens elements of the image lens assembly is ΣAT, and the following condition is satisfied:

$0.80 < CT1/\Sigma AT$.

14. An imaging apparatus, comprising:
the image lens assembly of claim 1; and
an image sensor disposed on an image surface of the image lens assembly.

15. An electronic device, comprising:
the imaging apparatus of claim 14.

\* \* \* \* \*